US012656778B2

(12) United States Patent
Hiramatsu

(10) Patent No.: US 12,656,778 B2
(45) Date of Patent: Jun. 16, 2026

(54) WORK VEHICLE AND TRAVEL REGION SPECIFYING DEVICE

(71) Applicant: Yanmar Co., Ltd., Osaka (JP)

(72) Inventor: Toshifumi Hiramatsu, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 1509 days.

(21) Appl. No.: 16/082,854

(22) PCT Filed: Mar. 2, 2017

(86) PCT No.: PCT/JP2017/008223
§ 371 (c)(1),
(2) Date: Sep. 6, 2018

(87) PCT Pub. No.: WO2017/154715
PCT Pub. Date: Sep. 14, 2017

(65) Prior Publication Data
US 2019/0227561 A1 Jul. 25, 2019

(30) Foreign Application Priority Data

Mar. 9, 2016 (JP) ................................. 2016-046230
Mar. 11, 2016 (JP) ................................. 2016-048460
(Continued)

(51) Int. Cl.
G05D 1/00 (2024.01)
A01B 69/04 (2006.01)
(52) U.S. Cl.
CPC ......... *G05D 1/0219* (2013.01); *A01B 69/008* (2013.01); *G05D 1/02* (2013.01); *G05D 1/027* (2013.01); *G05D 1/0278* (2013.01)

(58) Field of Classification Search
CPC ...... G05D 1/0219; G05D 1/0088; G05D 1/02; G05D 1/027; G05D 1/0278; G05D 2201/0201; A01B 69/008
See application file for complete search history.

(56) References Cited

U.S. PATENT DOCUMENTS 6,539,294 B1 3/2003 Kageyama
9,265,187 B2 * 2/2016 Cavender-Bares ..........................
G05D 1/0088
(Continued)

FOREIGN PATENT DOCUMENTS

GB 2382157 A 5/2003
JP 07-281742 A 10/1995
(Continued)

OTHER PUBLICATIONS

Machine translation of JP2006018675A, attached to original document (Year: 2006).*
(Continued)

*Primary Examiner* — Jelani A Smith
*Assistant Examiner* — Gabriel Anfinrud
(74) *Attorney, Agent, or Firm* — NORTON ROSE FULBRIGHT US LLP

(57) ABSTRACT

An autonomous travel work vehicle including: a body part; a work machine attached to the body part; a moving GPS antenna configured to detect positional information on the body part; a memory configured to store a field where the body part travels; a control section configured to control travel of the body part and work by the work machine in the field; and a remote control device that generates a route of the body part in the field. The control section is configured to cause the body part to travel from a current position to a work start point and then start work with the work machine
(Continued)

in a case where an instruction of start of work with the work machine is issued in a headland.

20 Claims, 32 Drawing Sheets

(30)      Foreign Application Priority Data

| Mar. 17, 2016 | (JP) | ................................. | 2016-053778 |
| Mar. 17, 2016 | (JP) | ................................. | 2016-053779 |

(56)          References Cited

U.S. PATENT DOCUMENTS

| 9,839,174 | B2 * | 12/2017 | Fujimoto | ............. | A01B 69/008 |
| 10,527,434 | B2 * | 1/2020 | Izumi | .................. | B60W 50/082 |
| 2002/0156556 | A1 * | 10/2002 | Ruffner | ..................... | G01S 5/02 |
| | | | | | 701/23 |
| 2011/0288714 | A1 * | 11/2011 | Flohr | ................... | G05D 1/0206 |
| | | | | | 701/27 |
| 2014/0190514 | A1 * | 7/2014 | Lamon | ................ | A47L 11/4061 |
| | | | | | 134/6 |
| 2015/0142308 | A1 * | 5/2015 | Schmidt | ................. | B60K 35/00 |
| | | | | | 701/467 |
| 2015/0346728 | A1 * | 12/2015 | Peake | .................. | G05D 1/0212 |
| | | | | | 701/23 |
| 2018/0088572 | A1 * | 3/2018 | Uchida | ............... | B60W 50/082 |
| 2018/0136664 | A1 * | 5/2018 | Tomita | ................. | A01B 69/008 |
| 2020/0401144 | A1 * | 12/2020 | Storfer | ................. | G05D 1/0297 |

FOREIGN PATENT DOCUMENTS

| JP | H10-066405 | A | | 3/1998 | |
| JP | H10-320045 | | | 12/1998 | |
| JP | H11-154016 | A | | 6/1999 | |
| JP | 2002-186309 | A | | 7/2002 | |
| JP | 2003-308121 | A | | 10/2003 | |
| JP | 2006018675 | A | * | 1/2006 | ............... G05D 1/02 |
| JP | 2008-097632 | A | | 4/2008 | |
| JP | 2008-287487 | A | | 11/2008 | |
| JP | 2014-126919 | A | | 7/2014 | |
| JP | 2015-188350 | A | | 11/2015 | |
| JP | 2015-222499 | A | | 12/2015 | |
| WO | 2013083311 | A1 | | 6/2013 | |
| WO | 2015119266 | A1 | | 8/2015 | |

OTHER PUBLICATIONS

Machine Translation of JP2006018675, attached to original document (Year: 2006).*

International Search Report dated May 30, 2017 issued in corresponding PCT Application PCT/JP2017/008223.

Japanese Office Action dated Mar. 5, 2019 issued in corresponding Japanese Application No. 2016-046230.

Japanese Office Action dated Oct. 3, 2023, issued in JP Application No. 2022122495.

Chinese Office Action dated Oct. 27, 2023, issued in CN Application No. 202110387024.7.

Chinese Office Action dated Oct. 27, 2023, issued in CN Application No. 202111185681.X.

Korean Office Action dated Sep. 1, 2023, issued in KR Application No. 10-2022-7046373.

Extended European Search Report dated Sep. 26, 2023, issued in EP Application No. 23185368.0.

* cited by examiner

FIG. 1

WORK VEHICLE AND TRAVEL REGION SPECIFYING DEVICE

CROSS REFERENCES TO RELATED APPLICATIONS

This application is a national stage application pursuant to 35 U.S.C. § 371 of International Application No. PCT/JP2017/008223, filed on Mar. 2, 2017, which claims priorities under 35 U.S.C. § 119 to Japanese Patent Application Nos. 2016-046230 filed on Mar. 9, 2016, 2016-048460 filed on Mar. 11, 2016, 2016-053778 filed on Mar. 17, 2016, and 2016-053779, filed on Mar. 17, 2016, the disclosures of which are hereby incorporated by reference in their entireties

TECHNICAL FIELD

The present invention relates to techniques of a work vehicle and a travel region specifying device.

BACKGROUND ART

A known conventional work vehicle such as a tractor that can autonomously travel (unmanned travel) along a predetermined route, as described in Patent Literature 1 (PTL 1), for example.

A work vehicle described in PTL 1 includes a control program that defines a work route in each of a work region where work is conducted with the work vehicle (a center portion of a work field) and a region except the work region (a peripheral portion). With this program, the work vehicle autonomously travels along the work route so that predetermined work can be automated.

CITATION LIST

Patent Literature

PTL 1: Japanese Patent Application Laid-Open No. H10-66405 (1998)

SUMMARY OF INVENTION

Technical Problem

In a conventional work vehicle that can autonomously travel as described in PTL 1, however, an operator needs to operate the work vehicle to a work start position.

Thus, in such a conventional work vehicle, after placing the work vehicle at the work start position, an operator needs to return to another accompanying work vehicle. Thus, work cannot be started immediately after the placement of the work vehicle. If work vehicles are placed away from each other, there is a heavy burden on the operator in movement.

In addition, in the conventional technique described in, for example, PTL 1, if vertexes of a travel trajectory are erroneously specified, a region outside a field might be set as a field in error, and accordingly, the route is set outside the field against an intension of a user.

In a conventional work vehicle that can autonomously travel as described in PTL 1, a stop position when work is completed is not taken into consideration.

Thus, in the conventional work vehicle, the work vehicle stopped after completion of work might hinder work by the accompanying work vehicle.

The present invention has been made in view of the current situations described above, and some aspects* of the present invention have an object of enhancing work efficiency by providing a work vehicle that can reduce a burden on work of placing a work vehicle (autonomous travel work vehicle) at a work start position, and by providing a travel region specifying device that can reduce erroneous setting of a route outside a travel region in setting a route of the work vehicle that can autonomously travel.

Solution to Problem

Problems to be solved by some aspects* of the present invention have been described above. A solution for solving these problems will now be described.

Specifically, a work vehicle according to a first aspect of the present invention include: a body part; a work machine that is attached to the body part; a position detecting section configured to detect positional information on the body part; a memory section configured to store a travel region where the body part travels; a control section configured to control travel of the body part and work by the work machine in the travel region; and a route generating section that generates a route of the body part in the travel region, wherein in the travel region stored in the memory section, while the position detecting section detects a current position of the body part, the control section allows the work vehicle to autonomously travel along the route generated by the route generating section, the travel region includes a first region including a work route on which work is performed with the work machine and a second region set around the first region, and the control section is configured to cause the body part to travel from the current position of the body part to a start point of the work route and then start work with the work machine in a case where an instruction of starting work with the work machine is issued in the second region.

This configuration can reduce the necessity for placing the work vehicle to a work start position by an operation of an operator, and thus, efficiency in work conducted with work vehicle can be enhanced.

The work vehicle according to a second aspect of the present invention may include: an azimuth angle detecting section configured to detect an azimuth angle of the body part, wherein the control section may prevent the body part from traveling from the current position to the start point unless an angle difference between an azimuth angle of the body part and an azimuth angle from the current position to the start point is less than or equal to a predetermined threshold.

This configuration causes the body part to autonomously travel if the azimuth angle of the body part is within the predetermined threshold. Thus, an error in the current position of the body part relative to the set start position can be reduced.

In the work vehicle according to a third aspect of the present invention, the work route may include a first work route including the start point, and the control section may specify an imaginary route obtained by extending the first work route to the second region, and if the current position is within a predetermined deviation from the imaginary route, the control section may control travel of the body part so as to reduce the deviation and allow the body part to travel from the current position to the start point, whereas if the current position is out of the predetermined deviation from the imaginary route, the control section may generate a travel route from the current position to the start point and allow the body part to travel along the travel route.

This configuration can reduce an error in the current position relative to the set start point when the body part reaches the start point. In addition, when the current position of the body part is separated from the start point, the work vehicle can be placed at the start point without manned travel to the start point by the operator. Thus, it is possible to reduce a burden on the operator in placing the work vehicle at the start point.

A work vehicle according to a fourth aspect of the present invention includes: a body part; a work machine that is attached to the body part; a position detecting section configured to detect positional information on the body part; a memory section configured to store a travel region where the body part travels; a control section configured to control travel of the body part and work by the work machine in the travel region; and a route generating section that generates a route of the body part in the travel region, wherein in the travel region stored in the memory section, while the position detecting section detects a current position of the body part, the control section allows the work vehicle to autonomously travel along the route generated by the route generating section, the travel region includes a first region including a work route on which work is performed with the work machine and a second region not including a work region where work is performed with the work machine, the control section is configured to cause the body part to travel from a work end position of the work route to a travel end position set in the second region after work with the work machine on the work route is completed.

With this configuration, the travel end position relative to the work vehicle that autonomously travels can be set at a position at which the vehicle does not hinder an accompanying work vehicle. Thus, working efficiency of the accompanying work vehicle can be enhanced.

The work vehicle according to a fifth aspect of the present invention may include: an azimuth angle detecting section configured to detect an azimuth angle of the body part, wherein the control section may be configured to control an azimuth angle of the body part at the travel end position.

This configuration enables the work vehicle to be quickly carried out of a field without spoiling a headland and a side margin.

A travel region specifying device according to a sixth aspect of the present invention includes: a positional information acquiring section configured to acquire positional information on a body part; a travel trajectory region specifying section configured to specify a travel trajectory region of the body part based on a travel trajectory of the body part specified using the positional information; a travel region specifying section configured to specify a travel region where the body part travels based on a plurality of selection points selected from the travel trajectory; and a notification section configured to issue a predetermined notification, wherein the predetermined notification is a notification suggesting that the travel region includes a region outside the travel trajectory region.

This configuration can prevent erroneous setting of a route outside the travel region in setting routes of the work vehicle that autonomously travels.

A travel region specifying device according to a seventh aspect of the present invention includes: a positional information acquiring section configured to acquire positional information on a body part; a travel trajectory region specifying section configured to specify a travel trajectory region of the body part based on a travel trajectory of the body part specified using the positional information; a travel region specifying section configured to specify a travel region where the body part travels based on a plurality of selection points selected from the travel trajectory; and a correction section configured to correct the travel region, wherein in a case where the travel region includes a region outside the travel trajectory region, the correction section corrects the travel region to a region not including a region outside the travel trajectory region.

This configuration can prevent erroneous setting of a route outside the travel region in setting routes of the work vehicle that autonomously travels.

Advantageous Effects of Invention

The work vehicle according to some aspects* of the present invention helps elimination of the necessity for placing the work vehicle to a work start position by an operation of an operator. Thus, the efficiency of work conducted with the work vehicle can be enhanced.

A travel region specifying device according to some aspects of the present invention can prevent erroneous setting of a route outside a travel region in setting routes of the work vehicle that autonomously travels.

BRIEF DESCRIPTION OF DRAWINGS

FIG. 1 is a schematic side view of an autonomous travel work vehicle and a travel work vehicle.

FIG. 24A is an illustration of an erroneous setting situation of the field shape and FIG. 24B is an illustration of a determination situation of the field shape based on region data.

DESCRIPTION OF EMBODIMENTS

A configuration of an autonomous travel work vehicle that is a work vehicle according to one embodiment of the present invention will be described with reference to FIGS. 1 to 5.

Figure 1:
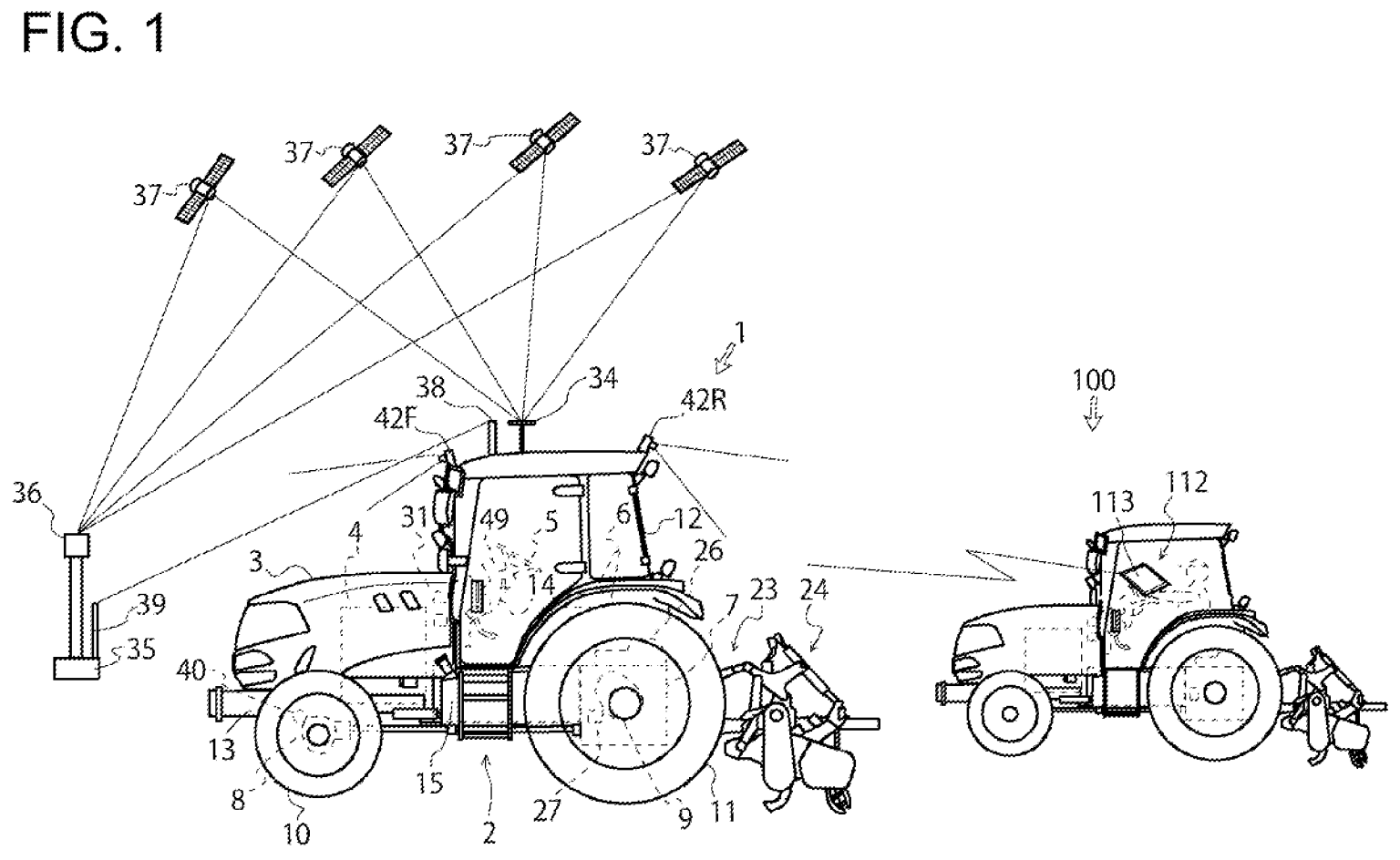

As illustrated in FIG. 1, in an embodiment described below, an autonomous travel work vehicle (hereinafter also referred to as an unmanned vehicle) 1 that can autonomously travel without human and a manned travel work vehicle (hereinafter also referred to as a manned vehicle) 100 that is steered and operated by an operator in cooperation with the autonomous travel work vehicle 1 are tractors, and the autonomous travel work vehicle 1 and the travel work vehicle 100 are equipped with rotary tillers as work machines. The work vehicles are not limited to tractors, and may be combine harvesters or other machines. The work machines are not limited to rotary tillers and may be ridgers, grass mowers, rakes, seeding machines, fertilizing machines, and so forth.

The "autonomous travel" herein means that a configuration concerning travel included in the tractor is controlled by a control section (ECU) in the tractor so that the tractor travels along a predetermined route.

Farm work on a single field conducted with an unmanned vehicle and a manned vehicle will be also referred to as cooperative work, following wok, or accompanying work of farm work, for example. Examples of the cooperative work of farm work may include "conducting farm work on different fields such as adjacent fields with an unmanned vehicle and a manned vehicle at the same time" in addition to "conducting farm work on a single field with an unmanned vehicle and a manned vehicle".

Figure 2:
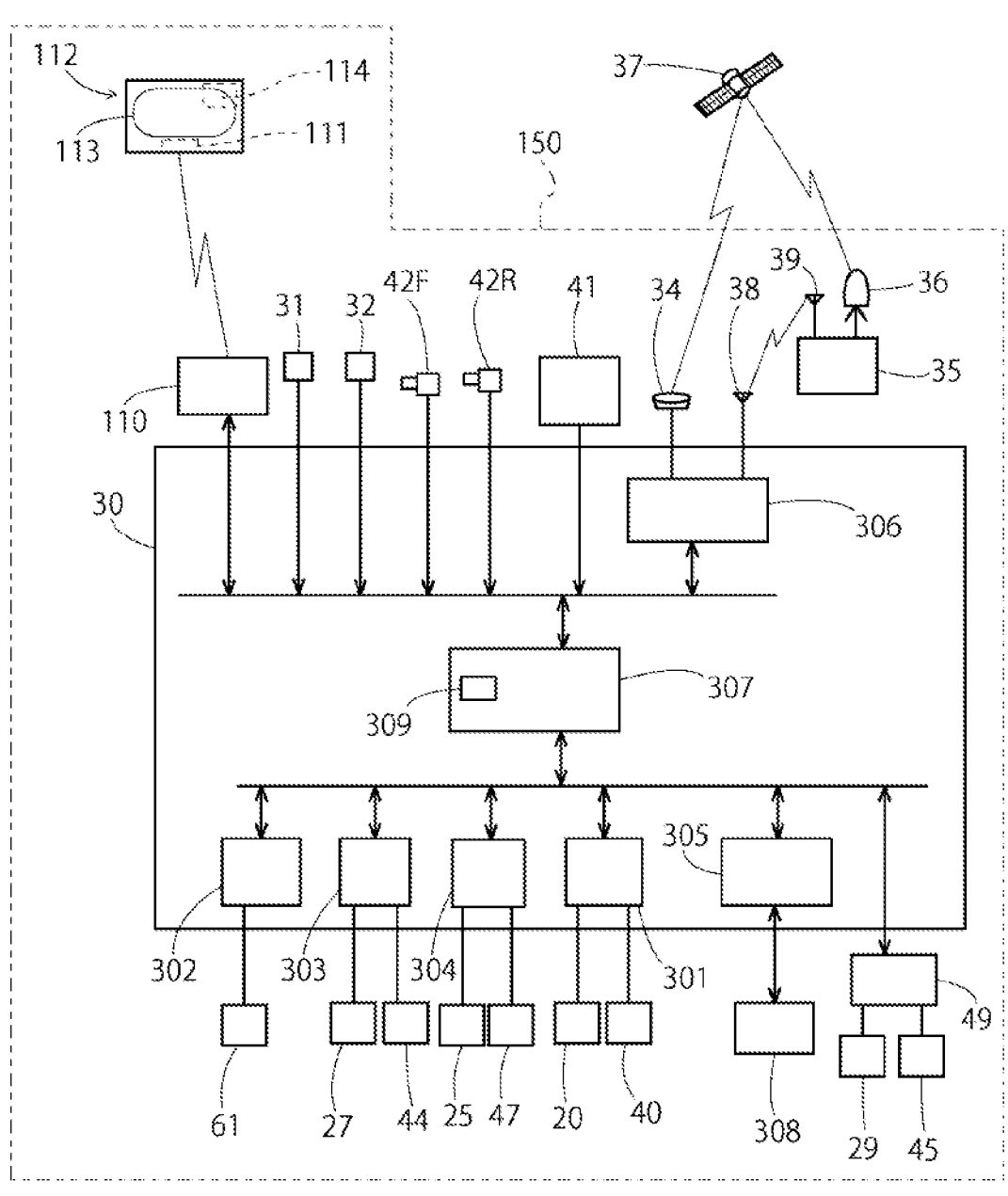
FIG. 2 is a control block diagram of the autonomous travel work vehicle.

With reference to FIGS. 1 and 2, an overall configuration of the tractor that is the autonomous travel work vehicle 1 will be described. The tractor includes a body part 2 in which an engine 4 is mounted in a hood 3, a dashboard 14 is disposed in a cabin 12 behind the hood 3, and a steering wheel 5 serving as a steering operating means is disposed on the dashboard 14. Rotation of the steering wheel 5 causes orientations of front wheels 10 and 10 to rotate through a steering device. A steering actuator 40 for actuating the steering device is connected to a steering controller 301 constituting the control section 30. A steering direction of the autonomous travel work vehicle 1 is detected by a steering sensor 20. The steering sensor 20 is constituted by an angle sensor such as a rotary encoder and is disposed in a rotation proximal portion of the front wheels 10.

The detection configuration of the steering sensor 20 is not specifically limited and may be any configuration as long as a steering direction is identified, and may detect rotation of the steering wheel 5 and a work amount of a power steering. The detection value obtained by the steering sensor 20 is input to the steering controller 301 of the control section 30.

The control section 30 includes the steering controller 301, an engine controller 302, a gear-shift controller 303, a horizontal controller 304, a work controller 305, a positioning control unit 306, an autonomous travel controller 307, and so forth. Each of these controllers and units includes a central processing unit (CPU), a memory device such as a RAM or a ROM, an interface, and so forth. The memory device stores programs and data, etc. for operation. These controllers and units can communicate with each other to transmit and receive information, data, or the like through CAN communication. The autonomous travel controller 307 includes a memory 309 serving as a memory section for storing a program, data, or the like.

A driver sheet 6 is disposed behind the steering wheel 5, and a transmission case 7 is disposed below the driver sheet 6. Rear axle cases 9 and 9 are respectively connected to the left and right sides of the transmission case 7. Rear wheels 11 and 11 are supported with bearings by the rear axle cases 9 and 9 through an axle. A driving force from the engine 4 is shifted by a transmission device (a main transmission device and a sub transmission device) in the transmission case 7 to enable driving of the rear wheels 11 and 11. The transmission device is constituted by, for example, a hydraulic stepless transmission device, and actuates a movable swash plate of a hydraulic pump of a variable displacement type by a transmission means 44 such as a motor to enable gear-shift. The transmission means 44 is connected to the gear-shift controller 303 of the control section 30. The number of rotations of the rear wheels 11 is detected by a vehicle speed sensor 27, and is input to the gear-shift controller 303 as a travel speed. The method for detecting the vehicle speed and the location of the vehicle speed sensor 27 are not specifically limited.

The transmission case 7 houses a PTO clutch and a PTO transmission device. The PTO clutch is engaged and disengaged by a PTO engaging/disengaging means 45. The PTO engaging/disengaging means 45 is connected to the autonomous travel controller 307 of the control section 30 through a display means 49 to enable control of connection and disconnection of a driving force to and from a PTO shaft. In the case of attaching a seeding machine or a ridging machine, for example, as a work machine, a work machine controller 308 is provided in order to enable control unique to the work machine, and the work machine controller 308 is connected to the work controller 305 through an information communication line (so-called an ISOBUS).

A front axle case 8 is supported on a front frame 13 supporting the engine 4. The front wheels 10 and 10 are supported with bearings at both sides of the front axle case 8 so that a driving force form the transmission case 7 can be transferred to the front wheels 10 and 10. The front wheels 10 and 10 serve as steering wheels and can rotate by a rotation operation of the steering wheel 5. The front wheels 10 and 10 can rotate leftward or rightward by the steering actuator 40 constituted by a power steering cylinder serving as a driving means of the steering device. The steering actuator 40 is connected to and controlled by the steering controller 301 of the control section 30.

An engine revolution speed sensor 61, a water-temperature sensor, and a hydraulic sensor, and other devices are connected to the engine controller 302 serving as an engine revolution control means to enable detection of a state of the engine 4. The engine controller 302 detects a load based on a set revolution speed and an actual revolution speed and performs control to avoid an overload. The engine controller 302 also transmits the state of the engine 4 to a remote control device 112 described later so that the state is displayed on a display device 113.

A level sensor 29 for detecting a liquid level of fuel is provided to a fuel tank 15 disposed below a step and is connected to the display means 49. The display means 49 is disposed on the dashboard 14 of the autonomous travel work vehicle 1 and displays the amount of remaining fuel. Based on the amount of remaining fuel, the autonomous travel controller 307 calculates a workable time, and information is transmitted to the remote control device 112 through a communication device 110 so that the display device 113 of the remote control device 112 can display an amount of remaining fuel and a workable time. The display means capable of displaying a current position or other parameters may have a different configuration from those of a speed indicator, and a display means for displaying a hydraulic pressure or abnormality.

The speed indicator, the fuel indicator, monitors for displaying a hydraulic pressure and other parameters and abnormality of the engine 4, and the display means 49 for displaying a set value and other parameters are arranged on the dashboard 14. The display means 49 can be configured as a touch panel in a manner similar to the remote control device 112, and enables data input, selection, a switch operation, a button operation, and so forth.

A work machine 24 is elevatably provided on a rear portion of the body part 2 of the tractor with a work machine attachment device 23 interposed therebetween. This embodiment employs a rotary tiller as the work machine 24. An elevation cylinder 26 is disposed on the transmission case 7 and is configured to extend and contract to thereby rotate an elevation arm constituting the work machine attachment device 23 so that the work machine 24 can be elevated and lowered. The elevation cylinder 26 extends and contracts by actuation of an elevation actuator 25. The elevation actuator 25 is connected to the horizontal controller 304 of the control section 30. A tilt cylinder is provided to a lift link at one of the left and right sides of the work machine attachment device 23. A tilt actuator 47 for actuating the tilt cylinder is connected to the horizontal controller 304.

The positioning control unit 306 serving as a position detecting section is connected to a moving GPS antenna 34 and a data receiving antenna 38 for enabling detection of positional information. The moving GPS antenna 34 and the data receiving antenna 38 are disposed on the cabin 12. The positioning control unit 306 includes a position calculating means to calculate a latitude and a longitude, and the current position can be displayed on the display means 49 and the display device 113 of the remote control device 112. In addition, a GPS (the United States), global navigation satellite systems (GNSS) such as a quasi-zenith satellite (Japan) and a GLONASS (Russia) are employed to perform accurate positioning. In the description of this embodiment, a GPS is used.

The autonomous travel work vehicle 1 includes a gyro sensor 31 for obtaining posture change information on the body part 2 and an azimuth angle detecting section 32 for detecting a travel direction, and is connected to the control section 30.

Since the travel direction can be calculated from the positioning by the GPS, the azimuth angle detecting section 32 may be omitted.

The gyro sensor 31 is configured to detect an angular velocity of a tilt (pitch) of the body part 2 in the front-rear direction (longitudinal direction), an angular velocity of a tilt (roll) of the body part 2 in the left-right direction (lateral direction), and an angular velocity of turning (yaw). These three angular velocities are integrated so that the tilt angles of the body part 2 in the longitudinal direction and the lateral direction and a turning angle can be obtained. Specific examples of the gyro sensor 31 include a mechanical gyro sensor, an optical gyro sensor, a hydraulic gyro sensor, and a vibratory gyro sensor. The gyro sensor 31 is connected to the control section 30, and inputs information on these three angular velocities to the control section 30.

The azimuth angle detecting section 32 detects the orientation (travel direction) of the autonomous travel work vehicle 1. Specific examples of the azimuth angle detecting section 32 include a magnetic orientation sensor. The azimuth angle detecting section 32 inputs information to the autonomous travel controller 307 through a CAN communication means.

In this manner, the autonomous travel controller 307 computes signals acquired from the gyro sensor 31 and the azimuth angle detecting section 32 with a posture and orientation computing means to obtain a posture (the orientation, tilts of the body part 2 in the longitudinal direction and the lateral direction, and the turning direction) of the autonomous travel work vehicle 1.

The positional information on the autonomous travel work vehicle 1 is acquired with a global positioning system (GPS).

Examples of the positioning method using the GPS include single positioning, relative positioning, differential GPS (DGPS) positioning, and real-time kinematic-GPS (RTK-GPS) positioning. Any of these methods may be employed, and this embodiment employs the RTK-GPS positioning showing a high positioning accuracy.

The real-time kinematic-GPS (RTK-GPS) positioning is a method in which GPS observation is performed at the same time in a reference station whose position has been obtained and a mobile station whose position is to be obtained, and data obtained at the reference station is transmitted in real time to the mobile station by a method such as a wireless method so that the position of the mobile station is obtained in real time based on the obtained position of the reference station.

In this embodiment, the positioning control unit 306 serving as a mobile station, the moving GPS antenna 34, and the data receiving antenna 38 are disposed on the autonomous travel work vehicle 1, and a fixed communication machine 35 serving as a reference station, a fixed GPS antenna 36, and a data transmission antenna 39 are disposed at predetermined locations. In the real-time kinematic-GPS (RTK-GPS) positioning of this embodiment, a phase is measured in both of the reference station and the mobile station (relative positioning), and data obtained by the fixed communication machine 35 as a reference station is transmitted from the data transmission antenna 39 to the data receiving antenna 38.

The moving GPS antenna 34 disposed in the autonomous travel work vehicle 1 receives signals from GPS satellites 37, 37, . . . . These signals are transmitted to the positioning control unit 306 for positioning. At the same time, the fixed GPS antenna 36 serving as a reference station receives signals from the GPS satellites 37, 37, . . . . These signals are processed by the fixed communication machine 35 for positioning, and transmitted to the positioning control unit 306 so that observed data is analyzed to determine the position of the mobile station.

In this manner, the autonomous travel controller 307 is provided as an autonomous travel means for causing the autonomous travel work vehicle 1 to autonomously travel. That is, the information acquisition units connected to the autonomous travel controller 307 acquire a travel state of the autonomous travel work vehicle 1 as various types of information, and control units connected to the autonomous travel controller 307 control autonomous travel of the autonomous travel work vehicle 1. Specifically, the positioning control unit 306 receives radio waves transmitted from the GPS satellites 37, 37, . . . and obtains positional information on the body part 2 with intervals of a set time. The gyro sensor 31 and the azimuth angle detecting section 32 obtain displacement information and orientation information on the body part 2. Based on these positional information, displacement information, and orientation information, autonomous travel is performed by controlling the steering actuator 40, the transmission means 44, the elevation actuator 25, the PTO engaging/disengaging means 45, and the engine controller 302, for example, so that the body part 2 travels along previously set routes (a travel route and a work route) R for automatic work.

An obstacle sensor 41 is provided in the autonomous travel work vehicle 1, and is connected to the control section 30 so that contact with an obstacle can be avoided. For example, the obstacle sensor 41 is constituted by a laser sensor, an ultrasonic sensor, or a camera, is disposed in a front portion, a side portion, or a rear portion of the body part 2 and is connected to the control section 30. The control section 30 determines whether an obstacle is present ahead of, at the side, or behind the body part 2 or not, and when an obstacle reaches within a set distance, the control section 30 stops travel of the body part 2.

The autonomous travel work vehicle 1 is equipped with a camera 42F for capturing a front scene and a camera 42R for capturing a rear work machine and a field state after work. These cameras 42F and 42R are connected to the control section 30. In this embodiment, the cameras 42F and 42R are disposed on top of a front portion and on top of a rear portion of a roof of the cabin 12, but are not limited to specific locations. The cameras may be disposed on top of a front portion and on top of a rear portion of the inside of the cabin 12, one camera 42 may be disposed at the center of the body part 2 and rotate about the vertical axis to capture the surroundings, or a plurality of cameras 42 may be disposed at four corners of the body part 2 to capture images of surroundings of the body part 2. The video images captured by the cameras 42F and 42R are displayed on the display device 113 of the remote control device 112 included in the travel work vehicle 100.

The remote control device 112 is configured to set a route R including a work route Ra and a travel route Rb of the autonomous travel work vehicle 1 described later, to remotely operate the autonomous travel work vehicle 1, to monitor a travel state of the autonomous travel work vehicle 1 and an actuation state of the work machine, and to store work data, and includes a control device (e.g., a CPU and a memory), a communication device 111, the display device 113, and so forth.

An operator rides on and operates the travel work vehicle 100 serving as a manned traveling vehicle, and the remote control device 112 is mounted on the travel work vehicle 100 to enable operation of the autonomous travel work vehicle 1. A basic configuration of the travel work vehicle 100 is substantially the same as that of the autonomous travel work vehicle 1, and thus, detailed description will not be repeated. The travel work vehicle 100 (or the remote control device 112) may include a control unit for a GPS.

The remote control device 112 is removably attached to operating sections, such as the dashboards, of the travel work vehicle 100 and the autonomous travel work vehicle 1. The remote control device 112 can be operated while being attached to the dashboard of the travel work vehicle 100, while being carried out of the travel work vehicle 100, or while being attached to the dashboard 14 of the autonomous travel work vehicle 1. The remote control device 112 may be, for example, a personal computer such as a laptop personal computer or a tablet personal computer. In this embodiment, the remote control device 112 is a tablet personal computer.

In addition, the remote control device 112 and the autonomous travel work vehicle 1 are communicable with each other wirelessly, and the autonomous travel work vehicle 1 and the remote control device 112 are respectively provided with the communication devices 110 and 111 for communication. The communication device 111 is integrated with the remote control device 112. Communication means are communicable with each other with, for example, a wireless LAN. The remote control device 112 is provided with the display device 113 disposed at the surface of a casing and having a touch panel screen that can be operated by contact. The remote control device 112 houses, in the casing, the communication device 111, the CPU, the memory device 114, a battery, and so forth.

Next, a procedure of setting the route R (the work route Ra and the travel route Rb) by the remote control device 112 will be described.

Figure 3:
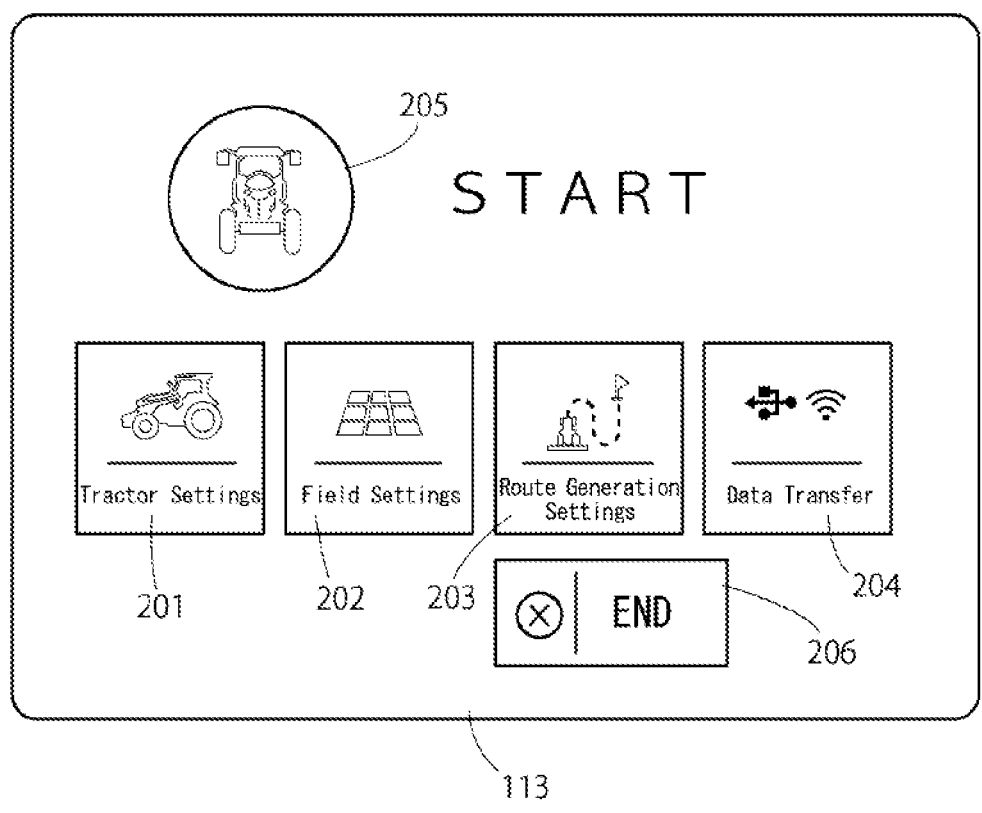
FIG. 3 is an illustration of an initial screen of a remote control device.

The display device 113 of the remote control device 112 is a touch panel, and an initial screen appears when the remote control device 112 is started by turning the power on. As illustrated in FIG. 3, the initial screen displays a tractor setting button 201, a field setting button 202, a route generation setting button 203, a data transfer button 204, a work start button 205, and an exit button 206.

First, tractor setting will be described.

When the tractor setting button 201 is touched, if work was conducted with a tractor by using the remote control device 112 in the past, that is, there is a tractor set in the past, the name (type) of this tractor is displayed. If a plurality of names of tractors are displayed, the name of a tractor to be used at present is selected by touching, and then the display returns to the initial screen.

In the case of setting a new tractor, the type of the tractor is specified. In this case, the type is directly input. Alternatively, a list of a plurality of types of tractors is displayed by the display device 113 so that an intended type can be selected.

When the tractor type is set, a setting screen for an attachment position of the moving GPS antenna 34 appears. The attachment position of the moving GPS antenna 34 differs among tractors, and can differ among technicians who attach the moving GPS antenna 34. Thus, a plan view of the tractor is displayed for setting of the attachment position.

When the attachment position of the moving GPS antenna 34 is set, a screen for setting the size and shape of a work machine to be attached to the tractor and the position of the work machine appears. With respect to the position of the work machine, a position is selected from a position in a front portion, a position between the front wheels and the rear wheels, a position in a rear portion, and an offset position.

When setting of the work machine is completed, a screen for setting a vehicle speed during work, an engine revolution speed during work, a vehicle speed during turning, and an engine revolution speed during turning appears. The vehicle speed during work can be made different between an outward path and a return path.

When setting of the vehicle speed and the engine revolution speed is completed, the display can proceed to field setting described later or can return to the initial screen.

Next, field setting will be described.

When the field setting button 202 is touched, in a case where work was conducted with the tractor by using the remote control device 112 in the past, that is, in a case where there is a field set in the past, the name of the set field is displayed. When the name of a field where work is to be performed at present is selected by touching from a plurality of tractor names displayed, the display can then proceed to route generation setting described later or can return to the initial screen. The field that has been set can be edited or a new field can be set.

Figure 4:
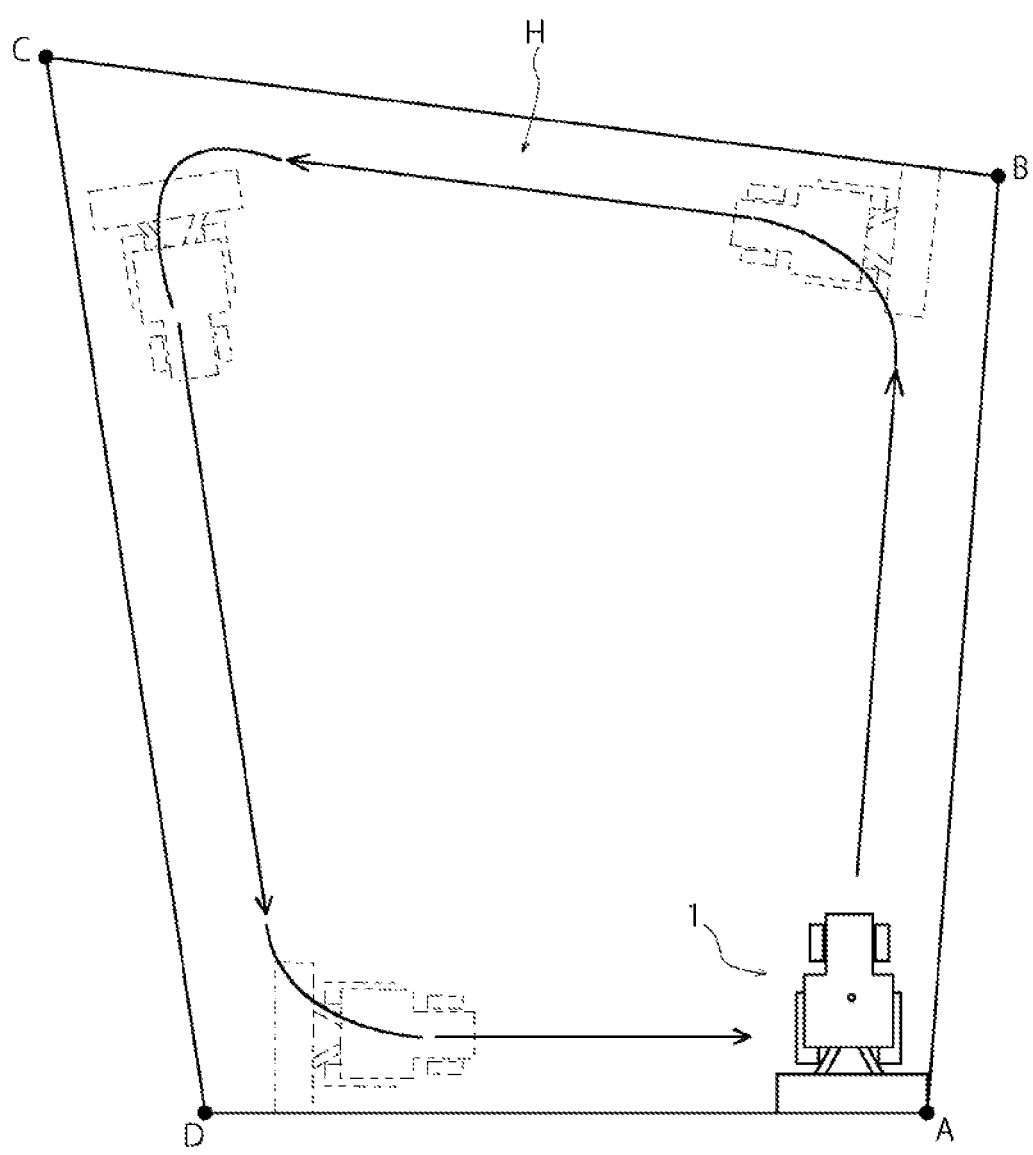
FIG. 4 is an illustration of a field setting in the case of using the autonomous travel work vehicle.

If there are no registered fields, a new field is set. When new field setting is selected, as illustrated in FIG. 4, the tractor (the autonomous travel work vehicle 1) is positioned at a corner A of four corners in a field H, and a button "measurement start" is touched. Thereafter, the tractor is caused to travel along the outer periphery of the field H, and a field shape is registered. Subsequently, from the registered field shape, an operator registers corner positions A, B, C, and D and inflexion points to specify a field shape.

Figure 5:
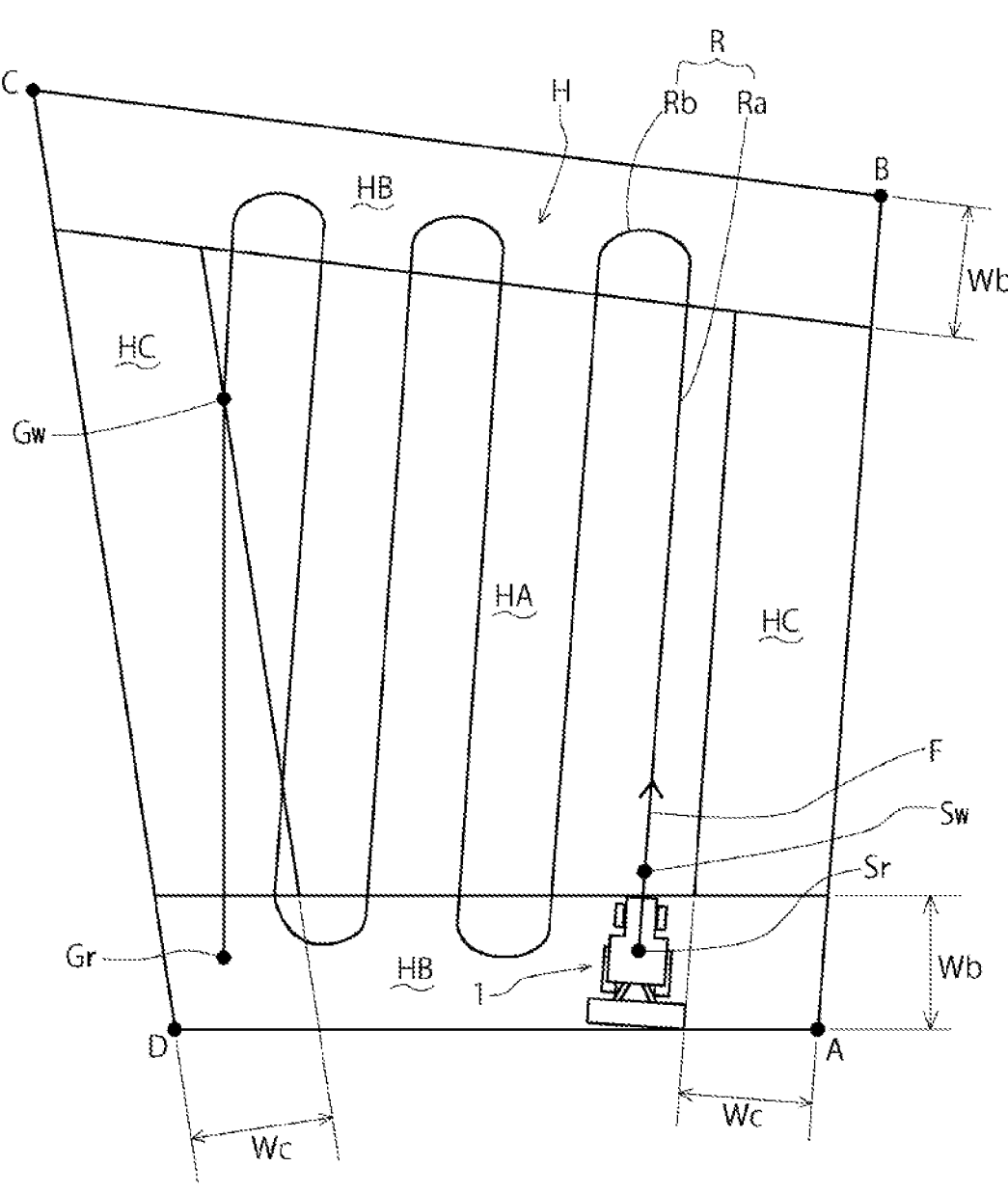
FIG. 5 is an illustration of a field region.

When the field H is specified, as illustrated in FIG. 5, a travel start position Sr, a work start position Sw, a work direction F, a work end position Gw, and a travel end position Gr are set. If an obstacle is present on the field H, the tractor is moved to the position of the obstacle, and an obstacle setting button (not shown) is touched so that the tractor can travel around the obstacle. In this manner, obstacle setting is performed. If an obstacle is present near the field H or an obstacle is smaller than a minimum radius of turning so that when the tractor travels on the periphery of the obstacle, the tuning becomes excessively large, this obstacle may be registered using a field map displayed.

When the work is completed, or when a previously registered field is selected, the display changes to a confir-mation screen, and an OK (confirmation) button and "edit/add" button are displayed. To change the previously regis-tered field, the "edit/add" button is touched.

When the OK button is touched in the field setting, a route generation setting appears. The route generation setting can also be performed by touching the route generation setting button 203 on the initial screen.

When the display shifts to a route generation setting mode, a selection screen for selecting a position at which the travel work vehicle 100 travels relative to the autonomous travel work vehicle 1 is displayed. That is, a positional relationship between the autonomous travel work vehicle 1 and the travel work vehicle 100 is set. Specifically, four options: (1) the travel work vehicle 100 is located left-rearward of the autonomous travel work vehicle 1; (2) the travel work vehicle 100 is located right-rearward of the autonomous travel work vehicle 1; (3) the travel work vehicle 100 is located immediately behind the autonomous travel work vehicle 1; and (4) the travel work vehicle 100 does not travel together (i.e., work is conducted only with the autonomous travel work vehicle 1) are displayed, and one of the four options can be selected by touching.

Then, a width of the work machine of the travel work vehicle 100 is set. That is, the width of the work machine is input as a numerical value.

Subsequently, the number of skips is set. Specifically, the number of routes to be skipped in a process in which the autonomous travel work vehicle 1 reaches a field end (headland) and moves from a first work route R1 to a second work route R2, is set. Specifically, one of (1) not skip, (2) skip one route, and (3) skip two routes is selected.

Subsequently, an overlap is set. Specifically, the amount of overlapping in a work width of the work route R2 adjacent to the work route R1 is set. Specifically, one of (1) not overlap and (2) overlap is selected. If "overlap" is selected, a numerical value input screen is displayed, and the display does not proceed to a next screen unless a numerical value is input.

Thereafter, periphery setting is performed. Specifically, an outer region of a work region HA where work is conducted with the autonomous travel work vehicle 1 and the travel work vehicle 100 or with the autonomous travel work vehicle 1 as illustrated in FIG. 5 is set. In other words, headlands HB where the vehicle travels with a turn as a non-work state at field ends, and side margins HC serving as non-work regions adjacent to the field periphery at the left and right sides of the field and between the headlands HB and the headland HB are set. Thus, the relationship of field H=work region HA+headland HB+headland HB+side mar-gin HC+side margin HC is established. In general, each of a width Wb of each headland HB and a width We of each side margin HC is less than or equal to twice as large as the width of a work machine attached to the travel work vehicle 100. After accompanying work with both the autonomous travel work vehicle 1 and the travel work vehicle 100 is completed, an operator rides on the travel work vehicle 100 and travels around the outer periphery twice by a manual operation so that the work is finished. The work can be conducted on an outer peripheral portion with the autono-mous travel work vehicle 1. In outer periphery setting, the width Wb of each headland HB and the width We of each side margin HC are automatically calculated to predeter-mined widths in accordance with the width of the work machine. Each of the calculated width Wb of each headland HB and the calculated width We of each side margin HC can be changed to any width. A user can change these widths to predetermined widths and can then set the width Wb and the width We after the change as a width of each headland HB and a width of each side margin HC, respectively. If each of the widths can be changed to any width, the widths after the change cannot be less than or equal to a minimum set width calculated in consideration of travel, work, and safety on the field. For example, in a case where the autonomous travel work vehicle 1 travels or turns in the headlands HB or in the side margins HC, the width that helps prevention of travel of the work machine out of the field is calculated as a minimum set width.

When the input of the setting described above is completed, the confirmation screen appears. When confirmation is touched, a route R is automatically generated. The route R includes the work route Ra and the travel route Rb. The work route Ra is a route generated in the work region HA, is a route where the vehicle travels while conducting work, and is a linear route. If the work region HA is not rectangular, the vehicle can travel out of the work region HA (i.e., travel to the headlands HB or the side margins HC) in some cases. The travel route Rb is a route generated in a region outside the work region HA, is a route on which the vehicle travels without conducting work, and is a route as a combination of a straight line and a curve. The vehicle mainly turns in the headlands HB.

The work route Ra and the travel route Rb are generated for each of the autonomous travel work vehicle 1 and the travel work vehicle 100.

In a case where a user wants to see the route R after the route generation, the user touches the route generation setting button 203 so that a simulation image is displayed for confirmation. The work route Ra and the travel route Rb have been generated irrespective of whether or not the route generation setting button 203 is touched.

While the work route Ra and the travel route Rb are automatically generated, the work start position Sw and the work end position Gw are set. The work start position Sw and the work end position Gw are set at corresponding positions closest to the travel start position Sr and the travel end position Gr registered in the field setting. When items of the route generation setting are set, route generation setting is displayed, and "route setting button," "transfer data," "return home" can be selectively displayed in a lower portion of the route generation setting.

In generating the work route Ra and the travel route Rb, the travel end position Gr of the autonomous travel work vehicle 1 is set. The travel end position Gr is a position at which the autonomous travel work vehicle 1 that has completed work with the work machine 24 at the work end position Gw is caused to autonomously travel and stop by the control section 30.

Here, a configuration of a work route generation device according to one embodiment of the present invention will be described.

As illustrated in FIG. 2, the autonomous travel work vehicle 1 includes: a moving GPS antenna 34 serving as a position detecting section configured to detect a current position Z as positional information on the body part 2; a memory 309 configured to store a field H where the body part 2 travels; a control section 30 configured to instruct travel of the body part 2 and work with the work machine 24 attached to the body part 2 on the field H; and a remote control device 112 serving as a route generating section that generates a route R of the body part 2 on the field H.

The autonomous travel work vehicle 1 is configured to generate a route R of the body part 2 by the remote control device 112, but the remote control device 112 may be replaced by the control section 30 that generates a route R of the body part 2. In the autonomous travel work vehicle 1, the control section 30 controls travel of the body part 2 and an operation of the work machine 24. Alternatively, instead of the control section 30, the remote control device 112 may control travel of the body part 2 and an operation of the work machine 24. In addition, in the autonomous travel work vehicle 1, the memory 309 stores the field H where the body part 2 travels. Alternatively, instead of the memory 309, the remote control device 112 (more specifically a memory (not shown) included in the remote control device 112) may store the field H.

That is, a work route generation device 150 according to one embodiment of the present invention includes: the moving GPS antenna 34 serving as a position detecting section configured to detect a current position Z as positional information on the body part 2; the memory 309 configured to store a field H where the body part 2 travels; the control section 30 configured to instruct travel of the body part 2 and work with the work machine 24 attached to body part 2 on the field H; and the remote control device 112 serving as a route generating section that generates a route R of the body part 2 on the field H.

In the autonomous travel work vehicle 1, the travel end position Gr is set by the work route generation device 150 in consideration of the generated work route Ra and travel route Rb of the travel work vehicle 100 and the travel position of the travel work vehicle 100.

In setting the travel end position Gr, before or after route generation setting, the work route generation device 150 displays an option such as "There is the possibility of collision with a manned vehicle after work. Move to a safe position after work?" on the display device 113.

There, if "Yes" is selected, the work route generation device 150 represents a recommended point on the display device 113 so that an arbitrary position can be selected.

If "No" is selected, the work route generation device 150 displays a warning of the possibility of collision on the display device 113.

A setting of the travel end position Gr can be automatically updated in the middle of work by the work route generation device 150 in consideration of a travel position of the travel work vehicle 100, or alternatively, an operator can modify the setting as appropriate in the middle of work.

Once items of the route generation setting are set, route generation setting is displayed, and "route setting button," "transfer data," and "return home" are selectively displayed on a lower portion of the setting.

In transferring the information, the information can be transferred by touching the data transfer button 204 on the initial screen. This transfer is performed by the remote control device 112, and thus, the set information needs to be transferred to the control section 30 of the autonomous travel work vehicle 1. This transfer can be performed by (1) transfer with terminals or (2) transfer wirelessly. In this embodiment, in the case of using terminals, an USB cable is used to directly connect the remote control device 112 to the control section 30 of the autonomous travel work vehicle 1, or the information is temporarily stored in a USB memory and then the USB memory is connected to a USB terminal of the autonomous travel work vehicle 1 and the information is transferred. In the case of transfer wirelessly, the information is transferred with a wireless LAN.

Here, it will be described how the autonomous travel work vehicle 1 according to one embodiment of the present invention is caused to autonomously travel to the work start position Sw.

As illustrated in FIG. 1, the autonomous travel work vehicle 1 according to one embodiment of the present invention includes the body part 2 and the work machine 24 attached to the body part 2, and as illustrated in FIGS. 1 and 2, also includes the moving GPS antenna 34 serving as a position detecting section configured to detect positional information on the body part 2.

In addition, the autonomous travel work vehicle 1 also includes the control section 30 that can control travel of the body part 2 and work with the work machine 24 on the field H as a travel region. The control section 30 includes the memory 309 serving as a memory section configured to store the shape, position, size, and so forth of the field H as a travel region where the body part 2 travels. Part of the following description where the control section 30 appears, the description refers to FIG. 2.

The autonomous travel work vehicle 1 is configured as a work vehicle in which data of the work route Ra and the travel route Rb generated by the remote control device 112 is transferred to the control section 30 and is stored in the memory 309, and the vehicle can autonomously travel along the work route Ra and the travel route Rb while detecting the current position Z of the body part 2 with the moving GPS antenna 34. The current position Z of the autonomous travel work vehicle 1 coincides with the position of the moving GPS antenna 34 in general.

Figure 6:
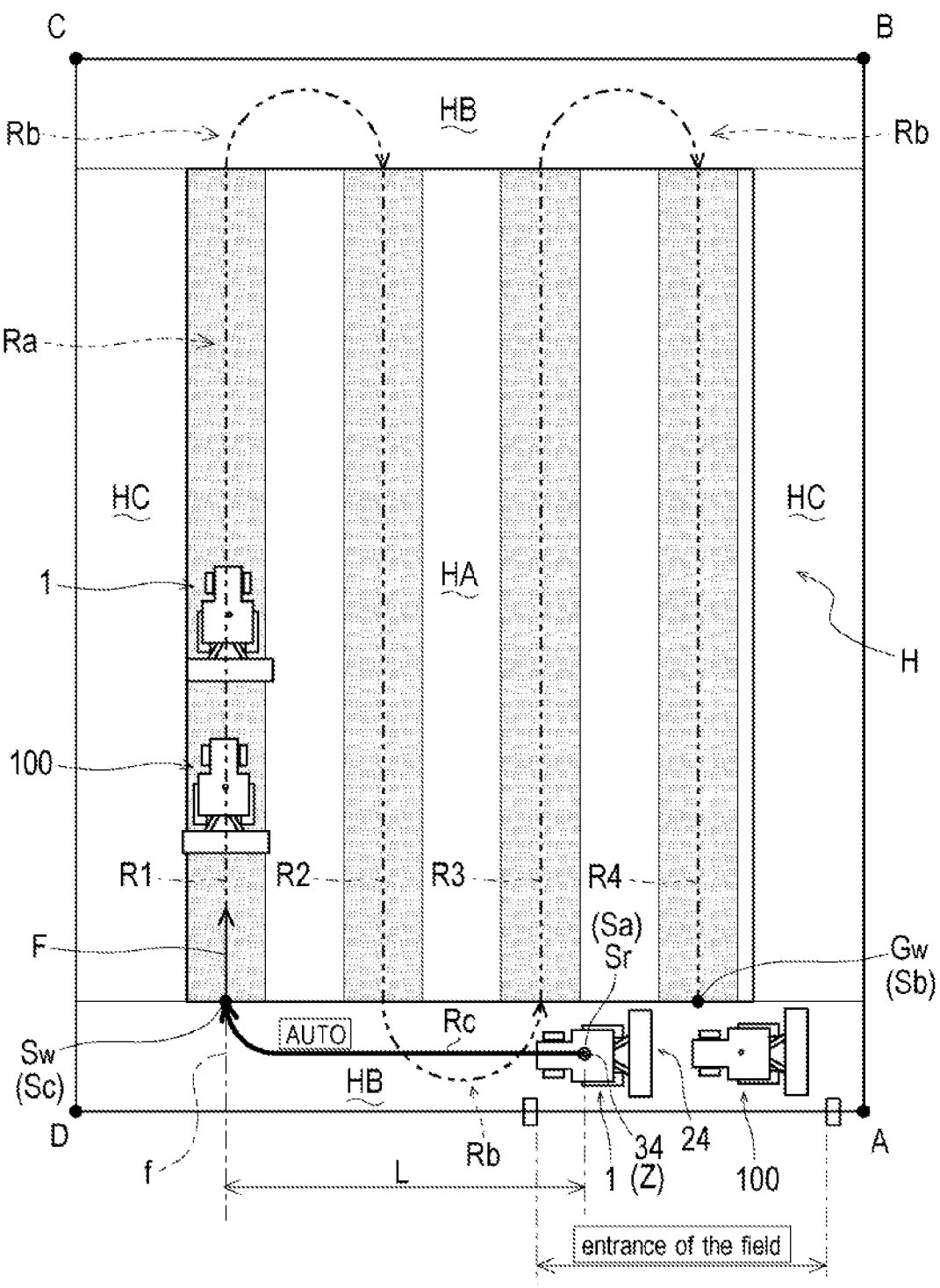
FIG. 6 is an illustration of a situation where autonomous travel of the autonomous travel work vehicle starts.

The autonomous travel work vehicle 1 described in this embodiment uses a substantially rectangular field H as illustrated in FIG. 6 as a travel region, and is configured to autonomously travel on the work region HA as a first region, the headlands HB and the side margins HC as second regions. The work region H, the headlands HB, and the side margins HC constitute the field H. The travel work vehicle 100 travels by an operation of an operator following (or accompanying) the autonomous travel work vehicle 1 autonomously traveling on the field H as a travel region, and is caused to travel by an operation of the operator.

The autonomous travel work vehicle 1 is configured to autonomously travel by the control section 30 in a case where the current position Z is located within the field H. On the other hand, the autonomous travel work vehicle 1 is configured not to autonomously travel by the control section 30 outside the field H (e.g., a public road).

The autonomous travel work vehicle 1 is also configured to autonomously travel by the control section 30 in a case where the current position Z is located at the travel start position Sr.

The autonomous travel work vehicle 1 can be configured in such a manner that when the operator presses the work start button 205 (see FIG. 3) to issue an instruction "start work" with the current position Z being located at the travel start position Sr on the headland HB, the control section 30 causes the vehicle 1 to autonomously travel from the current position Z to the work start position Sw as shown in FIG. 6 and, after having reached the work start position Sw, work with the work machine 24 (see FIGS. 1 and 2) starts.

In this manner, the autonomous travel work vehicle 1 is configured to start autonomously travel at a position away from the work start position Sw. Thus, in such a case where an entrance of the field H is away from the work start position Sw, a labor on the operator in moving can be reduced, and further, efficiency of work using the autonomous travel work vehicle 1 can be enhanced.

Based on setting results of the tractor setting, the field setting, and the route generation setting described above, the remote control device 112 generates the work route Ra and the travel route Rb.

The remote control device 112 can generate the route R including the work route Ra and the travel route Rb from the travel start position Sr to the travel end position Gr set in the field setting, and can transmit information on the route R to the autonomous travel work vehicle 1. Then, the autonomous travel work vehicle 1 (control section 30) that has acquired the information on the route R compares the current position Z and the azimuth angle of the autonomous travel work vehicle 1 with the travel start position Sr and the work direction F. If the difference is within a predetermined deviation, autonomous travel can start.

Figure 7:
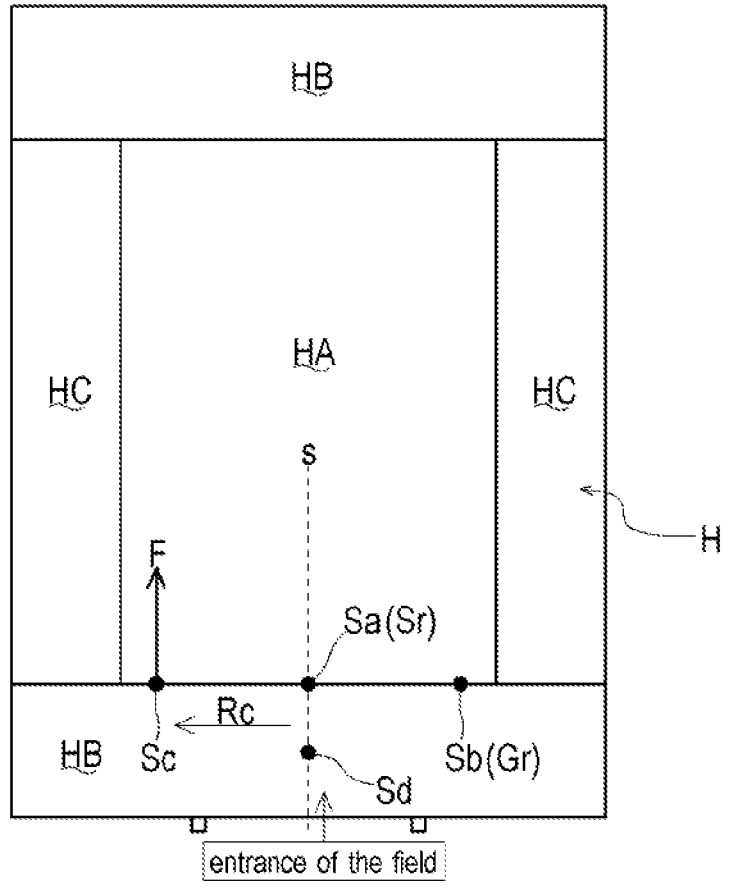
FIG. 7 is an illustration showing a relationship between a travel start position of the autonomous travel work vehicle and a field.
Figure 7:
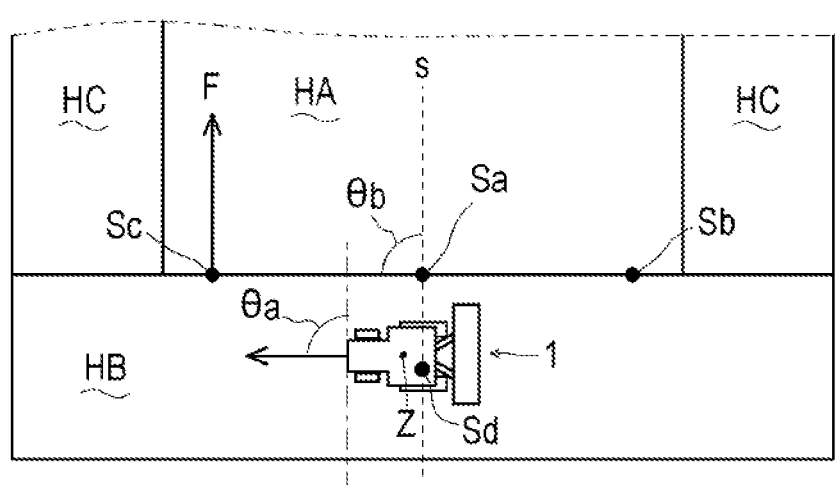

Here, as illustrated in FIG. 7, description is directed to a case where the entrance of the field H is located near substantially the center of the lateral width of the field H, a user (operator) selects a point Sa near substantially the center of the lateral width of the field H as the travel start position Sr in the field setting, and selects a point Sb as the travel end position Gr.

In this case, the remote control device 112 generates a route R from the point Sa to the point Sb. In general, the route R is generated from the point Sa to the point Sb. In a case where the point Sa is near substantially the center of the lateral width of the field H, it is necessary to also generate a route from the point Sa to the direction opposite to the point Sb, and route generation becomes complex. In a case where the travel work vehicle 100 performs work in cooperation with the autonomous travel work vehicle 1, it is difficult for the operator of the travel work vehicle 100 to predict a route on which the vehicle next travels.

In view of this, in the autonomous travel work vehicle 1 according to one embodiment of the present invention, when a point except corners of the field H (e.g., the point Sa) is specified as the travel start position Sr in field setting, the operator is encouraged to select whether to "perform autonomous travel with farm work from a point Sc to the point Sb after autonomously travel is performed without farm work from the point Sa to the point Sc" or not.

As illustrated in FIG. 6, only in a case where a distance L between the point Sa and the point Sc is greater than or equal to a predetermined set value β (e.g., set value β=10 m), whether to "perform autonomous travel with farm work from the point Sc to the point Sb after autonomously travel is performed without farm work from the point Sa to the point Sc" or not is selected. With this configuration, the operator can perform autonomous travel only by bringing the autonomous travel work vehicle 1 into the field H near the entrance without operating the autonomous travel work vehicle 1 to the work start position Sw. Thus, the distance of movement of the operator can be reduced so that work efficiency can be enhanced.

On the other hand, if the distance L is less than the predetermined set value β, "to perform autonomous travel with farm work from the point Sc to the point Sb after travel by an operation by the operator from the point Sa to the point Sc" may be selected. This is because if the distance L is small, a burden on a user is small.

The time of the selection is not limited to the time described above (i.e., field setting), and may be a predetermined timing after end of the field setting, for example, after the route R from the point Sa to the point Sb is generated and presented to the user (e.g., the simulation image described above is displayed).

If the user selects "to perform autonomous travel with farm work from the point Sc to the point Sb after travel by an operation by the operator from the point Sa to the point Sc," the remote control device 112 generates a route R including the travel route Rc from the point Sa to point Sc in addition to the work route Ra and the travel route Rb as illustrated in FIG. 6.

On the other hand, if the user selects "to perform autonomous travel with farm work from the point Sc to the point Sb after travel by an operation by the operator from the point Sa to the point Sc," the remote control device 112 generates a route R including the work route Ra and the travel route Rb and not including the travel route Rc.

That is, the autonomous travel work vehicle 1 that is a work vehicle according to one embodiment of the present invention includes: the body part 2; the work machine 24 attached to the body part 2, the moving GPS antenna 34 as the position detecting section configured to detect positional information on the body part 2; the memory 309 as the memory section configured to store the field H as the travel region where the body part 2 travels; and the control section 30 configured to control travel of the body part 2 and work with the work machine 24 on the field H. The field H includes the work region HA as the first region including the work route Ra where work is conducted with the work machine 24 and the headland HB as the second region set around the work region HA. The control section 30 is configured to cause the body part 2 to travel from the current position Z of the body part 2 to the work start position Sw as the start point of the work route Ra and then to start work with the work machine 24 in a case where the start of work with the work machine 24 is instructed on the headland HB.

This configuration can eliminate the necessity for placing the autonomous travel work vehicle 1 to the work start position Sw by an operation by the operator so that efficiency in work conducted with the autonomous travel work vehicle 1 can be enhanced.

In the case of performing autonomous travel along the route R including the travel route Rc, as illustrated in FIG. 7, the current position Z and the azimuth angle $\theta a$ of the autonomous travel work vehicle 1 are compared with an angle $\theta b$ formed by a line connecting a point Sd on an imaginary start line s parallel to a work direction F passing through the point Sa, the point Sa, and the point Sc and the imaginary start line s (where the angle $\theta b$ is 90 degrees). If the difference obtained by the comparison is less than or equal to a predetermined deviation, autonomous travel can be started. Here, the predetermined deviation means that a distance L1 between the current position Z and the point Sd is less than or equal to a predetermined set value $\alpha$ (e.g., predetermined set value $\alpha=1$ m), and the difference between the azimuth angle $\theta a$ and the angle $\theta b$ is a predetermined set value $\varepsilon$ (e.g., predetermined set value $\varepsilon=15$ degrees).

Next, description will be given on automatic travel conducted in a case where the point Sc is selected as the travel start position Sr in field setting or a case where the point Sa is selected as the travel start position Sr but travel by an operation of the operator is performed from the point Sa to the point Sc.

It has not been taken into consideration to date that the orientation of a work vehicle at the work start position Sw affects the travel accuracy (eventually work accuracy) of the work vehicle. Thus, with a conventional technique, an actual travel trajectory of a work vehicle can be deviated from a set travel route Rb in some cases depending on the orientation of the work vehicle at the work start position Sw, and it is sometimes difficult to obtain work accuracy by a work vehicle that can autonomously travel.

The autonomous travel work vehicle 1 according to one embodiment of the present invention is configured in consideration of an effect of the orientation (azimuth angle) of the autonomous travel work vehicle 1 on travel accuracy (eventually work accuracy) in generating a route by the control section 30.

The autonomous travel work vehicle 1 is configured such that when the current position Z is located at the travel start position Sr on the headland HB and an instruction of work start is issued, the control section 30 can determine whether to start autonomous travel or not in consideration of the azimuth angle of the autonomous travel work vehicle 1 at the current position Z.

Figure 8:
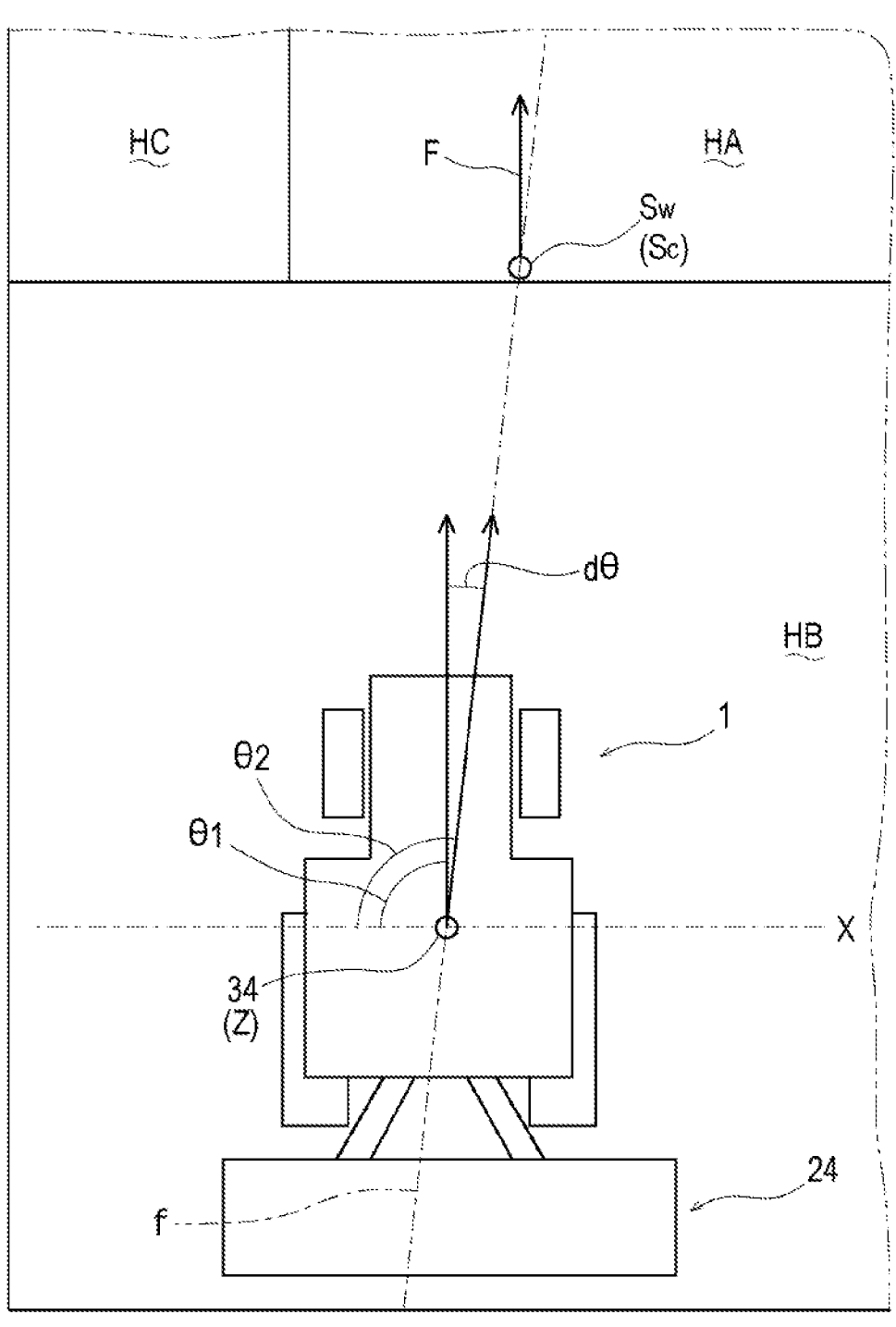
FIG. 8 is an illustration showing a determination situation using an azimuth angle at start of autonomous travel of the autonomous travel work vehicle to the work start position.

The autonomous travel work vehicle 1 is configured such that the control section 30 can calculate an angle difference $d\theta$ between an azimuth angle $\theta 1$ of the autonomous travel work vehicle 1 relative to a reference orientation X and an azimuth angle $\theta 2$ of the autonomous travel work vehicle 1 at the current position Z relative to the work start position Sw, as illustrated in FIG. 8, and if the calculated angle difference $d\theta$ is less than a predetermined threshold, the vehicle 1 is allowed to autonomously travel from the current position Z to the work start position Sw.

In the autonomous travel work vehicle 1, when the operator presses the work start button 205 (see FIG. 3) with the current position Z being located within the headland HB, the azimuth angle detecting section 32 (see FIG. 2) detects an azimuth angle $\theta 1$ at the current position Z with respect to the reference orientation X, the control section 30 calculates an azimuth angle $\theta 2$ with respect to the work start position Sw from the current position Z and calculates an angle difference $d\theta$ between the azimuth angles $\theta 1$ and $\theta 2$.

The autonomous travel work vehicle 1 can be configured such that if the angle difference $d\theta$ is less than a predetermined threshold (e.g., less than 10°), the control section 30 allows the autonomous travel work vehicle 1 to autonomously travel from the current position Z to the work start position Sw.

That is, the autonomous travel work vehicle 1 as a work vehicle according to one embodiment of the present includes the azimuth angle detecting section 32 configured to detect an azimuth angle of the body part 2, and the control section 30 does not allow the body part 2 to travel from the current position Z to the work start position Sw unless the angle difference $d\theta$ between the azimuth angle $\theta 1$ of the body part 2 and the azimuth angle $\theta 2$ with respect to the work start position Sw from the current position Z is within the predetermined threshold.

In this manner, with the configuration in which the body part 2 is allowed to autonomously travel if the angle difference $d\theta$ of the azimuth angle $\theta 1$ of the body part 2 from the azimuth angle $\theta 2$ is within the predetermined threshold, an error in the current position Z of the body part 2 with respect to the set work start position Sw can be reduced.

Figure 9:
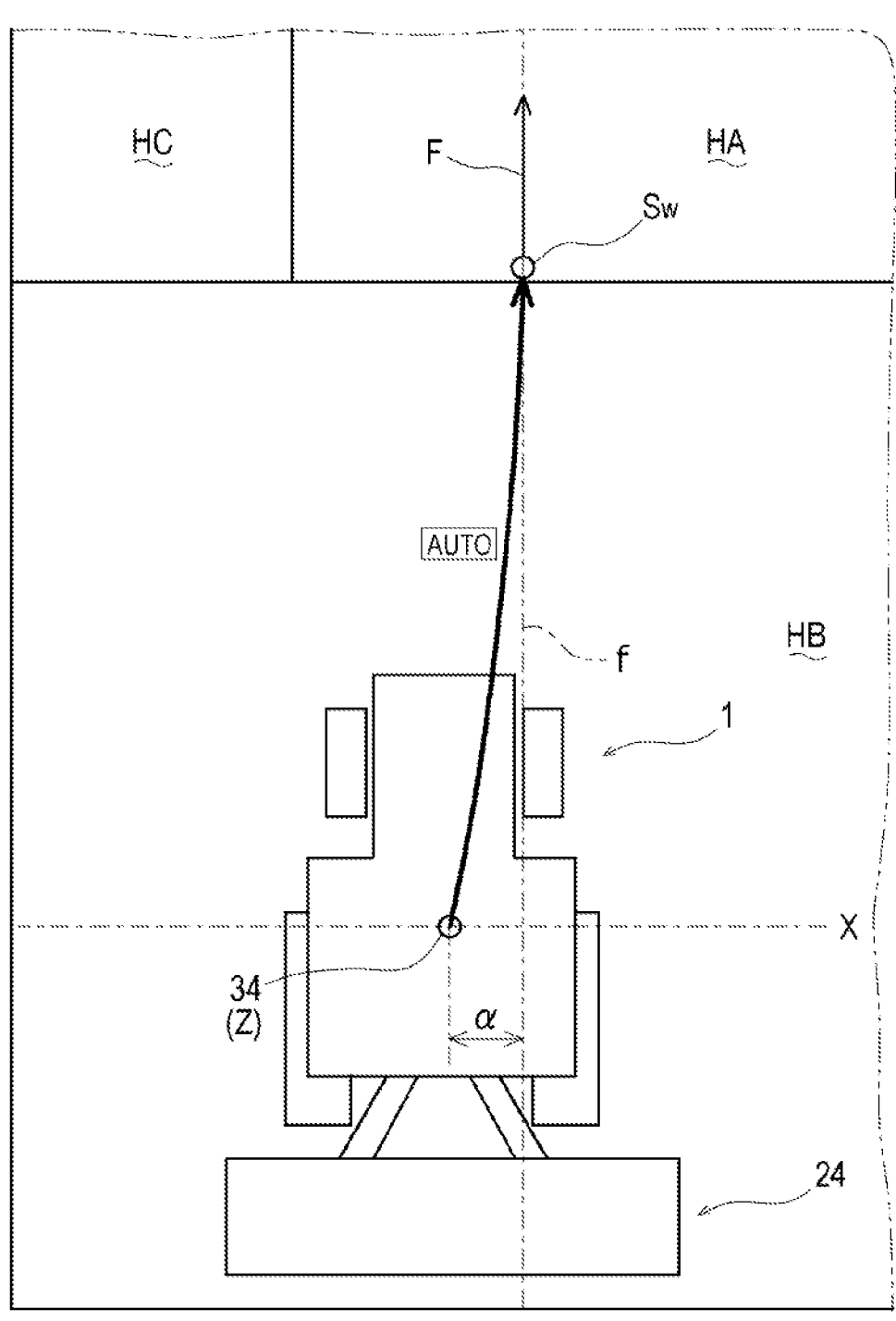
FIG. 9 is an illustration of an autonomous travel situation of the autonomous travel work vehicle to the work start position (in a case where a deviation α is a threshold or less).

In addition, the autonomous travel work vehicle 1 can be configured such that as illustrated in FIG. 9, the control section 30 specifies an imaginary extension line f obtained by extending the first work route R1 including the work start position Sw toward the headland HB, and if the current position Z relative to the imaginary extension line f is within a predetermined deviation, the control section 30 allows the autonomous travel work vehicle 1 to autonomously travel. The imaginary extension line f is directed to the work direction F at the work start position Sw, and coincides with the direction of the first work route R1.

The "deviation" here refers to the degree of a shift of the current position Z from the imaginary extension line f, and specifically a distance from the current position Z to the imaginary extension line f.

That is, the autonomous travel work vehicle 1 is configured such that if the current position Z is within the headland HB and an instruction of work start is issued, the control section 30 determines whether autonomous travel is started or not in consideration of a deviation of the current position Z form the imaginary extension line f.

Specifically, in the autonomous travel work vehicle 1, as illustrated in FIG. 9, if the deviation of the current position Z from the imaginary extension line f is within the predetermined deviation α (e.g., the deviation α is less than or equal to 1 m), the control section 30 allows the autonomous travel work vehicle 1 to autonomously travel form the current position Z to the work start position Sw.

The autonomous travel work vehicle 1 is configured such that the control section 30 controls travel of the body part 2 so as to reduce the deviation α of the current position Z from the specified imaginary extension line f.

That is, in the autonomous travel work vehicle 1 as a work vehicle according to one embodiment of the present invention, the work route Ra includes the first work route R1 including the work start position Sw, and the control section 30 specifies the imaginary extension line f as an imaginary route obtained by extending the first work route R1 to the headland HB, and if the current position Z is within the predetermined deviation α from the imaginary extension line f, travel of the body part 2 is controlled to reduce the deviation so that the body part 2 can travel from the current position Z to the work start position Sw.

This configuration can reduce an error in the current position Z relative to the work start position Sw when the body part 2 reaches the work start position Sw.

Figure 10:
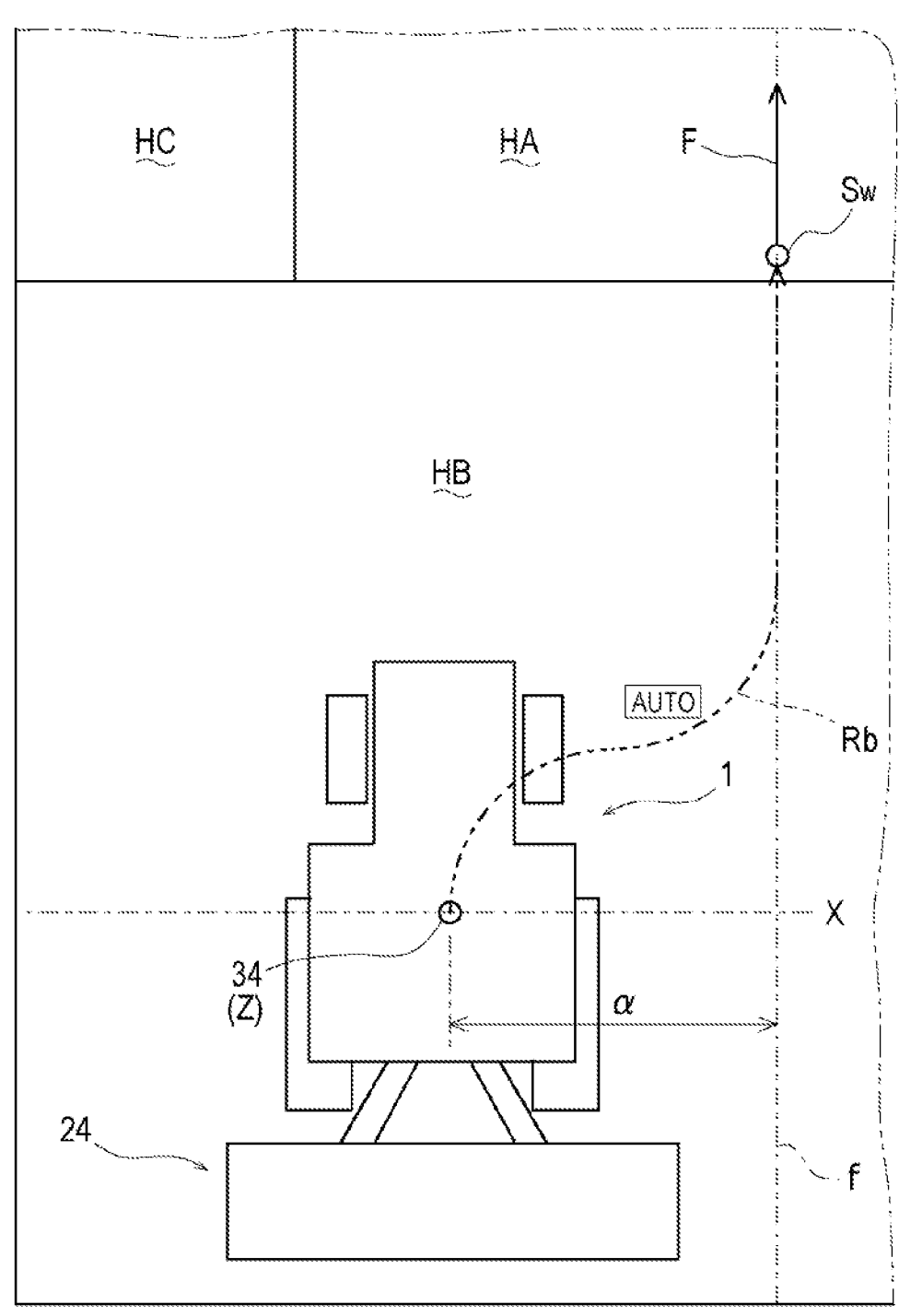
FIG. 10 is an illustration of an autonomous travel situation of the autonomous travel work vehicle to the work start position (in a case where the deviation α exceeds the threshold).

In the autonomous travel work vehicle 1, as illustrated in FIG. 10, if the deviation of the current position Z from the imaginary extension line f is out of the predetermined deviation α (e.g., deviation α>1 m), the control section 30 does not allow the autonomous travel work vehicle 1 to continue autonomous travel.

If the deviation of the current position Z from the imaginary extension line f is out of the predetermined deviation α, the autonomous travel work vehicle 1 can additionally generate a travel route Rb from the current position Z to the work start position Sw so that the body part 2 is allowed to autonomously travel along the additional travel route Rb.

That is, in the autonomous travel work vehicle 1 as a work vehicle according to the embodiment of the present invention, the work route Ra includes the first work route R1 including the work start position Sw, and the control section 30 specifies the imaginary extension line f as an imaginary route obtained by extending the first work route R1 to the headland HB, and if the current position Z is out of a predetermined deviation from the imaginary extension line f, a travel route Rb from the current position Z to the work start position Sw is generated so that the body part 2 can travel along the travel route Rb.

With this configuration, in a case where the current position Z of the body part 2 is away from the work start position Sw, the autonomous travel work vehicle 1 can be placed at the work start position Sw without manned travel to the work start position Sw by the operator, and thus, a burden on the operator in placing the autonomous travel work vehicle 1 at the work start position Sw can be saved.

To reduce the deviation α of the current position Z from the imaginary extension line f, a longer route from the current position Z to the work start position Sw is more advantageous.

Here, a method for setting the travel start position Sr will be described.

Figure 11:
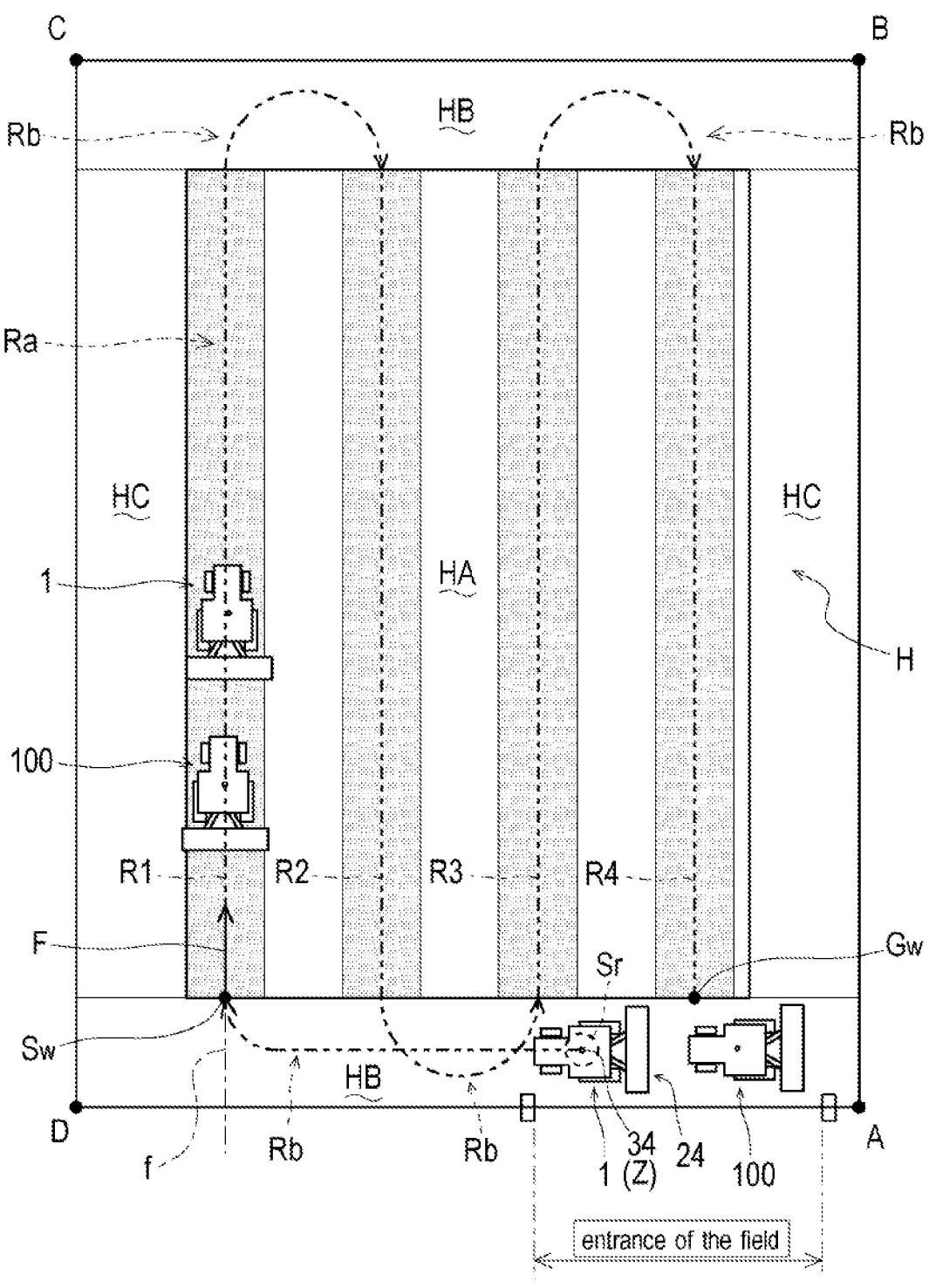
FIG. 11 is an illustration of a setting situation of an autonomous travel start position in the autonomous travel work vehicle.

In the autonomous travel work vehicle 1, as illustrated in FIG. 11, the control section 30 can set the travel start position Sr at which the autonomous travel work vehicle 1 can start autonomous travel within the field H.

The autonomous travel work vehicle 1 is configured such that the control section 30 allows autonomous travel to start if the current position Z coincides with the travel start position Sr.

Since the current position Z of the autonomous travel work vehicle 1 coincides with the position of the moving GPS antenna 34 in general, when the position of the moving GPS antenna 34 coincides with the travel start position Sr, the control section 30 can start autonomous travel.

The autonomous travel work vehicle 1 is configured to display the travel start position Sr and the current position Z on the display device 113. The operator operates and drives the autonomous travel work vehicle 1 in such a manner that the travel start position Sr and the current position Z coincide with each other, while checking the display device 113. Accordingly, positioning of the autonomous travel work vehicle 1 relative to the travel start position Sr can be easily performed.

As illustrated in FIG. 11, the travel start position Sr is preferably set on the headland HB.

The travel start position Sr is more preferably set at a position on the headland HB and away from the work start position Sw as far as possible.

This is because when the travel start position Sr is away from the work start position Sw as far as possible, while the autonomous travel work vehicle 1 autonomously travels from the travel start position Sr to the work start position Sw, a margin for correcting the azimuth angle and the posture of the autonomous travel work vehicle 1 arises.

In addition, the travel start position Sr more preferably specifies the imaginary extension line f with the control section 30 and is located away from the work region HA of the headland HB as far as possible on the imaginary extension line f.

This is because when the autonomous travel work vehicle 1 is placed on the imaginary extension line f, while the autonomous travel work vehicle 1 autonomously travels from the travel start position Sr to the work start position Sw, the azimuth angle and the posture of the autonomous travel work vehicle 1 can be more accurately corrected.

Figure 12:
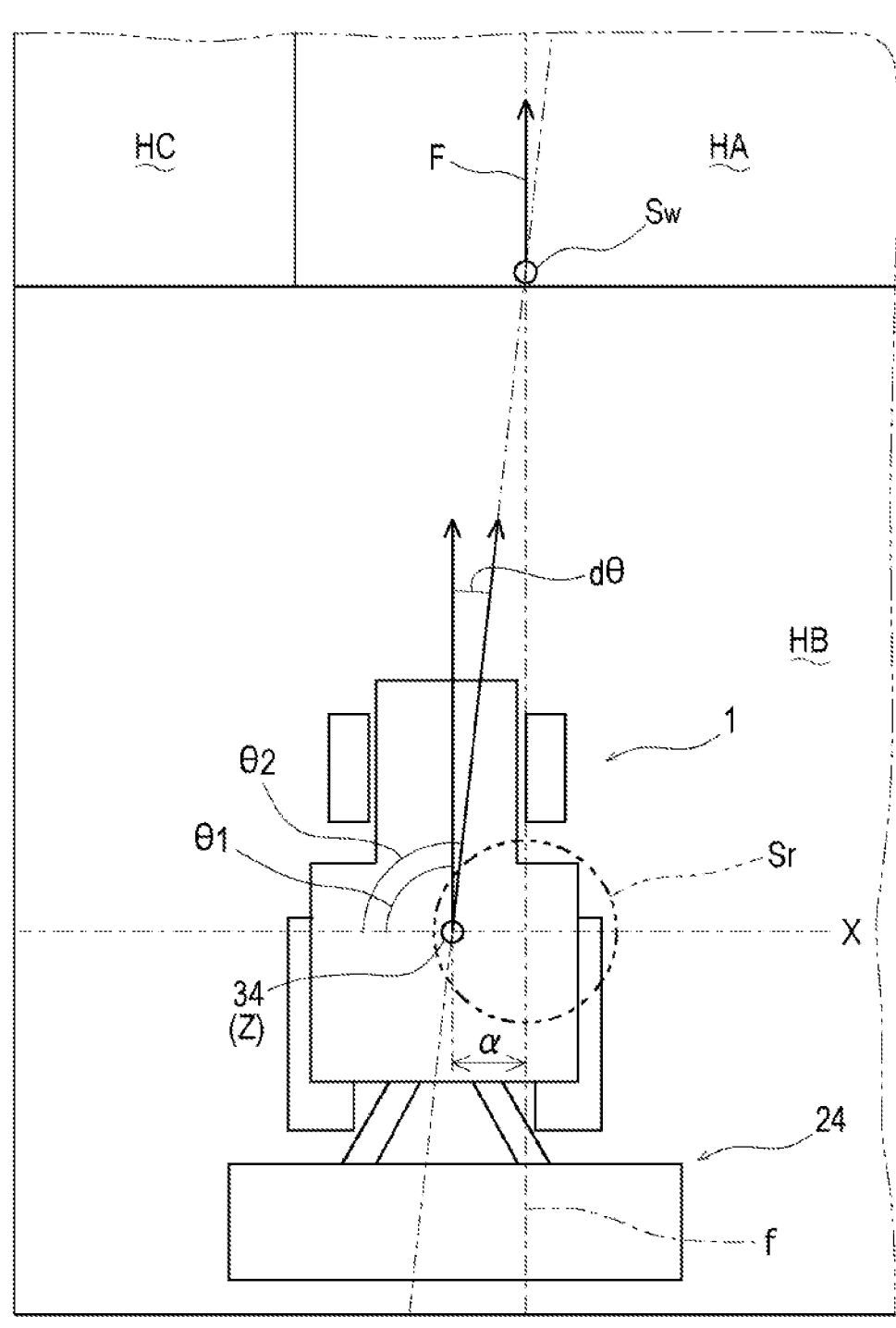
FIG. 12 is an illustration of a setting situation of the autonomous travel start position in consideration of the azimuth angle and the deviation in the autonomous travel work vehicle.

As illustrated in FIG. 12, the autonomous travel work vehicle 1 can be configured such that the control section 30 can set the travel start position Sr in consideration of the azimuth angles θ1 and θ2 and the deviation α of the current position Z from the imaginary extension line f, for example. Accordingly, only by placing the autonomous travel work vehicle 1 at the travel start position Sr, the azimuth angle and the posture of the autonomous travel work vehicle 1 at the work start position Sw can be adjusted so that accuracy of work by the autonomous travel work vehicle 1 can be enhanced.

In the autonomous travel work vehicle 1, the distance between the travel start position Sr and the work start position Sw is preferably as large as possible in order to help reduction of the deviation α of the current position Z from the specified imaginary extension line f and help reduction of the angle difference dθ.

In setting the travel start position Sr, in consideration of the size, shape, and so forth of the work machine 24, the travel start position Sr is preferably set as far as possible from the work region HA on the headland HB as long as the work machine 24 does not travel out of the headland HB.

In the autonomous travel work vehicle 1, the control section 30 can set the travel route Rb so that the body part 2 travels in the headland HB between the travel start position Sr and the work start position Sw. Accordingly, the autonomous travel work vehicle 1 can be placed in the work start position Sw without damaging the work region HA.

Figures 13A, 13B, 13C:
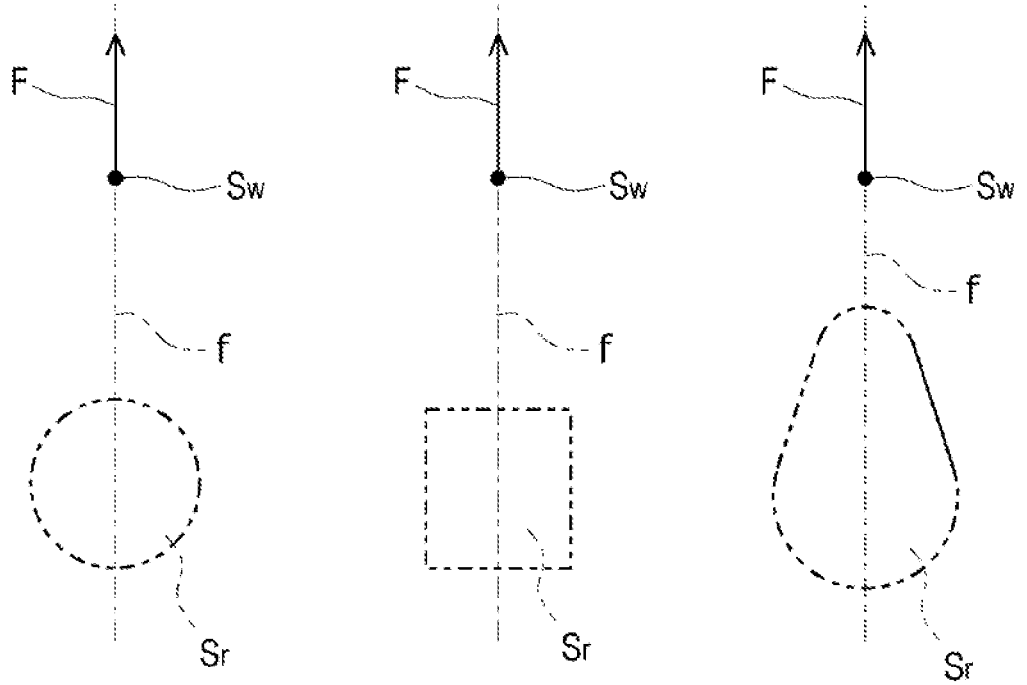
FIGS. 13A, 13B, and 13C are illustrations of setting shapes of the autonomous travel start position where the shape becomes narrower toward (FIG. 13A) a circle, (FIG. 13B) a rectangle, and (FIG. 13C) a work region.

As illustrated in FIGS. 11 and 13(A), the autonomous travel work vehicle 1 sets the travel start position Sr as a "region" having a predetermined area.

If the travel start position Sr is set as a "point," high positioning accuracy is required for matching the current position Z with the travel start position Sr so that positioning of the autonomous travel work vehicle 1 at the travel start position Sr is difficult.

Thus, the autonomous travel work vehicle 1 is configured such that the travel start position Sr is set as a "region" so that required accuracy in positioning is reduced so that the autonomous travel work vehicle 1 can be easily positioned at the travel start position Sr.

Specifically, as illustrated in FIG. 13A, the autonomous travel work vehicle 1 can set the travel start position Sr as a "circular region." In this case, the "region" as the travel start position Sr can be easily set only by specifying a center point and a radius of the travel start position Sr.

The radius of the "circular region" in this case is preferably a radius less than or equal to an initial tolerance allowed at the work start position Sw, and accordingly, the positioning accuracy at the work start position Sw can be obtained.

The "region" as the travel start position Sr is set as a "circular region" having a predetermined radius about a point specified by the operator. When the moving GPS antenna 34 of the autonomous travel work vehicle 1 is disposed within this "region," the autonomous travel work vehicle 1 is determined to be placed at the travel start position Sr.

With this configuration, the autonomous travel work vehicle 1 can be easily placed at the travel start position Sr.

When the "region" set as the travel start position Sr is set within the headland HB, it is possible to prevent the autonomous travel work vehicle 1 from autonomously traveling outside the field H.

The shape of the "region" set as the travel start position Sr is not limited to a circle, and as illustrated in FIG. 13B, for example, may be a polygon (a rectangle in this example), and as illustrated in FIG. 13C, may also be a shape whose lateral width gradually decreases toward the work start position Sw.

Next, setting of the travel end position Gr in the autonomous travel work vehicle 1 according to one embodiment of the present invention will be described. Part of the following description where the work route generation device 150 appears, the description refers to FIG. 2 as appropriate.

Figure 14:
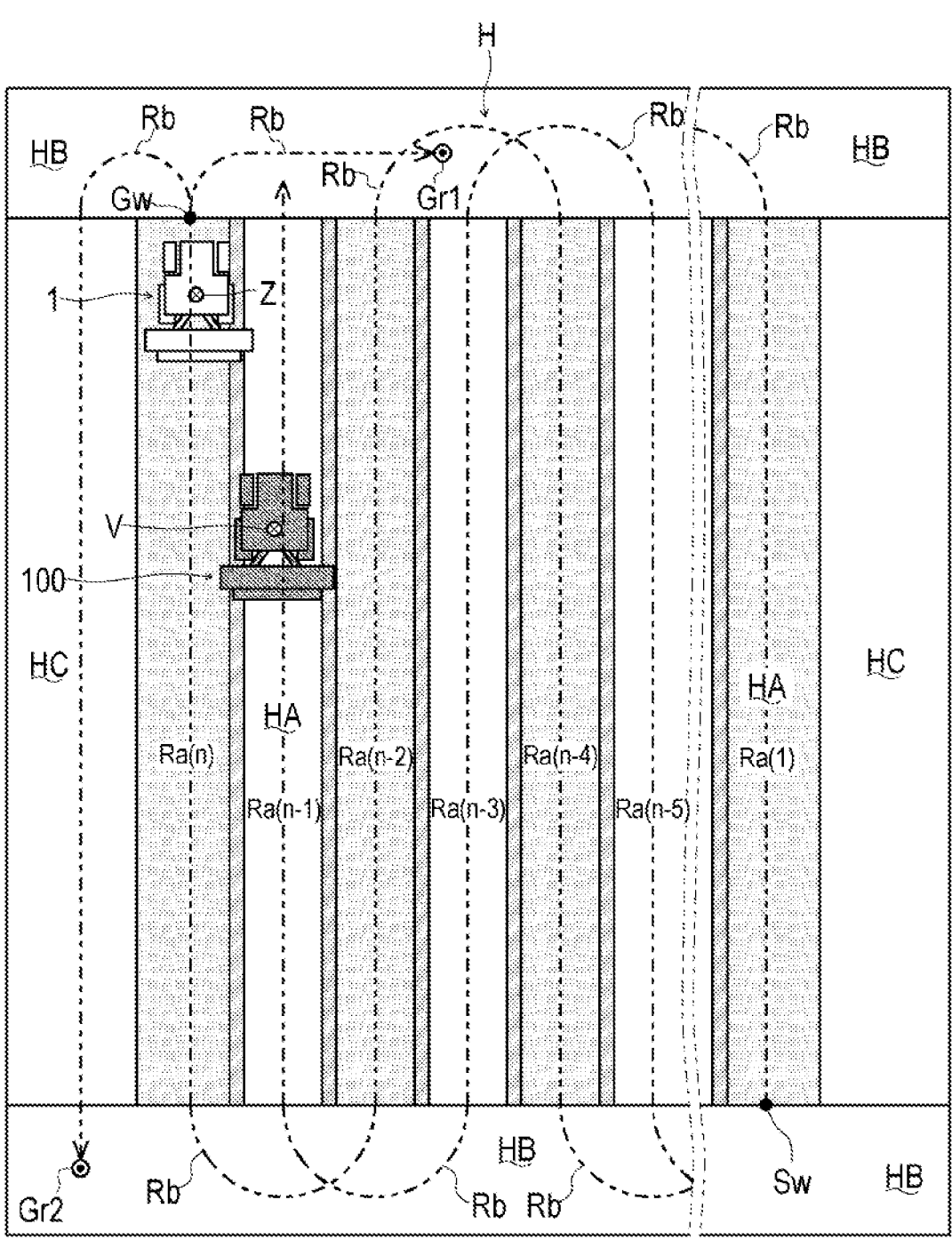
FIG. 14 is an illustration of a setting situation of a travel end position to the autonomous travel work vehicle.

The autonomous travel work vehicle 1 described in this embodiment uses a substantially rectangular field H as illustrated in FIG. 14 as a travel region, and is configured to autonomously travel on the work region HA as a first region, the headlands HB and the side margins HC as second regions. The work region H, the headlands HB, and the side margins HC constitute the field H. The travel work vehicle 100 travels by an operation of an operator, while following the autonomous travel work vehicle 1 that autonomously travels on the field H.

In this embodiment, as illustrated in FIG. 14, the work route generation device 150 constituting the autonomous travel work vehicle 1 forms n work routes Ra in the work region HA, and forms travel routes Rb where the autonomous travel work vehicle 1 and the travel work vehicle 100 travel on the headlands HB and the side margins HC. In FIG. 14, the n-th work route Ra is represented as Ra(n), for example, so as to identify the order of the work route Ra.

The autonomous travel work vehicle 1 is configured such that the work route generation device 150 can set the travel end position Gr on the headland HB. By setting the travel end position Gr on the headland HB, the autonomous travel work vehicle 1 can prevent autonomous travel of the autonomous travel work vehicle 1 outside the field H.

In this embodiment, the case of setting the travel end position Gr of the autonomous travel work vehicle 1 is set on the headland HB is described as an example. The travel end position Gr of the autonomous travel work vehicle 1 only needs to be set in a region except the work region HA on the field H and may be set on the side margin HC.

In a conventional technique, in setting the travel end position Gr of the autonomous travel work vehicle 1, the work route Ra, the travel route Rb, and so forth of the travel work vehicle 100 are not taken into consideration. Thus, the travel end position Gr is sometimes set at a position on the headland HB as illustrated in FIG. 15, that is, at a position near the travel route Rb on which the travel work vehicle 100 is to travel.

Figure 15:
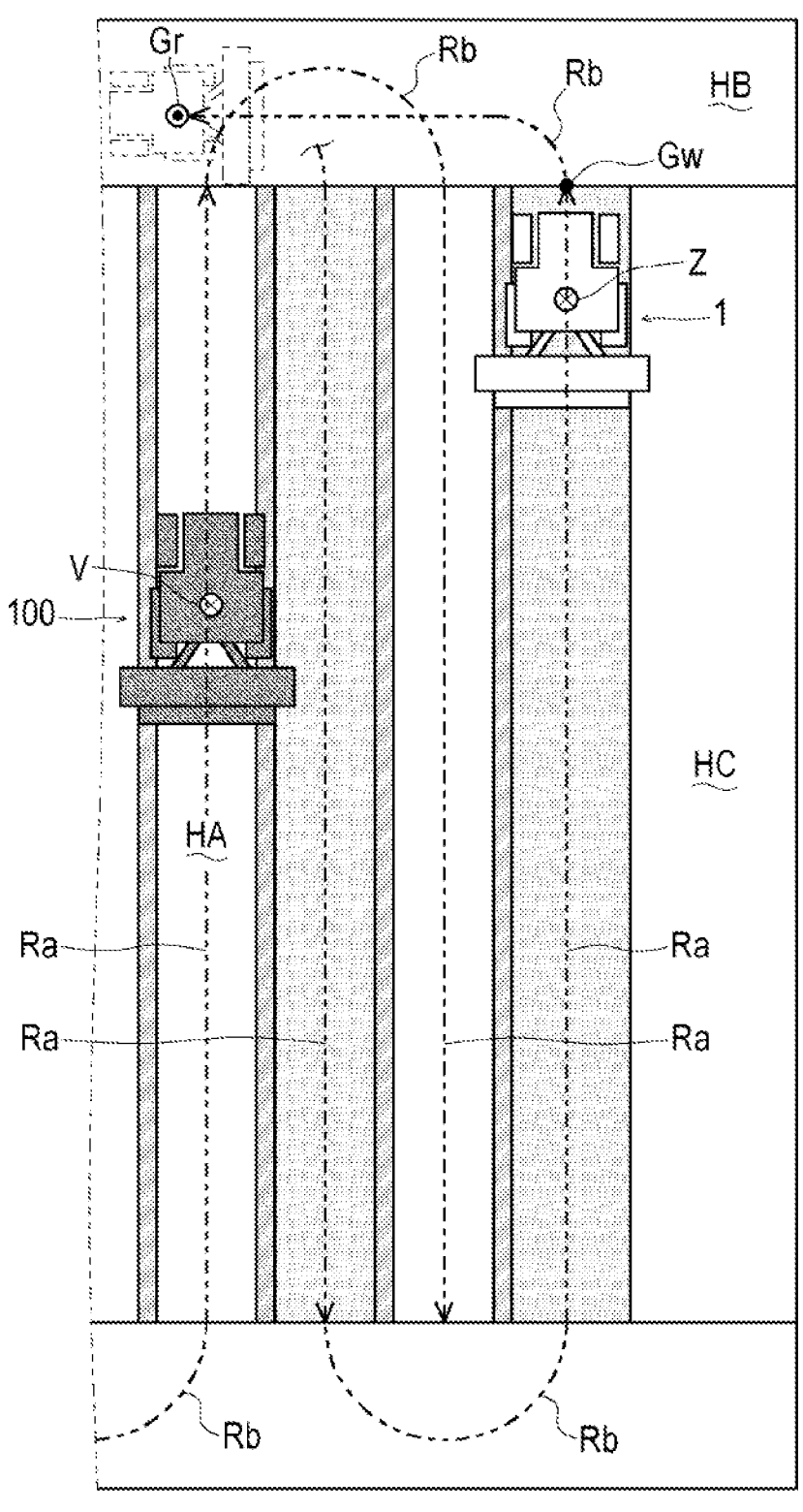
FIG. 15 is an illustration of a setting situation of a conventional travel end position to the autonomous travel work vehicle.

If the travel end position Gr is set at such a position as indicated in FIG. 15, when the travel work vehicle 100 travels along the travel route Rb, the autonomous travel work vehicle 1 stationary on the travel end position Gr can be an obstacle, disadvantageously.

In view of this, the autonomous travel work vehicle 1 according to one embodiment of the present invention is configured such that the work route generation device 150 can set the travel end position Gr of the autonomous travel work vehicle 1 in consideration of the work route Ra and the travel route Rb of the travel work vehicle 100.

In the embodiment illustrated in FIG. 14, the autonomous travel work vehicle 1 is configured to conduct work on every other work route Ra to the n-th work route Ra(n) in the n work routes Ra, Ra, . . . generated by the work route generation device 150. In the autonomous travel work vehicle 1, when the current position Z of the autonomous travel work vehicle 1 matches the work end position Gw set as a terminal point of the n-th work route Ra(n), the control section 30 completes work by the work machine 24 and causes the body part 2 to autonomously travel to the travel end position Gr.

That is, in the autonomous travel work vehicle 1 according to one embodiment of the present invention, the control section 30 causes the body part 2 to travel from the work end position Gw to the travel end position Gr on the headland HB as the second region.

In the autonomous travel work vehicle 1 having the configuration described above, the travel end position Gr of the autonomous travel work vehicle 1 can be set at a position at which the vehicle 1 does not inhibit work by the travel work vehicle 100 so that efficiency in work of the accompanying travel work vehicle 100 can be enhanced.

The travel work vehicle 100 is configured to conduct work on every other work route Ra to the work route Ra(n-1) preceding, by one route, the n-th work route Ra(n) in n work routes Ra, Ra, . . . formed by the work route generation device 150.

As illustrated in FIG. 14, in a last period of work on the work region HA, the autonomous travel work vehicle 1 sequentially travels from the work route Ra(n-4), to the travel route Rb, the work route Ra(n-2), the travel route Rb, and then the work route Ra(n) in this order. At the time when the vehicle 1 reaches the work end position Gw, work on the work route Ra(n) is completed, and the vehicle 1 autonomously travels toward the travel end position Gr on the headland HB.

On the other hand, as illustrated in FIG. 14, in a last period of work in the work region HA, the travel work vehicle 100 is operated by an operator and sequentially travels from the work route Ra(n−5) to the travel route Rb, the work route Ra(n−3), the travel route Rb, and then work route Ra(n−1) in this order while accompanying the autonomous travel work vehicle 1 autonomously traveling. At the time when work on the work route Ra(n−1) is completed, the vehicle 100 proceeds to finishing work on the headlands HB and the side margins HC.

That is, the autonomous travel work vehicle 1 according to one embodiment of the present invention includes: the body part 2; the work machine 24 attached to the body part 2; the moving GPS antenna 34 as the position detecting section configured to detect positional information on the body part 2; the memory 309 as the memory section configured to store the field H as the travel region where the body part 2 travels; the control section 30 configured to control travel of the body part 2 and work with the work machine 24 on the field H; and the remote control device 112 as the route generating section that generates the route R of the body part 2 on the field H. On the field H stored in the memory 309, the control section 30 allows the work vehicle to travel along the route R generated by the remote control device 112 while detecting the current position Z of the body part 2 by the moving GPS antenna 34. The field H includes the work region HA as the first region including the work route Ra where work is conducted with the work machine 24 and the headland HB as the second region not including the work route Ra where work is conducted with the work machine 24. The control section 30 enables the body part 2 to travel from the work end position Gw of the work route Ra to the travel end position Gr set in the headland HB, after work by the work machine 24 on the work route Ra is completed.

The work route generation device 150 according to one embodiment of the present invention includes: the moving GPS antenna 34 as the position detecting section configured to detect positional information on the body part 2; the memory 309 configured to store the field H as the travel region where the body part 2 travels; the control section 30 configured to instruct travel of the body part 2 and work with the work machine 24 attached to the body part 2 on the field H; and the remote control device 112 as the route generating section that generates the route R of the body part 2 on the field H. The field H includes the work region HA as the first region including the work route Ra where work is conducted with the work machine 24 and the headland HB as the second region not including the work route Ra. The remote control device 112 can generate the travel route Rb on which the body part 2 is caused to travel from the work end position Gw where work with the work machine 24 is completed on the work route Ra to the travel end position Gr set in the headland HB.

In the autonomous travel work vehicle 1 and the work route generation device 150 having the configurations described above, the travel end position Gr of the autonomous travel work vehicle 1 can be set at a position at which the vehicle 1 does not inhibit work by the travel work vehicle 100 so that efficiency in work of the accompanying travel work vehicle 100 can be enhanced.

Here, the autonomous travel work vehicle 1 is configured to select the travel end position Gr in consideration of the travel route Rb of the travel work vehicle 100 after work on the work route Ra(n−1) is completed. For example, if the travel work vehicle 100 is supposed to turn leftward on the headland HB, for example, a first travel end position Gr1 can be selected, or if the travel work vehicle 100 is supposed to turn rightward on the headland HB, a second travel end position Gr2 can be selected.

In the work route generation device 150 according to one embodiment of the present invention, the travel end position Gr can be set at different positions in the headland HB between a case where a work route Ra of another travel work vehicle 100 is a work route Ra accompanying right-rearward of the autonomous travel work vehicle 1 and a case where the work route Ra of another travel work vehicle 100 is a work route Ra accompanying left-rearward of the autonomous travel work vehicle 1.

In the work route generation device 150 according to one embodiment of the present invention, the travel end position Gr can be set at different positions (the travel end position Gr1 and the travel end position Gr2) in the headland HB between a case where a work route Ra of another travel work vehicle 100 is a work route Ra accompanying right-rearward of the autonomous travel work vehicle 1 and a case where the work route Ra of another travel work vehicle 100 is a work route Ra accompanying left-rearward of the autonomous travel work vehicle 1.

That is, in the work route generation device 150 according to one embodiment of the present invention, the remote control device 112 can set the travel end position Gr in the headland HB in accordance with the work end position Gw and a work route Ra of another travel work vehicle 100 that conducts work on the work region HA, and can set the travel end position Gr at different positions (the travel end position Gr1 and the travel end position Gr2) in the headland HB between a case where the work route Ra of another travel work vehicle 100 is the first work route Ra (supported to turn leftward) and a case where the work route Ra of another travel work vehicle 100 is the second work route Ra (supposed to turn rightward) different from the first work route Ra.

The autonomous travel work vehicle 1 having the configuration described above can help avoidance of prevention of travel of the accompanying travel work vehicle 100.

The autonomous travel work vehicle 1 is configured such that the work route generation device 150 can set the travel end position Gr on the travel route Rb where the travel work vehicle 100 has already passed on the headland HB, in consideration of the travel position V of the travel work vehicle 100 on the headland HB.

Specifically, the autonomous travel work vehicle 1 can specify the travel position V of the travel work vehicle 100, and specify a portion where the vehicle has already passed and a portion where the vehicle is to pass in the travel routes Rb of the travel work vehicle 100 on the headland HB. The travel end position Gr of the autonomous travel work vehicle 1 is not set on the travel route Rb where the travel work vehicle 100 is to travel.

The autonomous travel work vehicle 1 can be configured to update, in real time, information on a portion where the vehicle has already passed and a portion where the vehicle is to pass of the travel route Rb of the travel work vehicle 100 on the headland HB, and to change the travel end position Gr of the autonomous travel work vehicle 1 in accordance with the progress of the travel work vehicle 100 at any time.

Figure 16:
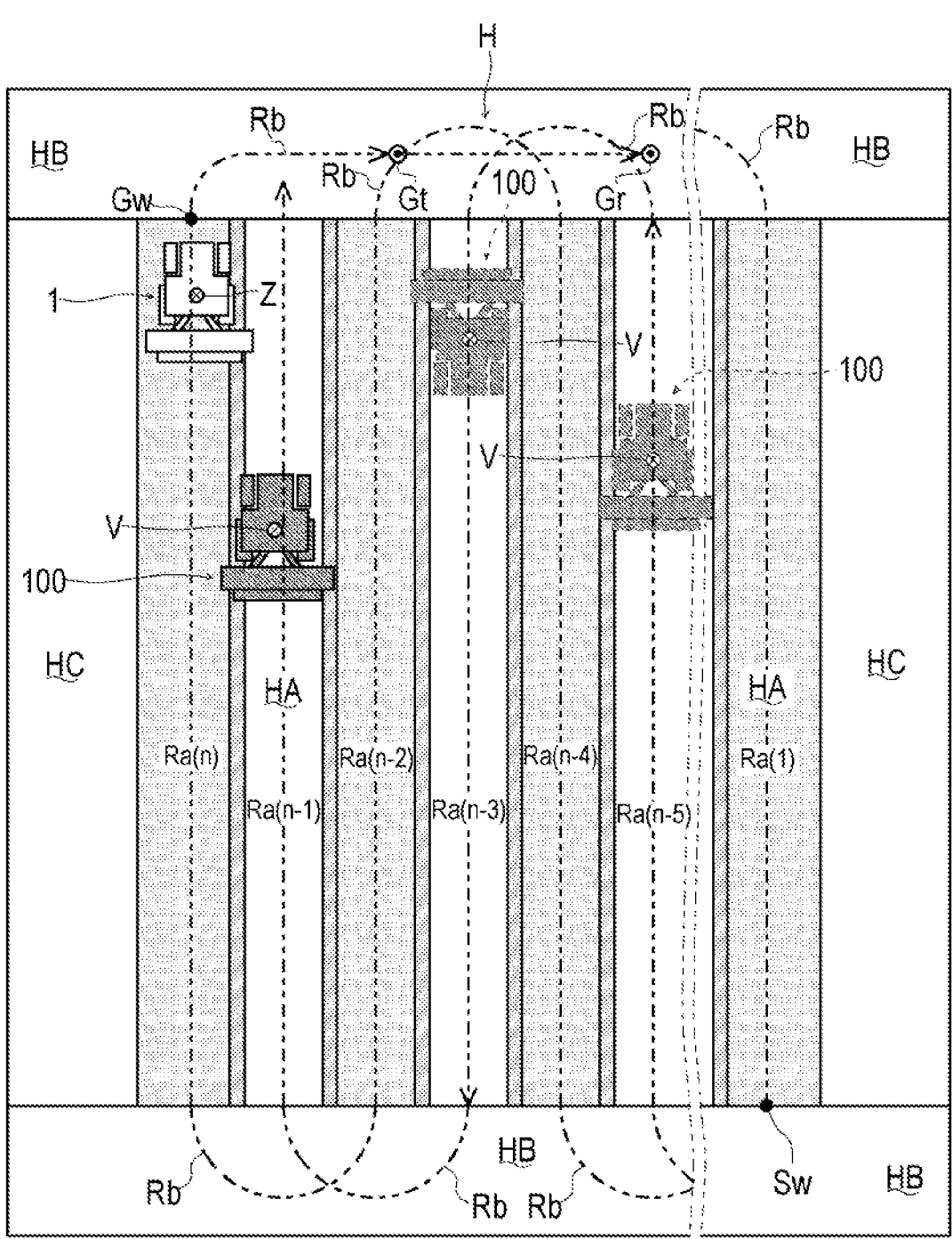
FIG. 16 is an illustration of a situation of a setting change of the travel end position.

For example, as illustrated in FIG. 16, in the autonomous travel work vehicle 1, in a case where the work route generation device 150 prevents the travel work vehicle 100 from entering the work route Ra(n–3) and is still on the work route Ra(n–5), the autonomous travel work vehicle 1 is stopped at a temporary stop position Gt. Once the travel work vehicle 100 enters the work route Ra(n–3), the control section 30 causes the autonomous travel work vehicle 1 to autonomously travel from the temporary stop position Gt to the travel end position Gr.

The autonomous travel work vehicle 1 may be configured such that the temporary stop position Gt is not set and based on the position of the autonomous travel work vehicle 1, the position of the travel work vehicle 100, and the route R of the travel work vehicle 100, the control section 30 causes the autonomous travel work vehicle 1 to temporarily stop before the position at which the route R of the autonomous travel work vehicle 1 and the route R of the travel work vehicle 100 intersect.

In the autonomous travel work vehicle 1, since when the work route generation device 150 can detect a travel position V of the travel work vehicle 100, a work delay of the travel work vehicle 100 can be determined, the autonomous travel work vehicle 1 may be configured to change, if the travel work vehicle 100 detects a work delay, the travel end position Gr to a position of the travel route Rb where the vehicle has already traveled before the work route Ra(n–5) before the travel work vehicle 100 reaches the work route Ra(n–3).

The work route generation device 150 is configured to set the travel end position Gr to prevent contact between the travel work vehicle 100 and the autonomous travel work vehicle 1 in consideration of the sizes of the autonomous travel work vehicle 1 and the work machine 24 and the sizes of the travel work vehicle 100 and the work machine 24, for example.

Figure 17:
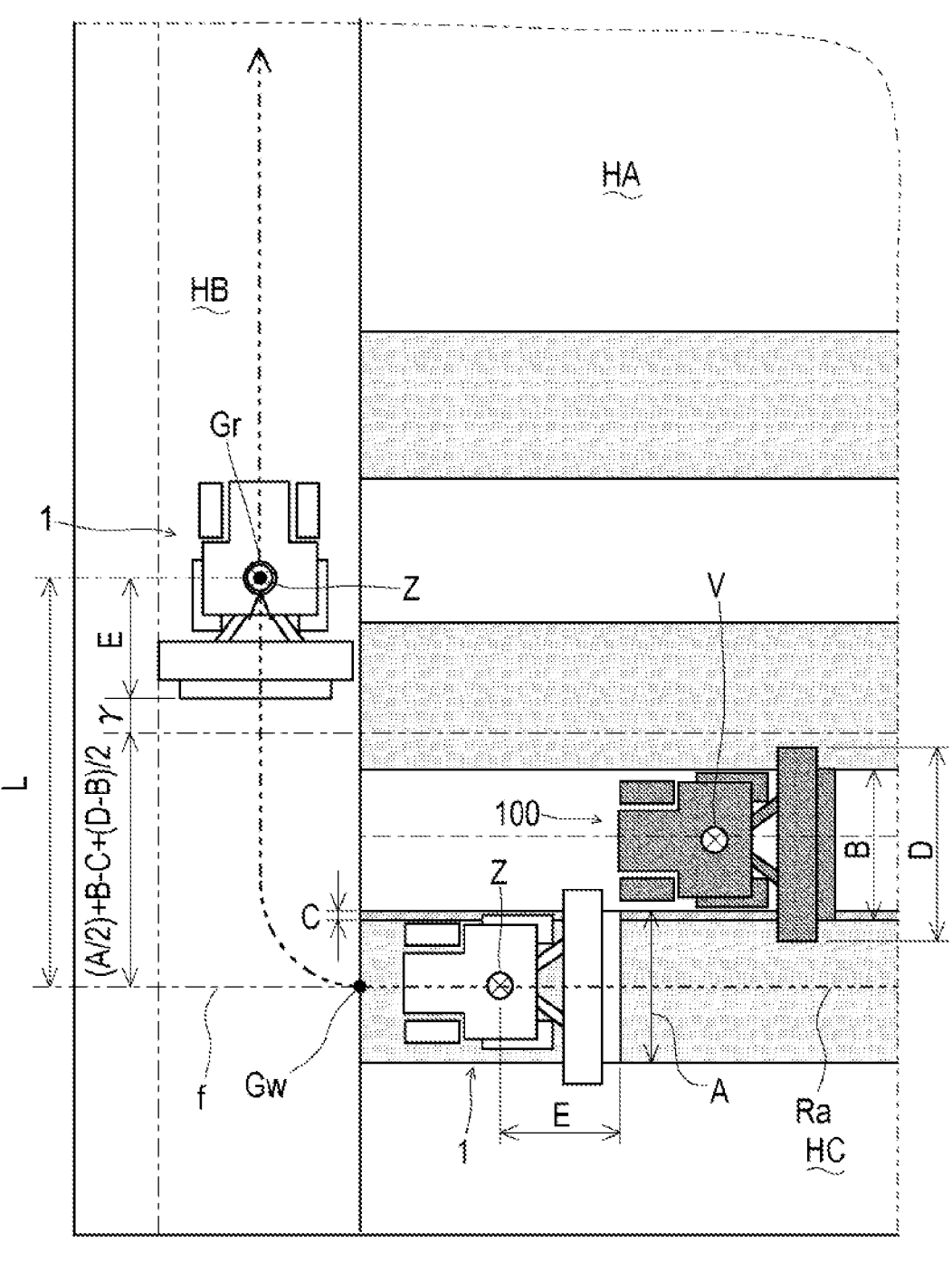
FIG. 17 is a view showing a method for setting a travel end position (method for calculating a set position).

Specifically, the location of the travel end position Gr is determined to satisfy equation (1) (see FIG. 17) below, and is defined at a position away from the extension line f of the work route Ra passing through the work end position Gw of the autonomous travel work vehicle 1 by a distance L or more.

$$L \geq (A/2) + B - C + (D - B)/2 + E + \gamma \qquad \text{Equation (1)}$$

where A is a tillage width (work width) of the autonomous travel work vehicle 1, B is a tillage width (work width) of the travel work vehicle 100, C is an overlap amount of work between the autonomous travel work vehicle 1 and the travel work vehicle 100, D is a maximum width of the travel work vehicle 100 (or a work machine attached to the travel work vehicle 100), E is a distance from the position (current position Z) of the moving GPS antenna 34 of the autonomous travel work vehicle 1 to the rear end of the work machine 24, and $\gamma$ is a margin. In determining the location of the travel end position Gr, the margin $\gamma$ may not be included.

That is, in the autonomous travel work vehicle 1, the travel end position Gr is set at a location away from the work end position Gw of the autonomous travel work vehicle 1 by a predetermined range (distance L from the extension line f) or more. The travel end position Gr of the autonomous travel work vehicle 1 may be set at a location away from the work end position of the travel work vehicle 100 by a predetermined range or more with respect to the work end position of the accompanying travel work vehicle 100.

In consideration of carrying out the autonomous travel work vehicle 1 out of the field H after work, the autonomous travel work vehicle 1 is configured such that the work route generation device 150 sets the travel end position Gr in consideration of the location of an entrance and an exit of the field H. That is, the work route generation device 150 can be configured to set the travel end position Gr at a location as close to the entrance or the exit of the field H as possible.

Figure 18:
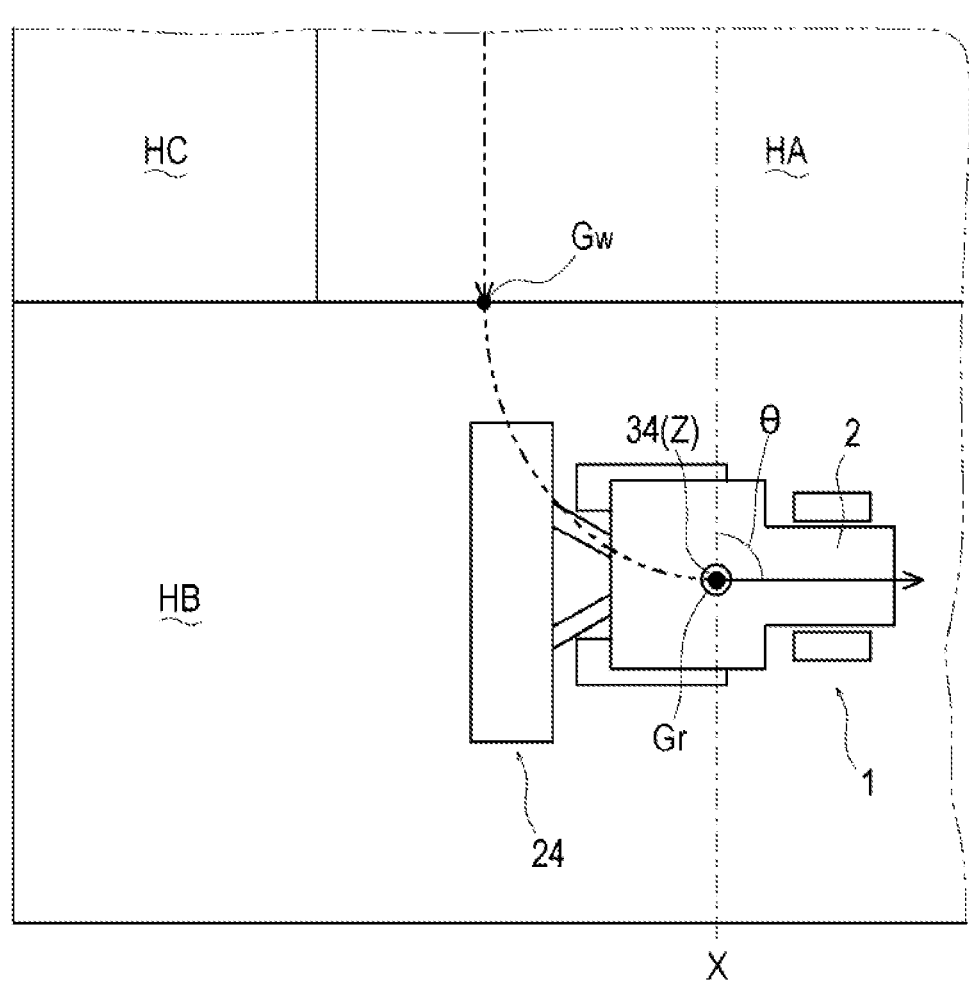
FIG. 18 is an illustration of a stop situation of the autonomous travel work vehicle to the travel end position (the case of controlling an azimuth angle).

In addition, as illustrated in FIG. 18, the autonomous travel work vehicle 1 is configured such that the azimuth angle detecting section 32 can detect an azimuth angle $\theta$ of the body part 2 with respect to the reference orientation X, and the control section 30 of the work route generation device 150 can control an azimuth angle $\theta$ (i.e., orientation) in stopping the autonomous travel work vehicle 1.

The autonomous travel work vehicle 1 is configured to control the azimuth angle $\theta$ (orientation) of the autonomous travel work vehicle 1 in stopping the autonomous travel work vehicle 1 at the travel end position Gr. In stopping the autonomous travel work vehicle 1 at the travel end position Gr, the azimuth angle $\theta$ of the autonomous travel work vehicle 1 is directed to the entrance or the exit of the field H so that when the autonomous travel work vehicle 1 is carried out of the field H, an operator only needs to drive the vehicle 1 straight ahead without turning or other operation. As a result, the autonomous travel work vehicle 1 can be easily carried out of the field H without damaging the field H.

That is, the autonomous travel work vehicle 1 according to one embodiment of the present invention includes the azimuth angle detecting section 32 configured to detect the azimuth angle $\theta$ of the body part 2, and the control section 30 can control the azimuth angle $\theta$ of the body part 2 at the travel end position Gr.

With this configuration of the autonomous travel work vehicle 1, the autonomous travel work vehicle 1 can be quickly carried out of the field H without spoiling the headlands HB and the side margins HC.

In addition, the autonomous travel work vehicle 1 may be configured to cause the display device 113 (see FIG. 2) included in the travel work vehicle 100 to display the travel end position Gr of the autonomous travel work vehicle 1 and to enable easy change of the travel end position Gr by a touch operation on the screen of the display device 113. The autonomous travel work vehicle 1 with this configuration can flexibly cope with a change in a work plan by a user.

Furthermore, in the autonomous travel work vehicle 1, as illustrated in FIG. 14, since the side margins HC are set to have a width substantially equal to that of the headlands HB at the sides of the field H, the work route generation device 150 can allow the autonomous travel work vehicle 1 and the travel work vehicle 100 to travel on the side margins HC, in a manner similar to that on the headlands HB. This configuration enables finishing work to be easily performed on an outer peripheral portion of the field H (the headlands HB and the side margins HC) so that work efficiency can be enhanced.

In the autonomous travel work vehicle 1, since the side margin HC at each side of the field H has a width substantially equal to that of the headland HB as illustrated in FIG. 14, the autonomous travel work vehicle 1 can be moved through the side margin HC. Accordingly, the travel end position Gr can be set to a position opposite to the work end position Gw so that s route can be more flexibly generated, and further, a route not including dummy travel can be easily generated.

A configuration of a travel region specifying device according to one embodiment of the present invention will now be described.

As illustrated in FIG. 2, the work route generation device 150 in the autonomous travel work vehicle 1 includes the moving GPS antenna 34 serving as a positional information acquiring section configured to acquire a current position Z that is positional information on the body part 2.

The work route generation device 150 includes the remote control device 112 serving as a travel trajectory region specifying section configured to specify a travel trajectory J of the body part 2 using the current position Z detected by the moving GPS antenna 34 and specify a travel trajectory region JA of the body part 2 based on the travel trajectory J.

In the autonomous travel work vehicle 1, the control section 30 can also specify the travel trajectory region JA of the body part 2 based on the travel trajectory J, and the control section 30 may specify the travel trajectory region JA of the body part 2 instead of the remote control device 112.

The remote control device 112 of the work route generation device 150 also has a function as a travel region specifying section configured to specify the shape of the field H (hereinafter referred to as a field shape HK) where the body part 2 travels based on corners p through u that are a plurality of selection points selected from the travel trajectory J.

In the autonomous travel work vehicle 1, the control section 30 can also specify the field shape HK based on the corners p through u as the plurality of selection points selected from the travel trajectory J, and the control section 30 may specify the field shape HK instead of the remote control device 112.

In addition, the remote control device 112 of the work route generation device 150 also has a function as a correction section that can correct the field shape HK.

In the autonomous travel work vehicle 1, the control section 30 can also correct the field shape HK, and the control section 30 may correct the field shape HK instead of the remote control device 112.

The remote control device 112 of the work route generation device 150 further includes the display device 113 serving as a notification section configured to issue a predetermined notification.

That is, the work route generation device 150 as a travel region specifying device according to one embodiment of the present invention includes: the moving GPS antenna 34 as the positional information acquiring section configured to acquire the current position Z as the positional information on the body part 2; the remote control device 112 that is a travel trajectory region specifying section configured to specify the travel trajectory region JA of the body part 2 based on the travel trajectory J of the body part 2 specified by using the current position Z, is a travel region specifying section configured to specify the shape of the field H (field shape HK) as the travel region where the body part 2 travels based on the plurality of selection points p through u selected from the travel trajectory J, and is a correction section configured to correct the field shape HK; and the control section 30.

It will now be described how a field is registered in the autonomous travel work vehicle 1 according to the embodiment of the present invention. Here, the case of registering a field H having an uneven shape as illustrated in FIG. 19 will be described as an example.

Figure 19:
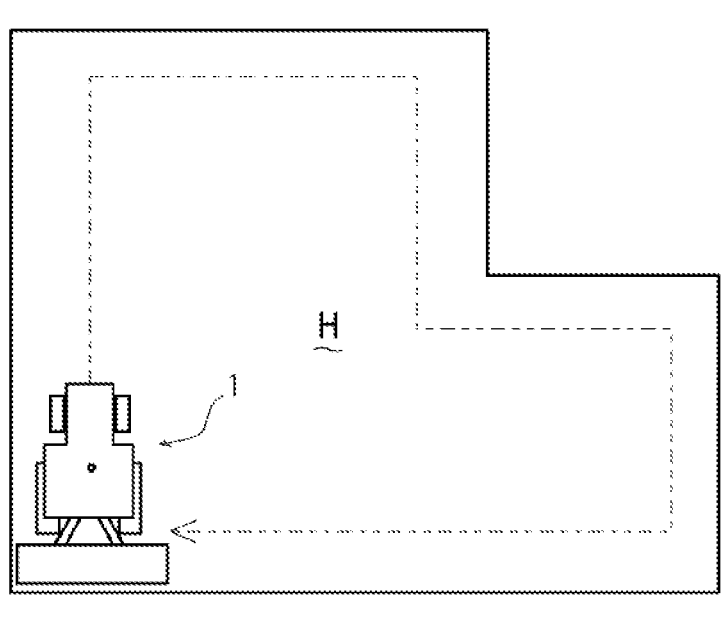
FIG. 19 is an illustration of an acquisition situation of a travel trajectory in a field.
Figure 19:
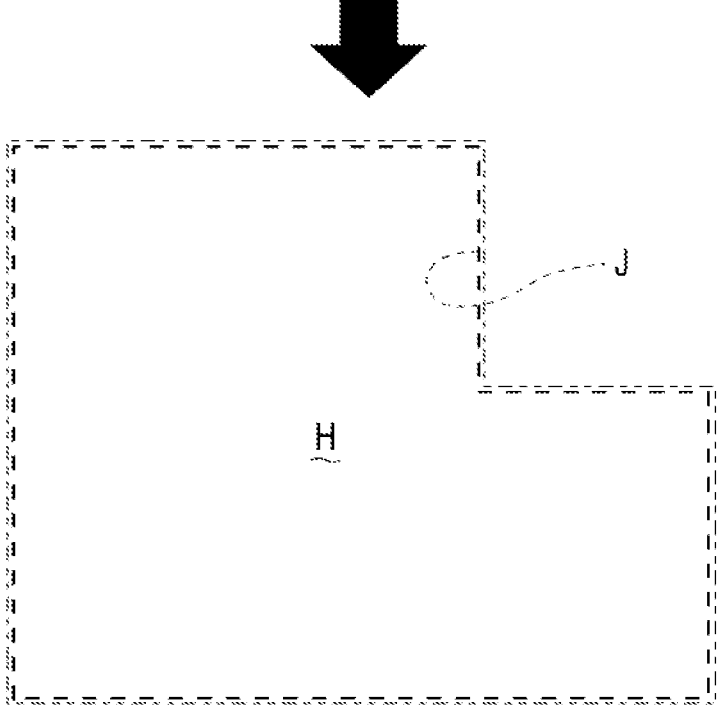

In autonomous travel work vehicle 1, in the case of field registration of the field H as illustrated in FIG. 19, the autonomous travel work vehicle 1 travels along the outer periphery of the field H by an operation of an operator, and a travel trajectory J is acquired. As illustrated in FIG. 19, the shape of the travel trajectory J substantially coincides with the outer peripheral shape of the field H.

Since the autonomous travel work vehicle 1 needs a predetermined radius in turning around a corner, corners of the travel trajectory J are curved, unlike the shape of the actual field H.

Next, in field registration of the field H, corners on the travel trajectory J are specified.

Figure 20:
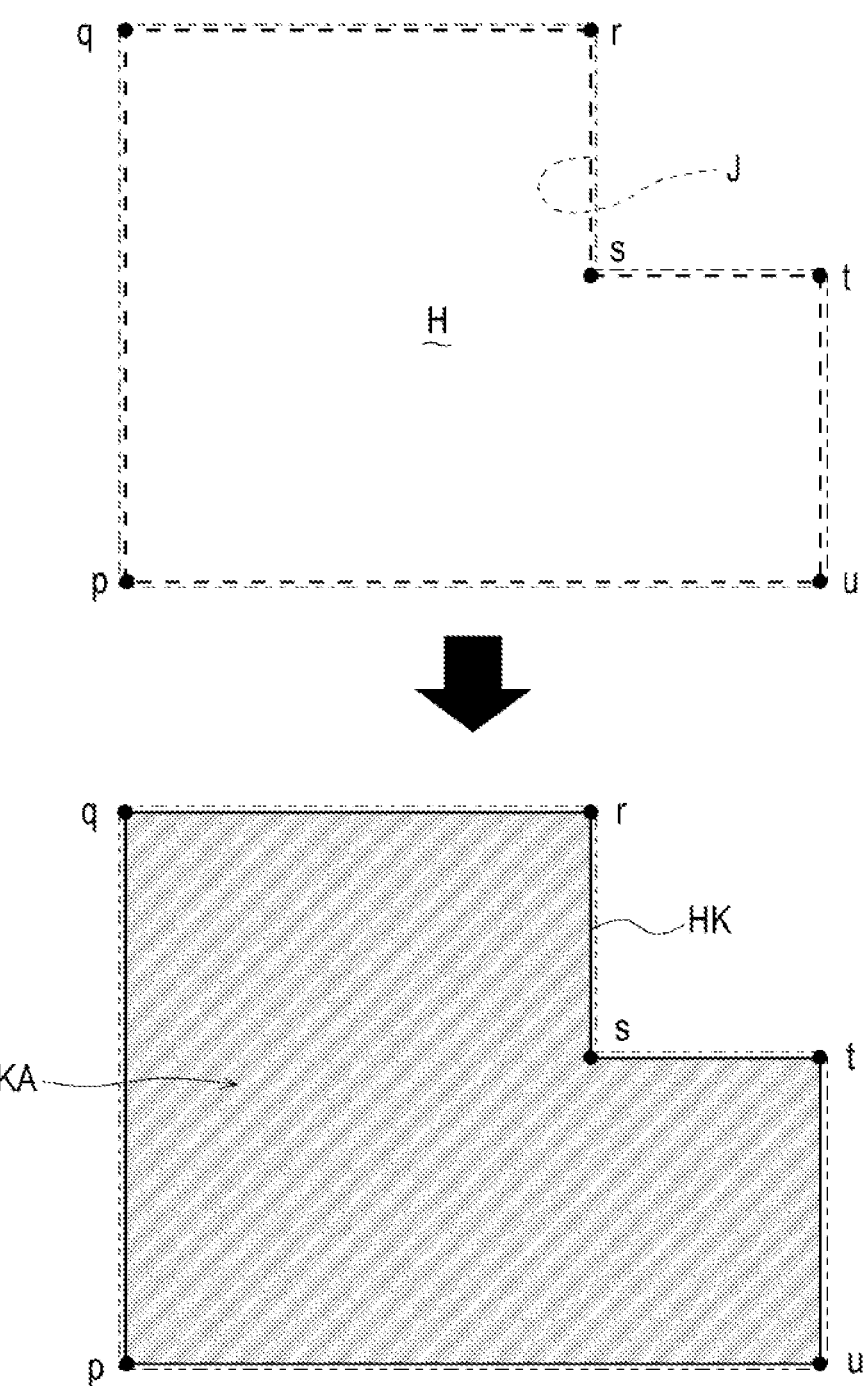
FIG. 20 is an illustration of a setting situation of a field shape based on a travel trajectory on the field.

As illustrated in FIG. 20, the travel trajectory J of this embodiment has six corners p, q, r, s, t, and u, and a travel trajectory J having corners p, q, r, s, t, and u as illustrated in FIG. 20 is displayed on the display device 113.

Then, in field registration of the field H, an operator selects corners present on the travel trajectory J, and sets the shape of the field H (field shape HK).

For example, as illustrated in FIG. 20, in a case where the operator selects six corners p, q, r, s, t, and u on the travel trajectory J, the field shape HK as illustrated in FIG. 20 is set.

If the operator correctly selects all the corners, the field shape HK substantially matching the shape of the field H can be accurately set as illustrated in FIG. 20.

Figure 21:
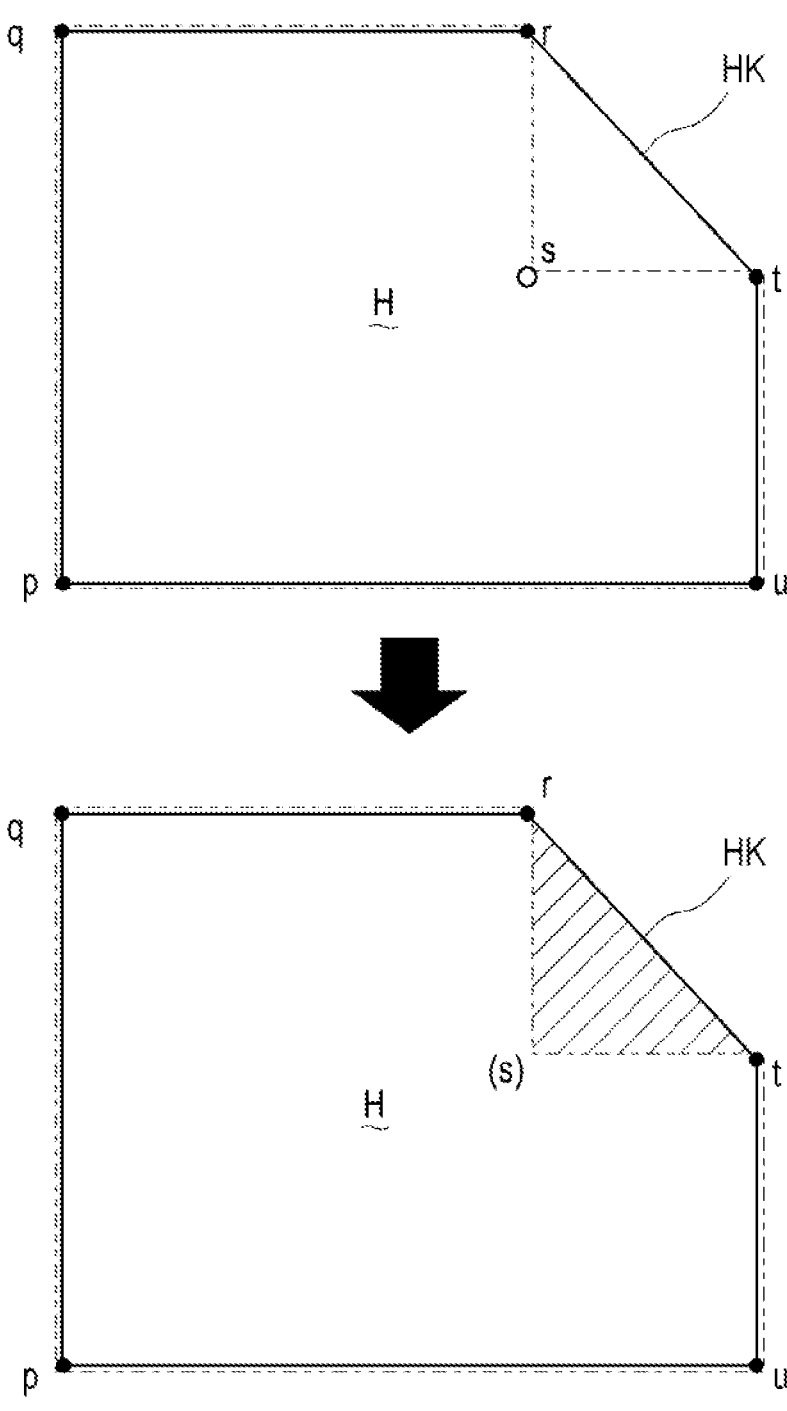
FIG. 21 is a view of an erroneous setting situation of the field shape.

On the other hand, in a case where the operator selects only five corners p, q, r, t, and u on the travel trajectory J (i.e., fails to select the corner s), a pentagonal field shape HK as illustrated in FIG. 21 is set.

In this case, a portion of the field shape HK corresponding to a triangle rst is erroneously set as a part of the field H (a region inside the field H) though the portion corresponding to the triangle rst is originally a region outside the field H. In such a case, an incorrect field shape HK is set, and the work route Ra and the travel route Rb of the autonomous travel work vehicle 1 might be set outside the field H.

In view of this, to prevent setting of the work route Ra and the travel route Rb of the autonomous travel work vehicle 1 in a range outside the field H, the work route generation device 150 according to one embodiment of the present invention employs the following configuration.

As illustrated in FIG. 20, in the work route generation device 150 as the travel region specifying device according to one embodiment of the present invention, the remote control device 112 automatically specifies a closed region surrounded by the acquired travel trajectory J (hereinafter referred to as a travel trajectory region JA), and if it is detected that a specific point on the set field shape HK is located outside the specified travel trajectory region JA, the remote control device 112 can determine that setting of the field shape HK is in error (i.e., the field shape HK extends off from the actual field H).

If the remote control device 112 determines that the field shape HK is in error, an alarm is issued on the display device 113 of the remote control device 112.

That is, the travel region specifying device (the work route generation device 150) according to one embodiment of the present invention includes the remote control device 112 as a determination section that determines that the field H includes a region outside the travel trajectory region JA if a specific point on the set field shape HK is located outside the travel trajectory region JA.

The travel region specifying device (the work route generation device 150) with the configuration described above can help prevention of erroneous setting of the route R (the work route Ra and the travel route Rb) outside the field H.

In the travel region specifying device (the work route generation device 150) according to one embodiment of the present invention, the remote control device 112 automatically specifies the travel trajectory region JA and compares the area of the set field shape HK and the area of the travel trajectory region JA, and if the area of the field shape HK is larger than the area of the travel trajectory region JA, the remote control device 112 can determine that setting of the field shape HK is in error (i.e., the field shape HK extends off from the actual field H).

That is, the travel region specifying device (the work route generation device 150) according to one embodiment of the present invention includes the remote control device 112 as a determination section that determines that if the area of the set field shape HK is larger than the area of the travel trajectory region JA, the field shape HK includes a region outside the travel trajectory region JA.

The travel region specifying device (the work route generation device 150) with the configuration described above can further help prevention of erroneous setting of the route R (the work route Ra and the travel route Rb) outside the field H.

In determining whether there is a portion extending off from the field H or not, a threshold may be set as appropriate so that if the area of the portion extending off the field H exceeds the predetermined threshold, it can be determined that this portion extends off.

The travel region specifying device (the work route generation device 150) according to one embodiment of the present invention may be configured to compare the set field shape HK with known map information.

Figure 22:
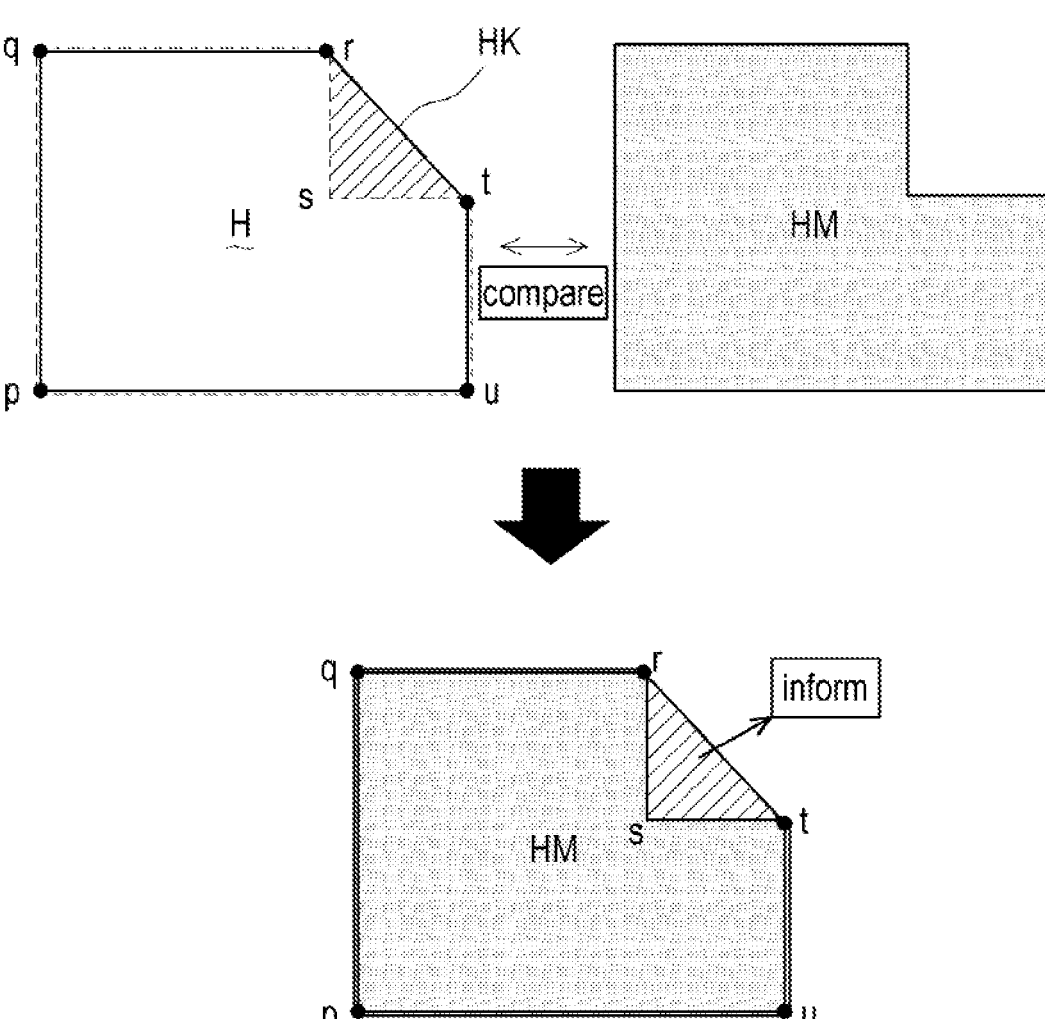
FIG. 22 is an illustration of a determination situation of the field shape based on map information.

As illustrated in FIG. 22, in the travel region specifying device (the work route generation device 150), the remote control device 112 previously stores map information HM on the field H and compares the set field shape HK with the map information HM. The map information HM includes positional information (latitudes and longitudes of end points), the area, the shape, and so forth of the field H.

If the field shape HK has a portion that does not match the map information HM (e.g., the triangle rst in FIG. 22), the remote control device 112 issues an alarm on the display device 113 of the remote control device 112.

Here, in the travel region specifying device (the work route generation device 150), a notification displayed on the display device 113 suggests that the field H includes a region outside the travel trajectory region JA.

Specific contents of the notification displayed on the display device 113 include a display of a text for urging an operator to check, such as "need to check where selection of corners is correct" or a warning text, such as "route might be generated outside field H if route generation continues without change."

The travel region specifying device (the work route generation device 150) may be configured such that the display device 113 does not display a notification that the field H includes a region outside the travel trajectory J and the remote control device 112 corrects the field shape HK so that the field H does not include a region outside the travel trajectory J.

In this case, the display device 113 displays a screen conformation for determining "correct field shape HK?" and if the operator selects "correct," the remote control device 112 performs correction.

The travel region specifying device (the work route generation device 150) is configured such that the field shape HK displayed on the display device 113 can be corrected by the operator with an instruction to the screen using a touch pen, for example, and the field shape HK can be corrected by, for example, an operating of additionally selecting a corner S by the operator.

The travel region specifying device (the work route generation device 150) may be configured such that in comparing the field shape HK with map information or the like, the remote control device 112 specifies the extending portion and corrects the field shape HK to remove the specified extending portion.

The method for specifying the field shape HK after acquiring the travel trajectory J is not limited to the method of specifying only corners.

For example, the field shape HK may be specified by displaying the acquired travel trajectory J on the display device 113 and specifying corners and sides with an operator's instruction on the screen using a touch pen. With this specifying method, even if a failure occurs in selecting a corner, the field shape HK can be accurately specified.

Alternatively, as the method for specifying the field shape HK after acquiring the travel trajectory J, the field shape HK may be automatically generated by the remote control device 112 from the acquired travel trajectory J, or a more appropriate field shape HK may be acquired in such a manner that the operator checks the automatically generated field shape HK and corrects the shape as appropriate in accordance with the actual shape.

That is, the work route generation device 150 as a travel region specifying device according to one embodiment of the present invention includes: the moving GPS antenna 34 configured to acquire the current position Z as positional information on the body part 2; the remote control device 112 that is a travel trajectory region specifying section configured to specify the travel trajectory region JA of the body part 2 based on the travel trajectory J of the body part 2 specified by using the current position Z and is a travel region specifying section configured to specify the field shape HK as the travel region where the body part 2 travels based on the corners p through u as the plurality of selection points selected from the travel trajectory J; and the display device 113 serving as the notification section configured to issue a predetermined notification. The predetermined notification is a notification suggesting that the set field shape HK includes a region outside the travel trajectory region JA.

The work route generation device 150 as a travel region specifying device according to one embodiment of the present invention includes: the moving GPS antenna 34 as the positional information acquiring section configured to acquire the current position Z as the positional information on the body part 2; the remote control device 112 that is a travel trajectory region specifying section configured to specify the travel trajectory region JA of the body part 2 based on the travel trajectory J of the body part 2 specified by using the current position Z, is a travel region specifying section configured to specify the field shape HK as the travel region where the body part 2 travels based on the corners p through u as the plurality of selection points selected from the travel trajectory J, and is a correction section that can correct the field shape HK. If the field shape HK includes a region outside the outside the travel trajectory region JA, the remote control device 112 corrects the field shape HK to a region not including the region outside the travel trajectory region JA.

The work route generation device 150 with the configuration described above can prevent erroneous setting of the route R outside the field H as a travel region in setting the route R (the work route Ra and the travel route Rb) of the autonomous travel work vehicle 1.

Figure 23A:
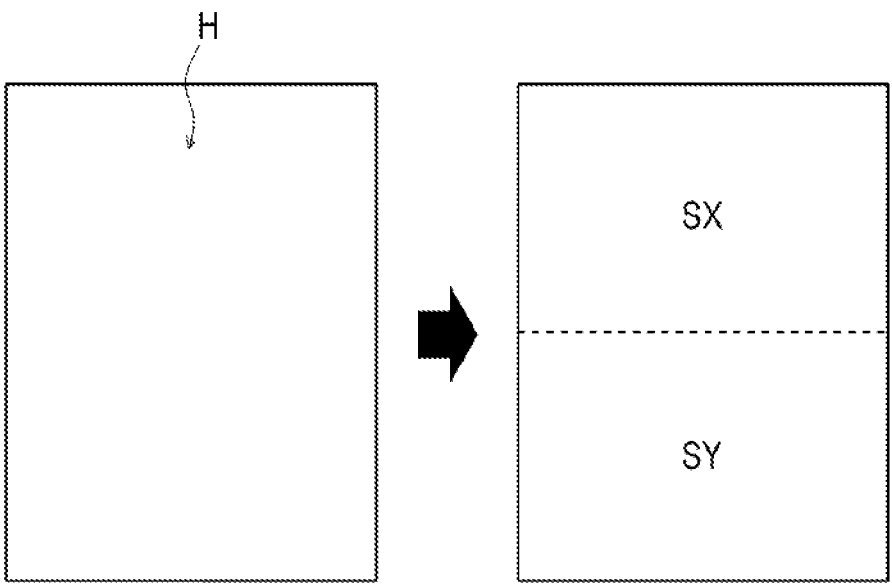
FIGS. 23A and 23B are illustrations of a setting situation of the field shape of the field (in a case where two regions are set in one field where FIG. 23A is an illustration of a division situation of the field and FIG. 23B is an illustration of a setting situation of the field shape.
Figure 23B:
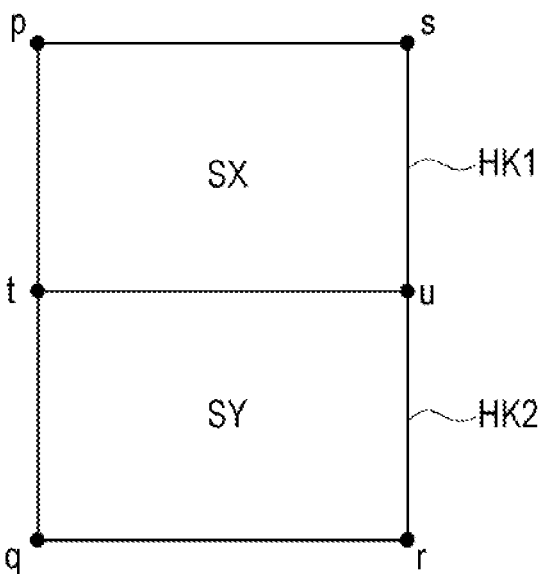

Next, regarding field registration in the autonomous travel work vehicle 1 according to the embodiment of the present invention, a case where a region is set for each of two types of crops (a crop SX and a crop SY) on the field H as illustrated in FIG. 23A and FIG. 23B. Here, a substantially rectangular field H as illustrated in FIG. 23A is divided into two regions. The crop SX is grown in one of the regions, and the crop SY is grown in the other region.

In such a case, for field registration of the region for the crop SX, first, the autonomous travel work vehicle 1 detects an outer peripheral shape of the field H and specifies the field shape HK of the entire field H. Here, as illustrated in FIG. 23B, the field shape HK of the entire field H is specified by selecting the corners pqrs.

Next, to specify the region for the crop SX, a point t on a line pq and a point u on a line rs are additionally selected, a rectangular portion defined by the points ptus is specified as a field shape HK1 for the crop SX, and a rectangular portion defined by the points qrut is specified as a field shape HK2 for the crop SY.

Figure 24A:
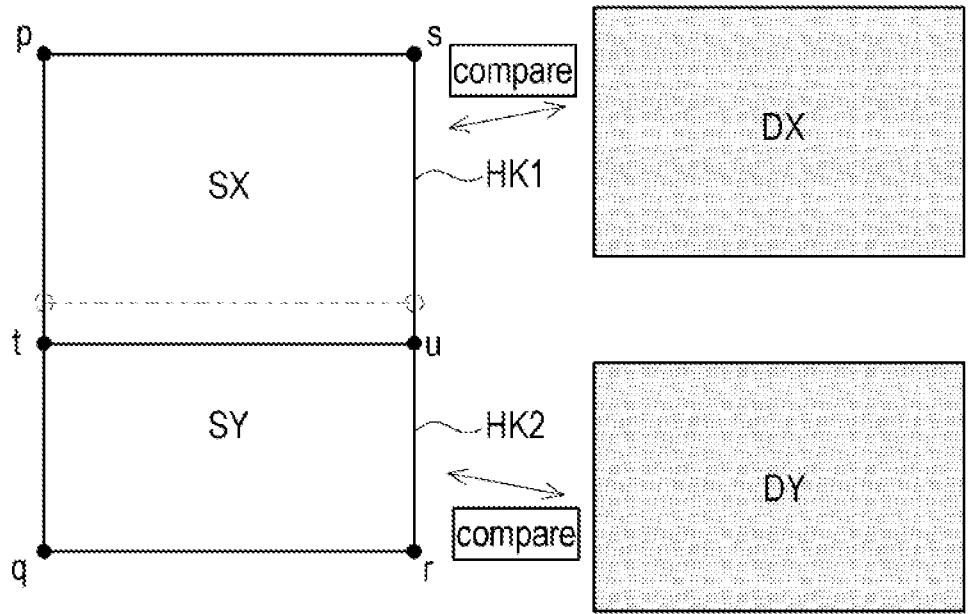
FIGS. 24A and 24B are illustrations of a setting situation of the field shape of the field (in a case where two regions are set in one field) where

Here, if the user mistakes selection of the point t and the point u, as illustrated in FIG. 24A, a part of the region for the crop SY might be erroneously registered as the region for the crop SX.

In view of this, the work route generation device 150 according to one embodiment of the present invention may be configured to previously acquire region data DX and DY on the regions for the crops SX and SY and compares the region data DX and DY with the field 5 shapes HK1 and HK2 to thereby prevent erroneous field registration.

Examples of the region data DX and DY of the crops SX and SY include the areas of the regions, positional information on end points of the regions, and map data (including shapes, areas, and positional information) of the regions.

The region data DX and DY is previously stored in the remote control device 112, and the remote control device 112 compares the specified field shapes HK1 and HK2 with the region data DX and DY. In this manner, erroneous field registration can be prevented.

Figure 24B:
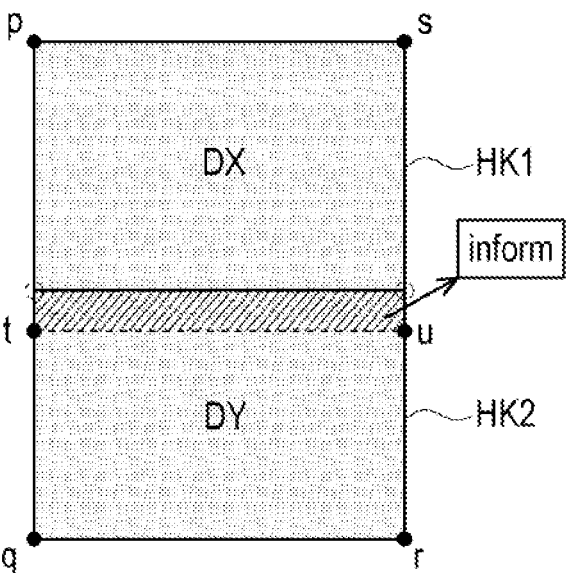

As illustrated in FIG. 24B, as a result of the comparison using the region data DX and DY, if the remote control device 112 determines that an error (overlapping portion) is present in the field shapes HK1 and HK2, the display device 113 provides a notification of the error.

Alternatively, if it is determined that there is an error in the field shapes HK1 and HK2, the remote control device 112 may correct locations of the points t and u so that the specified field shapes HK1 and HK2 match the region data DX and DY to correct the field shapes HK1 and HK2.

Next, a route generation method in a work vehicle will be described.

While an autonomous travel work vehicle reciprocates for work within a work region, due to the amount of overlapping that has been set or the width of a work machine attached to the vehicle, the radius of turning on a headland region becomes smaller than the radius of turning of the autonomous travel work vehicle itself so that the vehicle cannot turn at once and needs a K-turn, and as a result, an inefficient situation of the necessity for the time for turning can occur in some cases. If the radius of turning is small, the vehicle makes a steep turn to leave a dense tire mark on the headland. Accordingly, an inefficient situation requiring the time for finishing work on the headland can also occur in some cases.

The following route generation method for a work vehicle devices route generation to enable efficient turn on the headland HB in performing reciprocation work on the work region HA and also enable an efficient turn on the headland HB without spoiling the ground of the field H by turning in performing reciprocation work.

In setting the number of skips in route generation setting, if a skip of N routes (where N is a natural number of one or more) is selected, a route is generated by "N-route skip." The "N-route skip" here means that a route is generated by arranging the n-th work route (where n is a natural number of zero or more in this embodiment and is used as a symbol indicating the order of work) and a (n+1)-th work route while skipping N work routes. Specifically, in sequentially traveling on the work routes R1, R2, . . . included in the work route Ra, the order of work routes is set such that a work route separated from the current work route by N work routes is set as the next work route, that is, setting enters from the current work route to the next work route while skipping two adjacent work routes (e.g., traveling on R4 after R1, see FIG. 25, for example). Each work route has a predetermined work width depending on work by the autonomous travel work vehicle 1 and is disposed in parallel with other work routes in a work region. By generating routes while skipping a plurality of routes, a turning distance can be sufficiently obtained, and the autonomous travel work vehicle 1 can turn on the travel route Rb with a margin without the necessity for a steep turn. Accordingly, efficient turn can be performed without spoiling the field ground. A method for generating routes in the case of selecting two-route skip will be more specifically described.

Although "N-route skip" means arranging the n-th work route (where n is a natural number of zero or more) and the (n+1)-th work route are arranged with a skip of N work routes, the work route Rn and the work route (Rn+1) cannot be arranged with a skip of N work routes in some cases depending on the number of work routes included in the work route Ra.

In this case, the route Rn and the work route (Rn+1) are arranged with a skip of K work routes of (N+1) work routes or more.

Figure 29:
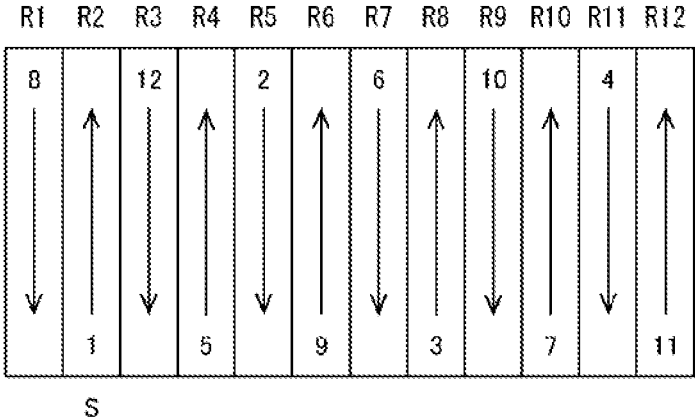
FIG. 29 is an illustration showing a method for generating routes in a second embodiment.
Figure 29:
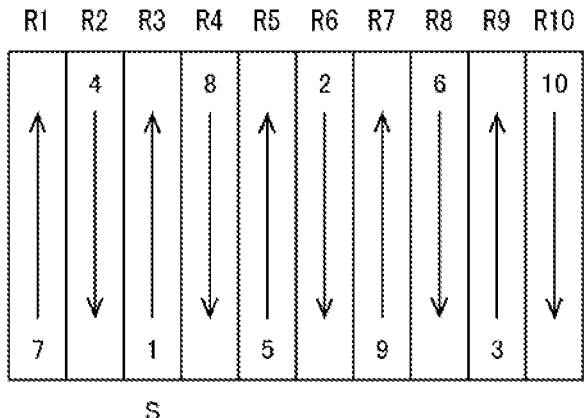
Figure 29:
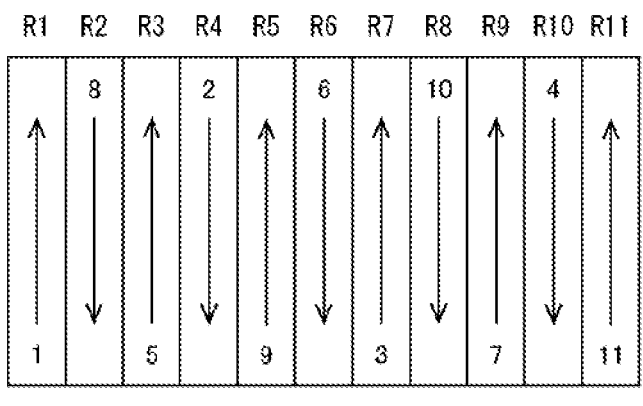
Figure 30:
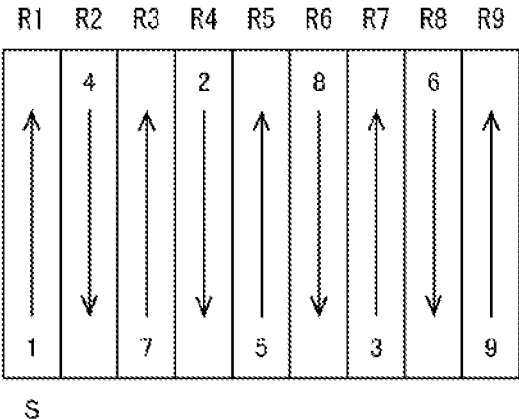
FIG. 30 is an illustration showing a method for generating routes in a third embodiment.
Figure 30:
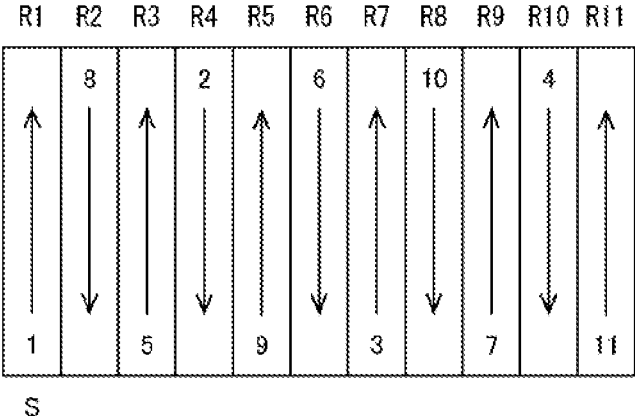
Figure 30:
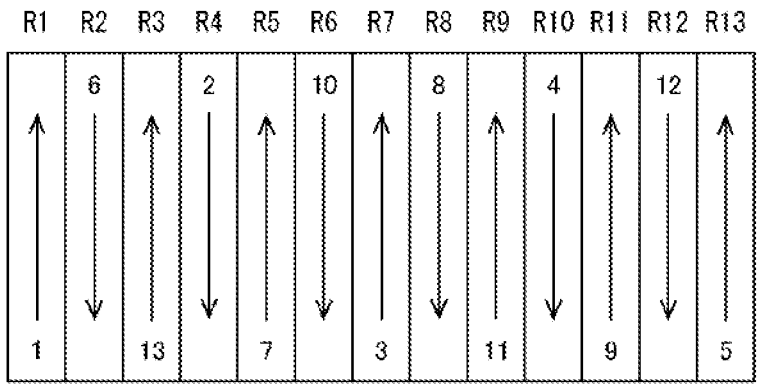
Figure 31:
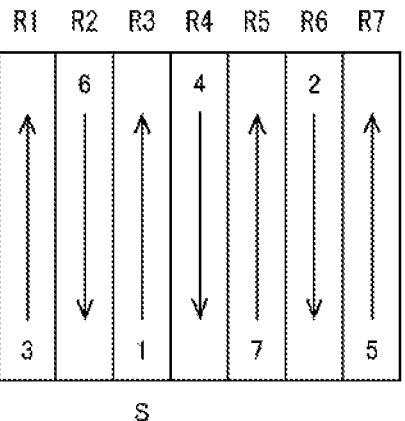
FIG. 31 is an illustration showing the method for generating routes in the third embodiment.
Figure 31:
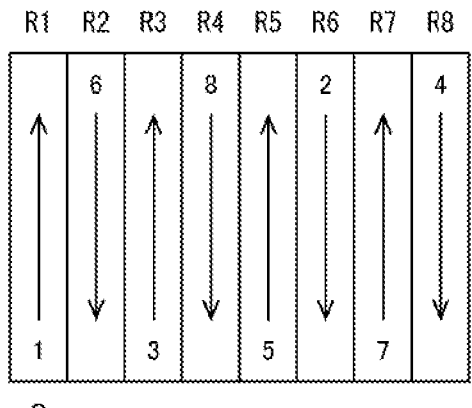

FIGS. 25 through 28 illustrate a method for generating routes according to a first embodiment. FIG. 29 illustrates a method for generating routes according to a second embodiment. FIGS. 30 and 31 illustrate a method for generating routes according to a third embodiment.

First Embodiment

Figure 25:
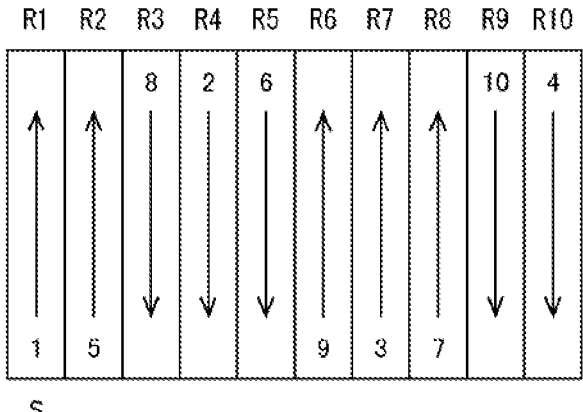
FIG. 25 is an illustration showing a method for generating routes in a first embodiment.
Figure 25:
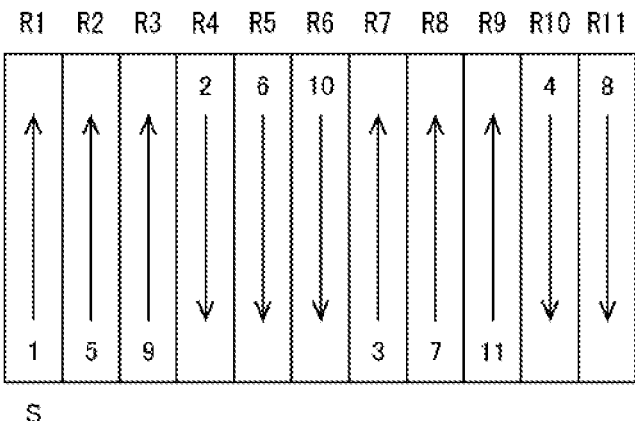
Figure 25:
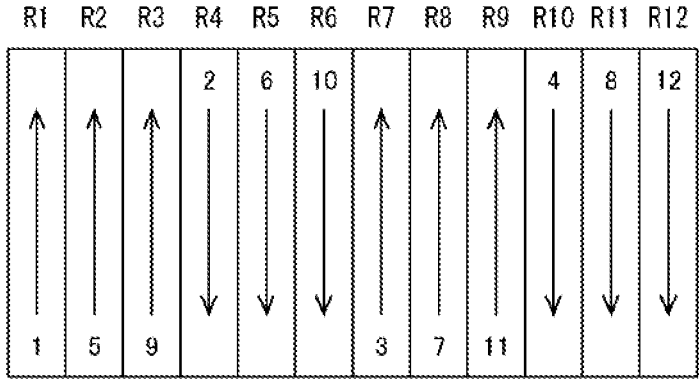

FIG. 25 illustrates an embodiment of setting the order of travel on work routes, specifically, setting starts at an end work route R1 (the work start position S) toward one side while skipping two routes, and then from the limit at one side, that is, a work route R10 at which two work routes cannot be skipped any more toward one side, returns to a work route R2 adjacent to the end work route R1, and then the order of travel on work routes is set again toward one side while skipping two routes, and after setting has reached the work route at a limit of setting, returns to a work route R3 two routes away from the end work route R1, and then setting is performed again toward one side while skipping two routes. The "order of travel" is the order of travel on work routes Ra generated in the route R, and the order of work routes on which the vehicle travels on the work routes Ra from one headland HB to the other headland HB.

Figure 26:
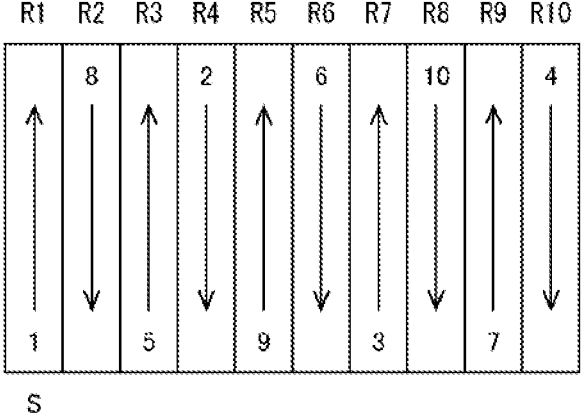
FIG. 26 is an illustration showing the method for generating routes in the first embodiment.
Figure 26:
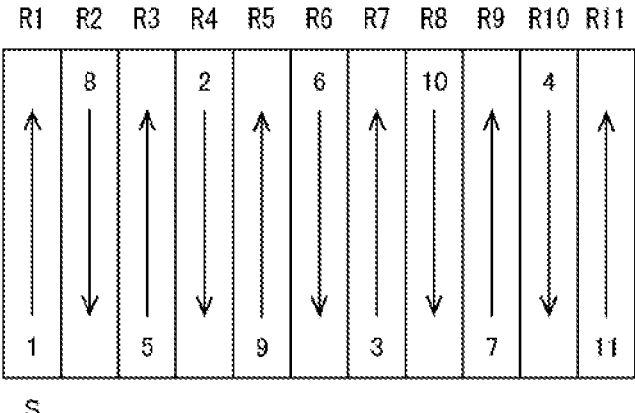
Figure 26:
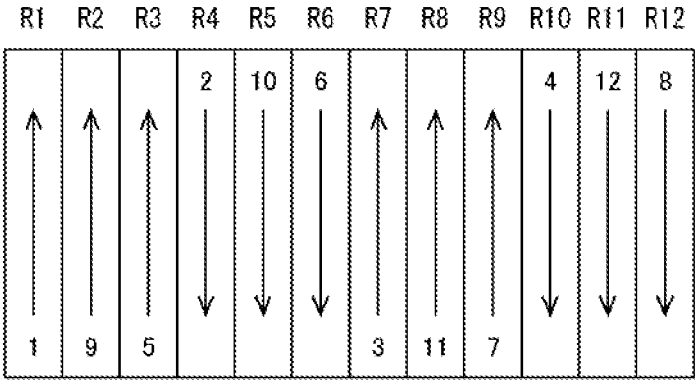

FIG. 26 illustrates an embodiment of setting the order of travel on work routes, specifically, setting starts at the end work route R1 (the work start position S) toward one side while skipping two routes, and then from the work route R10 as the limit at one side, returns to the work route R3 two routes away from the end work route R1, and then the order of travel on work routes is set again toward one side while skipping two routes, and after setting has reached a work route R9 as a limit of setting, returns to the work route R2, and then setting is performed again toward one side while skipping two routes.

In this embodiment, examples in which the number of work routes is 10, 11, and 12 are represented in an upper part, an intermediate part, and a lower part, respectively, in each of FIGS. 25 and 26.

With the generation of routes R described above, a two-route skip that enters a next work route while skipping two or more adjacent work routes can be maintained using a simple algorithm in which the order of travel is sequentially set from an end while skipping two routes using the end work route as a start position, and when setting reaches a limit, the setting returns to the second or third route from the end.

Figure 27:
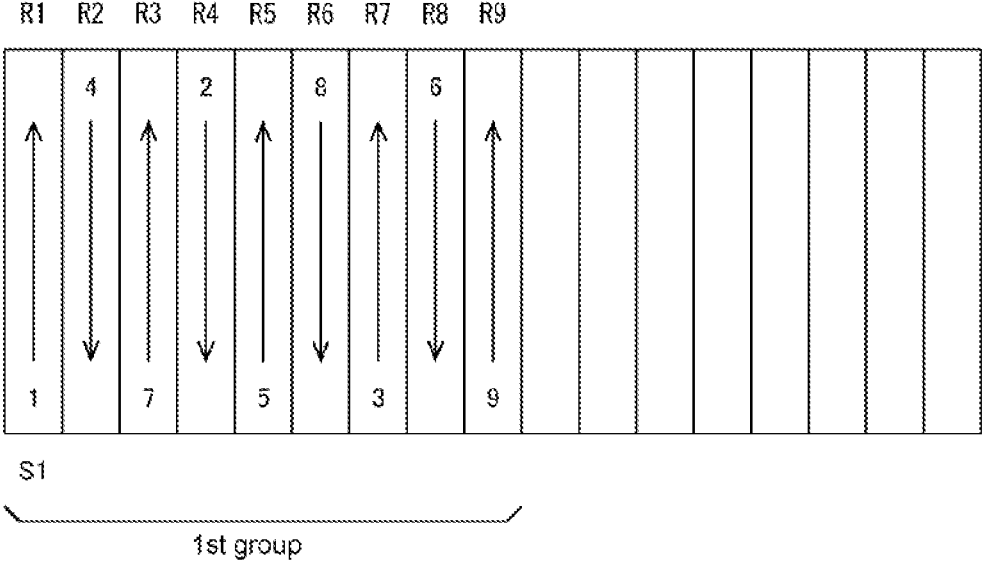
FIG. 27 is an illustration showing the method for generating routes in the first embodiment.
Figure 27:
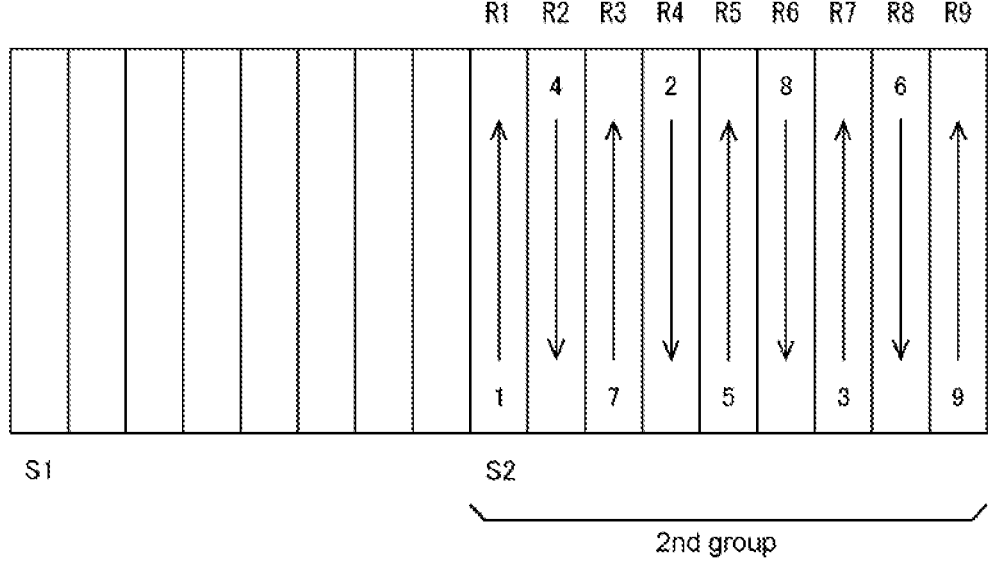

The unit of repetition of work routes in the algorithm of this embodiment is, for example, nine as illustrated in FIG. 27. In this case, the number of work routes in a first group is nine from the first work route R1 (the work start position S1) as the start position of the group to the ninth work route R9 as the end position, and the first position (the work start position S2) of a second group is shared with the end position (R9) of the work routes of the first group so that the number of work routes in the second group counts as nine. That is, the first group consists of nine routes from the end work route R1, and the ninth work route R9 is also counted as the first (end) work route R1 of the next second group.

Similarly, the same process is repeated for the third group, the fourth group, and the fifth group, and the entire routes are created. In this manner, two-route skip can be maintained even in the case of a large number of work routes, and the travel distance among work routes (the distance of the travel routes Rb) can be reduced so that the total travel distance in the case of selecting two-route skip can be reduced.

A value obtained by subtracting one from the number M (where M is a natural number) of work routes and dividing the result by eight is the number of repetition of work routes. The order of travel on work routes is set using a similar algorithm on the last group constituted by 10 to 16 work routes generated by adding a remainder (a value of one to seven) to the last group. Accordingly, the order of travel on work routes in repeating work route groups and the order of travel on work routes in the last work route group can be set, and the algorithm of this embodiment can be applied irrespective of the number of work routes.

Figure 28:
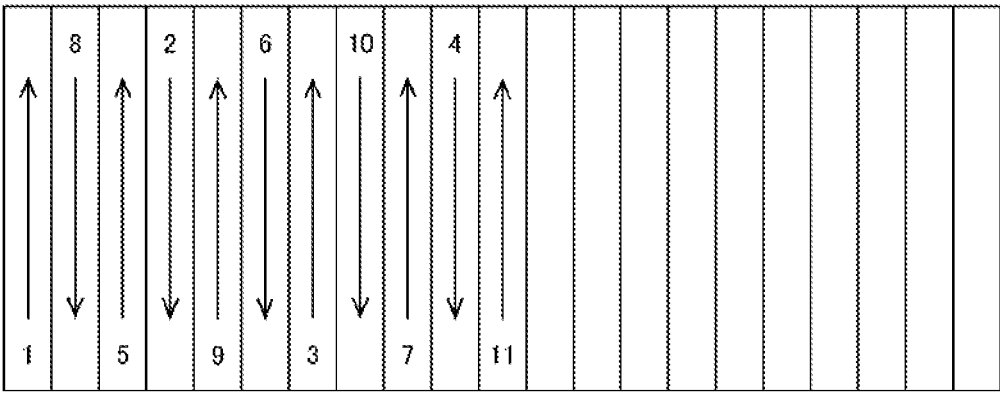
FIG. 28 is an illustration showing the method for generating routes in the first embodiment.
Figure 28:
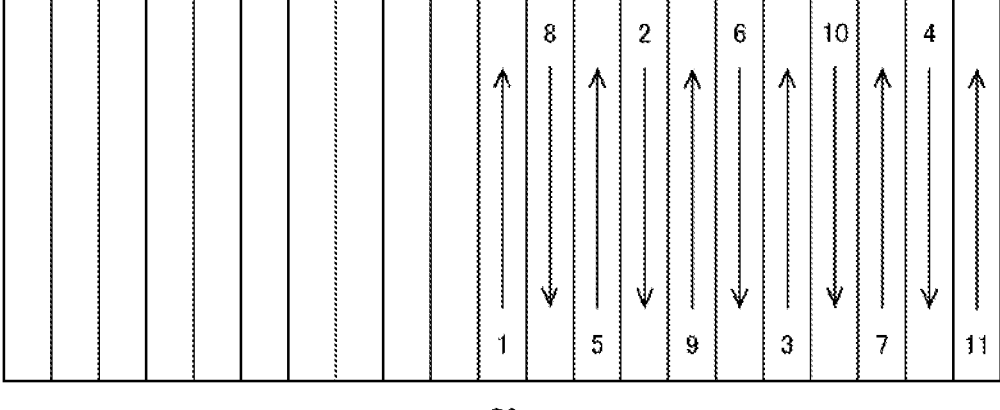

As illustrated in FIG. 28, the unit of repetition of work routes in the algorithm of this embodiment may be 11. Similarly, in this case, the eleventh work route R11 of the first group is also used as the first work route R1 of the second group. A value obtained by subtracting one from the number M of work routes and dividing the result by 10 is the number of repetition of work route groups. In a case where a remainder is added to the last group or the remainder is large, the order of travel can be additionally set using a similar algorithm on work routes in a number corresponding to the remainder.

The unit of repetition of work routes is not limited to 9 and 11 described above, and may be, for example, 15. However, if the number of work routes included in repetition increases, the number of skips (distance between work routes where the operator moves) in the unit of repetition inevitably increases, which is not preferable.

That is, in the route generation method described in the first embodiment, the route R includes the work route Ra in the work region HA and the travel route Rb in the headland HB on the field H, the work route Ra is constituted by a plurality of parallel work routes R1 through R12, the work routes R1 through R12 are sequentially connected by the travel route Rb, in connecting the work routes while skipping two or more adjacent work routes in the travel route Rb, connection starts from the end work route in the work routes, and the order of travel on the work routes is set toward one side while skipping two routes, and after the setting has reached the limit at one side, the order of travel on work routes is set again from one of the work route one route away from the end work route and the work route two routes away from the end work route toward one side while skipping two routes, and after the setting has reached a limit at one side, the order of travel on work routes is set again from the other work route one or two routes away from the other one of the work route one route away from the end work route and the work route two routes away from the end work route.

This configuration enables efficient turn on the headland HB in conducting reciprocation work on the work region HA, and enables efficient turn on the headland HB without spoiling the ground of the field H due to turning in conducting reciprocation work.

Second Embodiment

FIG. 29 illustrates an embodiment in which a work start position is changed in accordance with the number of work routes. In FIG. 29, an upper part represents a case where the number of work routes is 12 (a multiple of three), an intermediate part represents a case where the number of work routes is 10 (a multiple of three −2), and a lower part represents a case where the number of work routes is 11 (a multiple of three −1), as examples.

In a case where the number of work routes is 3N (where N is a natural number of four or more), "3N" represents a multiple of three), the second work route R2 from an end is set as a start position. In a case where the number of work routes is 3N−2, the third work route R3 from the end is set as a start position. In the case where the number of work routes is 3N−1, the end work route R1 is set as a start position. Then, a work start position S (work route used at start) is set in accordance with the number of work routes in each part, and then the order of travel on work routes with two-route skip is set.

By changing the position at which work starts is changed in accordance with the number of work routes as described above, two-route skip can be maintained so that efficient turn on the headlands can be achieved.

That is, in the route generation method described in the second embodiment, the route R includes the work route Ra in the work region HA and the travel route Rb in the headland HB on the field H, the work route Ra is constituted by a plurality of parallel work routes R1 through R12, the work routes R1 through R12 are sequentially connected by the travel route Rb, in connecting the work routes while skipping two or more adjacent work routes in the travel route Rb, if the number of work routes is 3N (where N is a natural number of four or more; the same hereinafter), the second work route from an end is set as a start position, and if the number of work routes is 3N−2, the third work route from the end is set as a start position, and if the number of work routes is 3N−1, the end work route is set as a start position.

This configuration enables efficient turn on the headland HB in conducting reciprocation work on the work region HA, and enables efficient turn on the headland HB without spoiling the ground of the field H due to turning in conducting reciprocation work.

Third Embodiment

FIGS. 30 and 31 illustrate an embodiment in which the order of travel is set such that work directions of adjacent work routes are opposite to each other. FIG. 30 illustrates an example in which the whole or a part of the algorithm of the first embodiment is used. FIG. 31 illustrates an example in which the algorithm of the second embodiment is used.

By alternately setting work directions in work regions, unevenness of soil after work, for example, can be reduced.

In FIG. 30, examples where the number of work routes is 9, 11, and 13 are represented by an upper part, an intermediate part, and a lower part, respectively, In the case where the number of work routes is 9, the order of travel is set twice for the work route R4 and the work route R7 from one end work route R1 (the work start position S) toward one side. The setting returns to the second work route R2 from the end, and the order of travel is set again toward one side for the work route R5 and the work route R8 in this order. Lastly, the setting returns to the third work route R3 from the end, and the order of travel is set again toward one side for the work route R6 and the work route R9 in this order.

In the case where the number of work routes is 11, the order of travel is set three times from the end work route R1 (the work start position S) toward one side for the work route R4, the work route R7, and the work route R10 in this order. The setting then returns to the third work route R3 from end, and the order of travel is set again toward one side. Lastly, the order of travel is set from the second work route R2 from the end toward one end.

That is, in the case of setting the order of travel from the end work route with two-route skip, if the order of travel is set an even number of times toward one side, the setting returns to the second work route from the end and the order of travel is set while skipping two routes, and lastly, the setting returns to the third work route from the end and the order of travel is set while skipping two routes. In this manner, two-route skip is maintained. On the other hand, if the order of travel is set an odd number of times toward one side, the setting returns to the third work route from the end and the order of travel is set while skipping two routes, and lastly, the setting returns to the second work route from the end and the order of travel is set while skipping two routes. In this manner, two-route skip is maintained.

In other words, the order of travel is set from the end work route while skipping two routes, and the next work route where the vehicle next travels is set at the second or third work route from end in accordance with the work direction in turning after the setting has reached a limit at one side so that work directions in adjacent work routes can be made opposite to each other.

In the case where the number of work routes is 13, the order of travel is set four times (an even number of times) from the end work route R1 toward one side for the work route R4, the work route R7, the work route R10, and the work route R13. The setting returns to the second work route R2 from the end, and the order of travel is set again three times (an odd number of times) toward one side for the work route R5, and the work route R8, and the work route R11 in this order. Thereafter, the setting returns to the sixth work route R6 from the end, and the order of travel is set again toward one side for the work route R9 and the work route R12 in this order. Lastly, the setting returns to the third work route R3 from the end.

In the case where the number of work routes is 13, unlike the cases where the number of work routes is 9 or 11, the work direction in the second turning, that is, the tenth order of travel, is the same as the work direction in the first turning, that is, the sixth order of travel. Thus, the third work route from the end is skipped, and the next work route R6 is set as the next order of travel. That is, while a part of the algorithm of the first embodiment is used, setting is performed with priority to the setting of making the work directions in adjacent work routes be opposite to each other.

In FIG. 31, examples where the number of work routes is 7 and 8 are represented by an upper part and a lower part, respectively.

In a case where the number of work routes is 7 (a multiple of 3-2), the setting starts from the third work route R3 from the end, and the order of travel is set for the work routes R6, R1, R4, R7, R2, and R5 in this order. In a case where the number of work routes is 8 (a multiple of 3-1), the setting starts from the end work route R1, and the order of travel is set for the work routes R6, R3, R8, R5, R2, R7, and R4 in this order.

As described above, N is a natural number of four or more in the second embodiment. However, the embodiment is similarly applicable to the case where N=3.

As described above, in this embodiment, in setting the order of travel on work routes such that the travel directions in adjacent work routes in the work region are opposite to each other, the algorithm used in the first or second embodiment is employed. However, this embodiment is not limited to these examples as long as the order of travel can be set to obtain opposite travel directions.

Other features of this embodiment are that based on the number of work routes included in the work route Ra, in a case where the work route Rn and the work route (Rn+1) cannot be arranged while skipping N work routes, these work routes are arranged while skipping K routes of (N+1) routes or more, and in a case where other work routes consecutive in the order while skipping more than N work routes, these work routes are arranged while always skipping K routes, and in addition, the direction in setting the work order is in one direction in work routes arranged while skipping N routes, whereas the direction in setting the work order in work routes arranged while skipping K routes is in the opposite direction.

Figure 32:
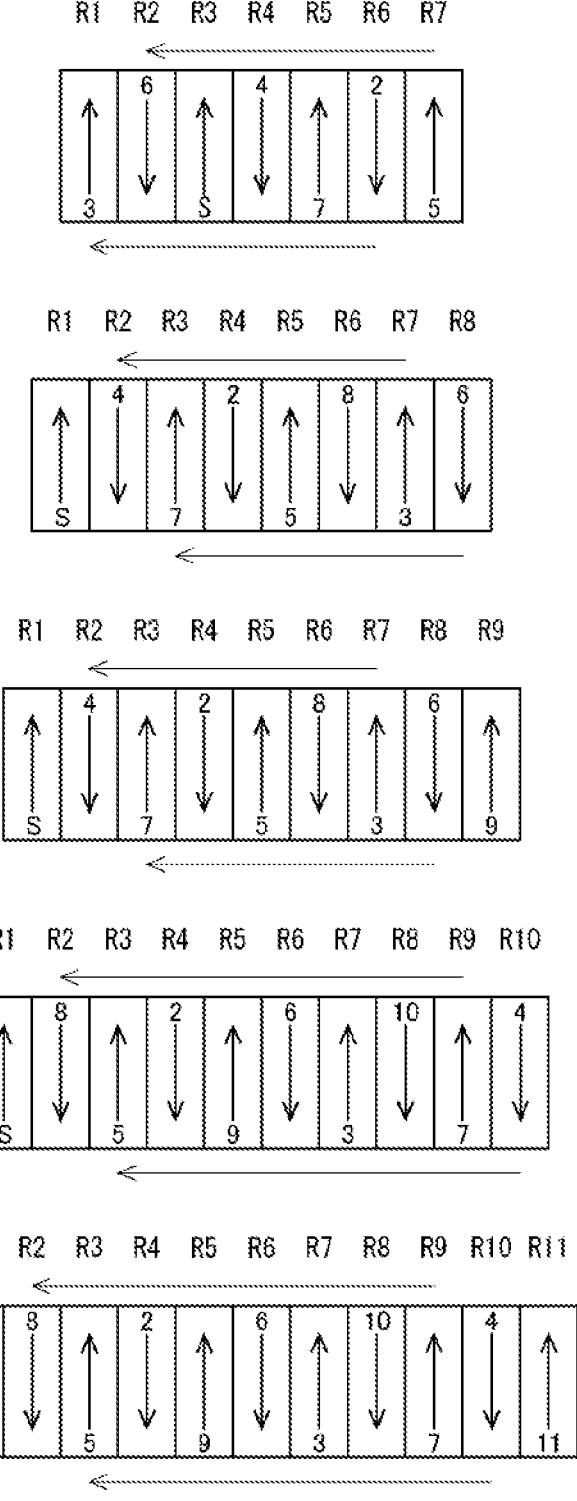
FIG. 32 is an illustration showing a method for generating routes in another embodiment.

That is, in routes represented in an upper part of FIG. 32 (the case where the number of work routes is 7), work routes (e.g., the work route R1 and the work route R4, and the work route R3 and the work route R6) for which consecutive work orders are set while skipping two work routes are arranged in one direction (a direction vertical to the work direction F set in field setting, and the direction to the work end position G with respect to the work start position S), whereas work routes (e.g., the work route R7 and the work route R2, and the work route R6 and the work route R1) for which consecutive work orders are set while skipping four work routes exceeding two work routes are arranged in the opposite direction.

In routes represented in the second part from the top in FIG. 32 (the case where the number of work routes is 8), work routes (e.g., the work route R1 and the work route R4, and the work route R3 and the work route R6) for which consecutive work orders are set while skipping two work routes are arranged in one direction (a direction vertical to the work direction F set in field setting, and the direction to the work end position G with respect to the work start position S), whereas work routes (e.g., the work route R7 and the work route R2, and the work route R8 and the work route R3) for which consecutive work orders are set while skipping two work routes are arranged in the opposite direction.

In routes represented in the middle part in FIG. 32 (the case where the number of work routes is 9), work routes (e.g., the work route R1 and the work route R4, and the work route R3 and the work route R6) for which consecutive work orders are set while skipping two work routes are arranged in one direction (a direction vertical to the work direction F set in field setting, and the direction to the work end position G with respect to the work start position S), whereas work routes (e.g., the work route R7 and the work route R2, and the work route R8 and the work route R3) for which consecutive work orders are set while skipping four work routes exceeding two routes are arranged in the opposite direction.

In routes represented in the second part from the bottom in FIG. 32 (the case where the number of work routes is 10), work routes (e.g., the work route R1 and the work route R4, and the work route R3 and the work route R6) for which consecutive work orders are set while skipping two work routes are arranged in one direction (a direction vertical to the work direction F set in field setting, and the direction to the work end position G with respect to the work start position S), whereas work routes (e.g., the work route R9 and the work route R2, and the work route R10 and the work route R3) for which consecutive work orders are set while skipping six work routes exceeding two work routes are arranged in the opposite direction.

In routes represented in the lower part in FIG. 32 (the case where the number of work routes is 11), work routes (e.g., the work route R1 and the work route R4, and the work route R3 and the work route R6) for which consecutive work orders are set while skipping two work routes are arranged in one direction (a direction vertical to the work direction F set in field setting, and the direction to the work end position G with respect to the work start position S), whereas work routes (e.g., the work route R9 and the work route R2, and the work route R10 and the work route R3) for which consecutive work orders are set while skipping six work routes exceeding two work routes are arranged in the opposite direction.

In summary for these features, in the case where two work routes (two routes) are arranged while skipping a predetermined number of work routes, this predetermined number is a value previously set by a user. Thus, a "first value" is set as a predetermined number, "the first value" work routes are disposed between the n-th work route and the (n+1)-th work route among a plurality of work routes. On the other hand, in a case where two work routes cannot be disposed while skipping the "first value" routes because of the number of work routes, two work routes can be disposed while skipping "second value" routes, where the second value is larger than the first value. That is, in a case where two work routes cannot be disposed while skipping "first value" routes, two work routes are not disposed while skipping "third value" work routes, where the "third value" is smaller than the "first value."

In a case where a situation in which two work routes cannot be disposed while skipping "first value" routes occurs multiple times, two work routes are always disposed while skipping "second value" routes. Accordingly, excessive occurrence of route generation unintended by a user can be suppressed. That is, two work routes are not disposed while skipping "four value" routes, where the "four value" is larger than the "first value" and is different from the "second value." In addition, in a case where two work routes are disposed while skipping "first value" routes, the direction of setting the work order ((n+1)-th work direction with respect to the n-th work route) is the one direction, and in a case where two work routes are disposed while skipping "second value" routes, the direction of setting the work order is the opposite direction.

In a case where the end position of work by the autonomous travel work vehicle 1 on the work route for which the last order of work is set is different from the work end position G set in the field setting, the autonomous travel work vehicle only needs to travel and move from the end position to the work end position G on the headland HB and/or the side margin HC. Accordingly, routes can be appropriately generated without a change of the work end position G set by the user in the field setting.

That is, in the route generation method described in the third embodiment, the route R includes the work route Ra in the work region HA and the travel route Rb in the headland HB on the field H, the work route Ra is constituted by a plurality of parallel work routes R1 through R12, the work routes R1 through R12 are sequentially connected by the travel route Rb, in connecting the work routes while skipping two or more adjacent work routes in the travel route Rb, travel directions in adjacent work routes in the work regions are opposite to each other.

This configuration enables efficient turn on the headland HB in conducting reciprocation work on the work region HA, and enables efficient turn on the headland HB without spoiling the ground of the field H due to turning in conducting reciprocation work.

REFERENCE SIGNS LIST 1 autonomous travel work vehicle
2 body part
24 work machine
32 azimuth angle detecting section
34 moving GPS antenna (position detecting section)
30 control section
100 travel work vehicle
112 remote control device
113 display device
150 work route generation device (travel region specifying device)
309 memory (memory section)
H field (travel region)
HA work region (first region)
HB headland (second region)
Ra work route
Rb travel route
Gw work end position
Gr travel end position
Z current position (of autonomous travel work vehicle)
V travel position (of travel work vehicle)
θ azimuth angle (of body part)
HK field shape
J travel trajectory
JA travel trajectory region

The invention claimed is:

1. A work vehicle comprising:
a body part;
a work machine that is attached to the body part;
a position detecting section configured to detect positional information on the body part;
a memory section configured to store a travel region where the body part travels;
a control section configured to control travel of the body part and work by the work machine in the travel region and in a work region distinct from the travel region;
a route generating section configured to generate a route of the body part in the travel region and in the work region; and an azimuth angle detecting section configured to detect an
azimuth angle of the body part, wherein:
a start point along the route is set,
the start point is included in the work region,
the start point is associated with the body part starting
work, along the route, by autonomous driving,
in response to an instruction to move to the start point,
the control section is configured to cause the body
part to travel from a current position of the body part
to the start point based on a determination that one or
more conditions are satisfied, the one or more con-
ditions including:
a direction of movement of the work vehicle is
toward the start point when the instruction to
move to the start point is received, the direction of
the work vehicle associated with the azimuth
angle of the body part.

2. The work vehicle according to claim 1, wherein the
control section is further configured to cause the body part
to travel to the start point of the route and then to start work
with the work machine, and wherein the memory section is
further configured to store a map of a field to which the body
part is to travel.

3. The work vehicle according to claim 1, wherein the
control section is further configured to cause the body part
to travel from the current position to the start point in
response to an angle difference between the azimuth angle of
the body part and an azimuth angle from the current position
to the start point being within a predetermined threshold.

4. The work vehicle of claim 3, wherein:
the azimuth angle of the body part corresponds to an
azimuth angle measured relative to a reference orien-
tation of the body part; and
the predetermined threshold is less than ten degrees.

5. The work vehicle according to claim 1, wherein the
control section is further configured to cause the body part
to travel from a work end position of the route to a travel end
position after work with the work machine on the route is
completed, and wherein the control section is further con-
figured to control the azimuth angle of the body part at the
travel end position.

6. The work vehicle of claim 1, wherein the position
detecting section includes a gyro sensor configured to detect
a first angular velocity, a second angular velocity distinct
from the first angular velocity, and a third angular velocity
distinct from the first angular velocity and distinct from the
second angular velocity.

7. The work vehicle of claim 6, wherein the control
section is further configured to:
receive first data from the gyro sensor and second data
from the azimuth angle detecting section; and
obtain an orientation and a turning direction of the body
part based, at least in part, on the first data and on the
second data.

8. The work vehicle of claim 1, further comprising a travel
region specifying device, the travel region specifying device
comprising:
a positional information acquiring section configured to
acquire positional information corresponding to a posi-
tion and an orientation of the body part;
a travel trajectory region specifying section configured to
specify a travel trajectory region of the body part based
on a travel trajectory of the body part specified using
the positional information;
a travel region specifying section configured to specify
the travel region where the body part is configured to travel based on a plurality of selection points selected
from the travel trajectory; and
a correction section configured to:
correct the travel region; and
in response to the travel region including a region
outside the travel trajectory region, correct the travel
region to a region not including a region outside the
travel trajectory region.

9. The work vehicle of claim 1, wherein:
the route includes a work route, in the work region, along
which the work vehicle is configured to perform work,
and a travel route, in the travel region, along which the
work vehicle is configured to travel without performing
work,
a first end of the travel route comprises the start point, and
a second end of the work route comprises a work end
point.

10. The work vehicle of claim 9, wherein:
the start point is positioned at a first beginning of the work
route and at the first end of the travel route,
the work end point is set at the second end of the work
route, and
the current position is at a second beginning of the travel
route.

11. The work vehicle of claim 1, further comprising a
travel region specifying device, the travel region specifying
device comprising:
a positional information acquiring section configured to
acquire positional information corresponding to a posi-
tion and an orientation of the body part, the position
comprising the current position;
a travel trajectory region specifying section configured to
specify a travel trajectory region of the body part using
the current position;
a travel region specifying section configured to specify a
travel region where the body part is configured to travel
based on a plurality of selection points selected from
the travel trajectory region; and
a correction section configured to, in response to the travel
region including a region outside the travel trajectory
region, correct the travel region to a region not includ-
ing a region outside the travel trajectory region.

12. The work vehicle of claim 1, wherein the one or more
conditions further include that the current position relative to
an extension line obtained by extending the route toward the
start point is within a predetermined distance.

13. A travel region specifying device comprising:
a positional information acquiring section configured to
acquire positional information of a body part of a work
vehicle;
a travel trajectory region specifying section configured to
specify a travel trajectory region of the body part based
on a travel trajectory of the body part specified using
the positional information, wherein the travel trajectory
region comprises a closed region surrounded by the
travel trajectory;
a travel region specifying section configured to:
specify a field shape as a travel region where the body
part is configured to travel based on a plurality of
selection points selected from the travel trajectory,
and
determine that the field shape is in error based on
identifying a point that is located outside the travel
trajectory region; and
a notification section configured to issue a first notifica-
tion, suggesting that the travel region includes a region outside the travel trajectory region and a second notification indicating that the field shape is incorrect.

14. The travel region specifying device of claim 13, wherein the travel region specifying section is further configured to:

compare first data corresponding to a field shape of a field with second data corresponding to a map of the field; and cause the notification section to generate the second notification.

15. The travel region specifying device of claim 13, wherein the travel region specifying section is further configured to:

compare a first value corresponding to an area of a field shape to a second value corresponding to an area of the travel trajectory region; and in response to the first value being larger than the second value, generate a second field shape.

16. The travel region specifying device of claim 15, wherein the travel region specifying section is further configured to cause the notification section to:

generate a third notification indicating a request for input from an operator of the travel region specifying device that the second field shape is correct.

17. The travel region specifying device of claim 13, wherein the travel region specifying device is configured to automatically correct the travel region in response to a determination that the travel region includes the region outside the travel trajectory region.

18. A travel region specifying device comprising:

a positional information acquiring section configured to acquire positional information of a body part of a work vehicle;

a travel trajectory region specifying section configured to specify a travel trajectory region of the body part based on a travel trajectory of the body part specified using the positional information, wherein the travel trajectory region comprises a closed region surrounded by the travel trajectory;

a travel region specifying section configured to:

specify a travel region where the body part is configured to travel based on a plurality of selection points selected from the travel trajectory, and determine that the travel region is in error based on identifying a point that is located outside the travel region; and a correction section configured to correct the travel region, wherein in response to the travel region including a region outside the travel trajectory region, and wherein in response to receipt, at a display device, of an acknowledgement, the correction section is configured to correct the travel region to a region not including the region outside the travel trajectory region.

19. The travel region specifying device of claim 18, further comprising a notification section configured to issue a first notification that a travel region includes a region outside the travel trajectory region.

20. The travel region specifying device of claim 19, wherein:

the notification section is further configured to issue a second notification after the correction section corrects the travel region; and the second notification corresponds to an inquiry of the travel region specifying device whether a corrected travel region is correct to prompt receipt of the acknowledgement.

\* \* \* \* \*